US010289433B2

(12) United States Patent
Saddler et al.

(10) Patent No.: US 10,289,433 B2
(45) Date of Patent: May 14, 2019

(54) DOMAIN SPECIFIC LANGUAGE FOR ENCODING ASSISTANT DIALOG

(71) Applicant: Apple Inc., Cupertino, CA (US)

(72) Inventors: Harry J. Saddler, Berkeley, CA (US); Nicolas Zeitlin, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 1106 days.

(21) Appl. No.: 14/502,245

(22) Filed: Sep. 30, 2014

(65) Prior Publication Data

US 2015/0348533 A1    Dec. 3, 2015

Related U.S. Application Data

(60) Provisional application No. 62/005,886, filed on May 30, 2014.

(51) Int. Cl.
  *G06F 3/00*     (2006.01)
  *G06F 9/451*    (2018.01)
  *G10L 13/027*   (2013.01)

(52) U.S. Cl.
  CPC ............ *G06F 9/453* (2018.02); *G10L 13/027* (2013.01)

(58) Field of Classification Search
  CPC ..... G10L 15/1822; G10L 15/22; G10L 13/00; G10L 13/02; G10L 13/08; G10L 15/1815;
  (Continued)

(56) References Cited

U.S. PATENT DOCUMENTS

| 1,559,320 A | 10/1925 | Hirsh |
| 2,180,522 A | 11/1939 | Henne |

(Continued)

FOREIGN PATENT DOCUMENTS

| CH | 681573 A5 | 4/1993 |
| CN | 1673939 A | 9/2005 |

(Continued)

OTHER PUBLICATIONS

"Interactive Voice", available at <http://www.helloivee.com/company/>, retrieved on Feb. 10, 2014, 2 pages.

(Continued)

*Primary Examiner* — Di Xiao
(74) *Attorney, Agent, or Firm* — Dentons US LLP

(57) ABSTRACT

Systems and processes for generating output dialogs for virtual assistants are provided. An output dialog can be generated from multiple output segments that can each include a string of one or more characters or words. The contents of an output segment can be selected from multiple possible outputs based on a predetermined order, conditional logic, or a random selection. The output segments can be concatenated to form the output dialog. In one example, a dialog generation file that defines the possible outputs for each output segment, an ordering of the output segments within the output dialog, and format for the output dialog can be used to generate the output dialog. The dialog generation file can include any number of functional blocks, which can each output an output segment, that can be arranged hierarchically and in a particular order to generate a desired output dialog.

36 Claims, 7 Drawing Sheets

(58) Field of Classification Search
CPC ..... G10L 15/183; G10L 15/26; G10L 15/265;
G10L 21/06; G10L 2015/088
See application file for complete search history.

(56) References Cited

U.S. PATENT DOCUMENTS

| | | | |
|---|---|---|---|
| 3,704,345 A | 11/1972 | Coker et al. |
| 3,710,321 A | 1/1973 | Rubenstein |
| 3,828,132 A | 8/1974 | Flanagan et al. |
| 3,979,557 A | 9/1976 | Schulman et al. |
| 4,013,085 A | 3/1977 | Wright |
| 4,081,631 A | 3/1978 | Feder |
| 4,090,216 A | 5/1978 | Constable |
| 4,107,784 A | 8/1978 | Van Bemmelen |
| 4,108,211 A | 8/1978 | Tanaka |
| 4,159,536 A | 6/1979 | Kehoe et al. |
| 4,181,821 A | 1/1980 | Pirz et al. |
| 4,204,089 A | 5/1980 | Key et al. |
| 4,241,286 A | 12/1980 | Gordon |
| 4,253,477 A | 3/1981 | Eichman |
| 4,278,838 A | 7/1981 | Antonov |
| 4,282,405 A | 8/1981 | Taguchi |
| 4,310,721 A | 1/1982 | Manley et al. |
| 4,332,464 A | 6/1982 | Bartulis et al. |
| 4,348,553 A | 9/1982 | Baker et al. |
| 4,384,169 A | 5/1983 | Mozer et al. |
| 4,386,345 A | 5/1983 | Narveson et al. |
| 4,433,377 A | 2/1984 | Eustis et al. |
| 4,451,849 A | 5/1984 | Fuhrer |
| 4,485,439 A | 11/1984 | Rothstein |
| 4,495,644 A | 1/1985 | Parks et al. |
| 4,513,379 A | 4/1985 | Wilson et al. |
| 4,513,435 A | 4/1985 | Sakoe et al. |
| 4,555,775 A | 11/1985 | Pike |
| 4,577,343 A | 3/1986 | Oura |
| 4,586,158 A | 4/1986 | Brandle |
| 4,587,670 A | 5/1986 | Levinson et al. |
| 4,589,022 A | 5/1986 | Prince et al. |
| 4,611,346 A | 9/1986 | Bednar et al. |
| 4,615,081 A | 10/1986 | Lindahl |
| 4,618,984 A | 10/1986 | Das et al. |
| 4,642,790 A | 2/1987 | Minshull et al. |
| 4,653,021 A | 3/1987 | Takagi |
| 4,654,875 A | 3/1987 | Srihari et al. |
| 4,655,233 A | 4/1987 | Laughlin |
| 4,658,425 A | 4/1987 | Julstrom |
| 4,670,848 A | 6/1987 | Schramm |
| 4,677,570 A | 6/1987 | Taki |
| 4,680,429 A | 7/1987 | Murdock et al. |
| 4,680,805 A | 7/1987 | Scott |
| 4,688,195 A | 8/1987 | Thompson et al. |
| 4,692,941 A | 9/1987 | Jacks et al. |
| 4,698,625 A | 10/1987 | McCaskill et al. |
| 4,709,390 A | 11/1987 | Atal et al. |
| 4,713,775 A | 12/1987 | Scott et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,736,296 A | 4/1988 | Katayama et al. |
| 4,750,122 A | 6/1988 | Kaji et al. |
| 4,754,489 A | 6/1988 | Bokser |
| 4,755,811 A | 7/1988 | Slavin et al. |
| 4,776,016 A | 10/1988 | Hansen |
| 4,783,804 A | 11/1988 | Juang et al. |
| 4,783,807 A | 11/1988 | Marley |
| 4,785,413 A | 11/1988 | Atsumi |
| 4,790,028 A | 12/1988 | Ramage |
| 4,797,930 A | 1/1989 | Goudie |
| 4,802,223 A | 1/1989 | Lin et al. |
| 4,803,729 A | 2/1989 | Baker |
| 4,807,752 A | 2/1989 | Chodorow |
| 4,811,243 A | 3/1989 | Racine |
| 4,813,074 A | 3/1989 | Marcus |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,829,583 A | 5/1989 | Monroe et al. |
| 4,831,551 A | 5/1989 | Schalk et al. |
| 4,833,712 A | 5/1989 | Bahl et al. |
| 4,833,718 A | 5/1989 | Sprague |
| 4,837,798 A | 6/1989 | Cohen et al. |
| 4,837,831 A | 6/1989 | Gillick et al. |
| 4,839,853 A | 6/1989 | Deerwester et al. |
| 4,852,168 A | 7/1989 | Sprague |
| 4,862,504 A | 8/1989 | Nomura |
| 4,875,187 A | 10/1989 | Smith |
| 4,878,230 A | 10/1989 | Murakami et al. |
| 4,887,212 A | 12/1989 | Zamora et al. |
| 4,896,359 A | 1/1990 | Yamamoto et al. |
| 4,903,305 A | 2/1990 | Gillick et al. |
| 4,905,163 A | 2/1990 | Garber et al. |
| 4,908,867 A | 3/1990 | Silverman |
| 4,914,586 A | 4/1990 | Swinehart et al. |
| 4,914,590 A | 4/1990 | Loatman et al. |
| 4,918,723 A | 4/1990 | Iggulden et al. |
| 4,926,491 A | 5/1990 | Maeda et al. |
| 4,928,307 A | 5/1990 | Lynn |
| 4,935,954 A | 6/1990 | Thompson et al. |
| 4,939,639 A | 7/1990 | Lee et al. |
| 4,941,488 A | 7/1990 | Marxer et al. |
| 4,944,013 A | 7/1990 | Gouvianakis et al. |
| 4,945,504 A | 7/1990 | Nakama et al. |
| 4,953,106 A | 8/1990 | Gansner et al. |
| 4,955,047 A | 9/1990 | Morganstein et al. |
| 4,965,763 A | 10/1990 | Zamora |
| 4,972,462 A | 11/1990 | Shibata |
| 4,974,191 A | 11/1990 | Amirghodsi et al. |
| 4,975,975 A | 12/1990 | Filipski |
| 4,977,598 A | 12/1990 | Doddington et al. |
| 4,980,916 A | 12/1990 | Zinser |
| 4,985,924 A | 1/1991 | Matsuura |
| 4,992,972 A | 2/1991 | Brooks et al. |
| 4,994,966 A | 2/1991 | Hutchins |
| 4,994,983 A | 2/1991 | Landell et al. |
| 5,003,577 A | 3/1991 | Ertz et al. |
| 5,007,095 A | 4/1991 | Nara et al. |
| 5,007,098 A | 4/1991 | Kumagai |
| 5,010,574 A | 4/1991 | Wang |
| 5,016,002 A | 5/1991 | Levanto |
| 5,020,112 A | 5/1991 | Chou |
| 5,021,971 A | 6/1991 | Lindsay |
| 5,022,081 A | 6/1991 | Hirose et al. |
| 5,027,110 A | 6/1991 | Chang et al. |
| 5,027,406 A | 6/1991 | Roberts et al. |
| 5,027,408 A | 6/1991 | Kroeker et al. |
| 5,029,211 A | 7/1991 | Ozawa |
| 5,031,217 A | 7/1991 | Nishimura |
| 5,032,989 A | 7/1991 | Tornetta |
| 5,033,087 A | 7/1991 | Bahl et al. |
| 5,040,218 A | 8/1991 | Vitale et al. |
| 5,046,099 A | 9/1991 | Nishimura |
| 5,047,614 A | 9/1991 | Bianco |
| 5,050,215 A | 9/1991 | Nishimura |
| 5,053,758 A | 10/1991 | Cornett et al. |
| 5,054,084 A | 10/1991 | Tanaka et al. |
| 5,057,915 A | 10/1991 | Von Kohorn |
| 5,067,158 A | 11/1991 | Arjmand |
| 5,067,503 A | 11/1991 | Stile |
| 5,072,452 A | 12/1991 | Brown et al. |
| 5,075,896 A | 12/1991 | Wilcox et al. |
| 5,079,723 A | 1/1992 | Herceg et al. |
| 5,083,119 A | 1/1992 | Trevett et al. |
| 5,083,268 A | 1/1992 | Hemphill et al. |
| 5,086,792 A | 2/1992 | Chodorow |
| 5,090,012 A | 2/1992 | Kajiyama et al. |
| 5,091,790 A | 2/1992 | Silverberg |
| 5,091,945 A | 2/1992 | Kleijn |
| 5,103,498 A | 4/1992 | Lanier et al. |
| 5,109,509 A | 4/1992 | Katayama et al. |
| 5,111,423 A | 5/1992 | Kopec, Jr. et al. |
| 5,119,079 A | 6/1992 | Hube et al. |
| 5,122,951 A | 6/1992 | Kamiya |

(56) References Cited

U.S. PATENT DOCUMENTS

| | | |
|---|---|---|
| 5,123,103 A | 6/1992 | Ohtaki et al. |
| 5,125,022 A | 6/1992 | Hunt et al. |
| 5,125,030 A | 6/1992 | Nomura et al. |
| 5,127,043 A | 6/1992 | Hunt et al. |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,133,023 A | 7/1992 | Bokser |
| 5,142,584 A | 8/1992 | Ozawa |
| 5,148,541 A | 9/1992 | Lee et al. |
| 5,153,913 A | 10/1992 | Kandefer et al. |
| 5,157,610 A | 10/1992 | Asano et al. |
| 5,161,102 A | 11/1992 | Griffin et al. |
| 5,164,900 A | 11/1992 | Bernath |
| 5,164,982 A | 11/1992 | Davis |
| 5,165,007 A | 11/1992 | Bahl et al. |
| 5,167,004 A | 11/1992 | Netsch et al. |
| 5,175,536 A | 12/1992 | Aschliman et al. |
| 5,175,803 A | 12/1992 | Yeh |
| 5,175,814 A | 12/1992 | Anick et al. |
| 5,179,627 A | 1/1993 | Sweet et al. |
| 5,179,652 A | 1/1993 | Rozmanith et al. |
| 5,194,950 A | 3/1993 | Murakami et al. |
| 5,195,034 A | 3/1993 | Garneau et al. |
| 5,195,167 A | 3/1993 | Bahl et al. |
| 5,197,005 A | 3/1993 | Shwartz et al. |
| 5,199,077 A | 3/1993 | Wilcox et al. |
| 5,201,034 A | 4/1993 | Matsuura et al. |
| 5,202,952 A | 4/1993 | Gillick et al. |
| 5,208,862 A | 5/1993 | Ozawa |
| 5,210,689 A | 5/1993 | Baker et al. |
| 5,212,638 A | 5/1993 | Bernath |
| 5,212,821 A | 5/1993 | Gorin et al. |
| 5,216,747 A | 6/1993 | Hardwick et al. |
| 5,218,700 A | 6/1993 | Beechick |
| 5,220,629 A | 6/1993 | Kosaka et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,231,670 A | 7/1993 | Goldhor et al. |
| 5,235,680 A | 8/1993 | Bijnagte |
| 5,237,502 A | 8/1993 | White et al. |
| 5,241,619 A | 8/1993 | Schwartz et al. |
| 5,253,325 A | 10/1993 | Clark |
| 5,257,387 A | 10/1993 | Richek et al. |
| 5,260,697 A | 11/1993 | Barrett et al. |
| 5,266,931 A | 11/1993 | Tanaka |
| 5,266,949 A | 11/1993 | Rossi |
| 5,267,345 A | 11/1993 | Brown et al. |
| 5,268,990 A | 12/1993 | Cohen et al. |
| 5,274,771 A | 12/1993 | Hamilton et al. |
| 5,274,818 A | 12/1993 | Vasilevsky et al. |
| 5,276,616 A | 1/1994 | Kuga et al. |
| 5,276,794 A | 1/1994 | Lamb, Jr. |
| 5,278,980 A | 1/1994 | Pedersen et al. |
| 5,282,265 A | 1/1994 | Rohra Suda et al. |
| 5,283,818 A | 2/1994 | Klausner et al. |
| 5,287,448 A | 2/1994 | Nicol et al. |
| 5,289,562 A | 2/1994 | Mizuta et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,296,642 A | 3/1994 | Konishi |
| 5,297,170 A | 3/1994 | Eyuboglu et al. |
| 5,297,194 A | 3/1994 | Hunt et al. |
| 5,299,125 A | 3/1994 | Baker et al. |
| 5,299,284 A | 3/1994 | Roy |
| 5,301,109 A | 4/1994 | Landauer et al. |
| 5,303,406 A | 4/1994 | Hansen et al. |
| 5,305,205 A | 4/1994 | Weber et al. |
| 5,305,768 A | 4/1994 | Gross et al. |
| 5,309,359 A | 5/1994 | Katz et al. |
| 5,315,689 A | 5/1994 | Kanazawa et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,325,462 A | 6/1994 | Farrett |
| 5,326,270 A | 7/1994 | Ostby et al. |
| 5,327,342 A | 7/1994 | Roy |
| 5,327,498 A | 7/1994 | Hamon |
| 5,329,608 A | 7/1994 | Bocchieri et al. |
| 5,333,236 A | 7/1994 | Bahl et al. |
| 5,333,266 A | 7/1994 | Boaz et al. |
| 5,333,275 A | 7/1994 | Wheatley et al. |
| 5,335,011 A | 8/1994 | Addeo et al. |
| 5,335,276 A | 8/1994 | Thompson et al. |
| 5,341,293 A | 8/1994 | Vertelney et al. |
| 5,341,466 A | 8/1994 | Perlin et al. |
| 5,345,536 A | 9/1994 | Hoshimi et al. |
| 5,349,645 A | 9/1994 | Zhao |
| 5,353,374 A | 10/1994 | Wilson et al. |
| 5,353,376 A | 10/1994 | Oh et al. |
| 5,353,377 A | 10/1994 | Kuroda et al. |
| 5,353,408 A | 10/1994 | Kato et al. |
| 5,353,432 A | 10/1994 | Richek et al. |
| 5,357,431 A | 10/1994 | Nakada et al. |
| 5,367,640 A | 11/1994 | Hamilton et al. |
| 5,369,575 A | 11/1994 | Lamberti et al. |
| 5,369,577 A | 11/1994 | Kadashevich et al. |
| 5,371,853 A | 12/1994 | Kao et al. |
| 5,373,566 A | 12/1994 | Murdock |
| 5,377,103 A | 12/1994 | Lamberti et al. |
| 5,377,301 A | 12/1994 | Rosenberg et al. |
| 5,377,303 A | 12/1994 | Firman |
| 5,384,671 A | 1/1995 | Fisher |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,236 A | 2/1995 | Klausner et al. |
| 5,390,279 A | 2/1995 | Strong |
| 5,390,281 A | 2/1995 | Luciw et al. |
| 5,392,419 A | 2/1995 | Walton |
| 5,396,625 A | 3/1995 | Parkes |
| 5,400,434 A | 3/1995 | Pearson |
| 5,404,295 A | 4/1995 | Katz et al. |
| 5,406,305 A | 4/1995 | Shimomura et al. |
| 5,408,060 A | 4/1995 | Muurinen |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,422,656 A | 6/1995 | Allard et al. |
| 5,424,947 A | 6/1995 | Nagao et al. |
| 5,425,108 A | 6/1995 | Hwang et al. |
| 5,428,731 A | 6/1995 | Powers, III |
| 5,434,777 A | 7/1995 | Luciw |
| 5,442,598 A | 8/1995 | Haikawa et al. |
| 5,442,780 A | 8/1995 | Takanashi et al. |
| 5,444,823 A | 8/1995 | Nguyen |
| 5,449,368 A | 9/1995 | Kuzmak |
| 5,450,523 A | 9/1995 | Zhao |
| 5,455,888 A | 10/1995 | Iyengar et al. |
| 5,457,768 A | 10/1995 | Tsuboi et al. |
| 5,459,488 A | 10/1995 | Geiser |
| 5,463,696 A | 10/1995 | Beernink et al. |
| 5,463,725 A | 10/1995 | Henckel et al. |
| 5,465,401 A | 11/1995 | Thompson |
| 5,469,529 A | 11/1995 | Bimbot et al. |
| 5,471,611 A | 11/1995 | McGregor |
| 5,473,728 A | 12/1995 | Luginbuhl et al. |
| 5,475,587 A | 12/1995 | Anick et al. |
| 5,475,796 A | 12/1995 | Iwata |
| 5,477,447 A | 12/1995 | Luciw et al. |
| 5,477,448 A | 12/1995 | Golding et al. |
| 5,477,451 A | 12/1995 | Brown et al. |
| 5,479,488 A | 12/1995 | Lennig et al. |
| 5,481,739 A | 1/1996 | Staats |
| 5,485,372 A | 1/1996 | Golding et al. |
| 5,485,543 A | 1/1996 | Aso |

(56) References Cited

U.S. PATENT DOCUMENTS

| | | |
|---|---|---|
| 5,488,727 A | 1/1996 | Agrawal et al. |
| 5,490,234 A | 2/1996 | Narayan |
| 5,491,758 A | 2/1996 | Bellegarda et al. |
| 5,491,772 A | 2/1996 | Hardwick et al. |
| 5,493,677 A | 2/1996 | Balogh et al. |
| 5,495,604 A | 2/1996 | Harding et al. |
| 5,497,319 A | 3/1996 | Chong et al. |
| 5,500,903 A | 3/1996 | Gulli |
| 5,500,905 A | 3/1996 | Martin et al. |
| 5,500,937 A | 3/1996 | Thompson-Rohrlich |
| 5,502,774 A | 3/1996 | Bellegarda et al. |
| 5,502,790 A | 3/1996 | Yi |
| 5,502,791 A | 3/1996 | Nishimura et al. |
| 5,515,475 A | 5/1996 | Gupta et al. |
| 5,521,816 A | 5/1996 | Roche et al. |
| 5,524,140 A | 6/1996 | Klausner et al. |
| 5,533,182 A | 7/1996 | Bates et al. |
| 5,535,121 A | 7/1996 | Roche et al. |
| 5,536,902 A | 7/1996 | Serra et al. |
| 5,537,317 A | 7/1996 | Schabes et al. |
| 5,537,618 A | 7/1996 | Boulton et al. |
| 5,537,647 A | 7/1996 | Hermansky et al. |
| 5,543,588 A | 8/1996 | Bisset et al. |
| 5,543,897 A | 8/1996 | Altrieth, III |
| 5,544,264 A | 8/1996 | Bellegarda et al. |
| 5,548,507 A | 8/1996 | Martino et al. |
| 5,555,343 A | 9/1996 | Luther |
| 5,555,344 A | 9/1996 | Zunkler |
| 5,559,301 A | 9/1996 | Bryan, Jr. et al. |
| 5,559,945 A | 9/1996 | Beaudet et al. |
| 5,564,446 A | 10/1996 | Wiltshire |
| 5,565,888 A | 10/1996 | Selker |
| 5,568,536 A | 10/1996 | Tiller et al. |
| 5,568,540 A | 10/1996 | Greco et al. |
| 5,570,324 A | 10/1996 | Geil |
| 5,572,576 A | 11/1996 | Klausner et al. |
| 5,574,823 A | 11/1996 | Hassanein et al. |
| 5,574,824 A | 11/1996 | Slyh et al. |
| 5,577,135 A | 11/1996 | Grajski et al. |
| 5,577,164 A | 11/1996 | Kaneko et al. |
| 5,577,241 A | 11/1996 | Spencer |
| 5,578,808 A | 11/1996 | Taylor |
| 5,579,037 A | 11/1996 | Tahara et al. |
| 5,579,436 A | 11/1996 | Chou et al. |
| 5,581,484 A | 12/1996 | Prince |
| 5,581,652 A | 12/1996 | Abe et al. |
| 5,581,655 A | 12/1996 | Cohen et al. |
| 5,583,993 A | 12/1996 | Foster et al. |
| 5,584,024 A | 12/1996 | Shwartz |
| 5,594,641 A | 1/1997 | Kaplan et al. |
| 5,596,260 A | 1/1997 | Moravec et al. |
| 5,596,676 A | 1/1997 | Swaminathan et al. |
| 5,596,994 A | 1/1997 | Bro |
| 5,608,624 A | 3/1997 | Luciw |
| 5,608,698 A | 3/1997 | Yamanoi et al. |
| 5,608,841 A | 3/1997 | Tsuboka |
| 5,610,812 A | 3/1997 | Schabes et al. |
| 5,613,036 A | 3/1997 | Strong |
| 5,613,122 A | 3/1997 | Burnard et al. |
| 5,615,378 A | 3/1997 | Nishino et al. |
| 5,615,384 A | 3/1997 | Allard et al. |
| 5,616,876 A | 4/1997 | Cluts |
| 5,617,386 A | 4/1997 | Choi |
| 5,617,507 A | 4/1997 | Lee et al. |
| 5,617,539 A | 4/1997 | Ludwig et al. |
| 5,619,583 A | 4/1997 | Page et al. |
| 5,619,694 A | 4/1997 | Shimazu |
| 5,621,859 A | 4/1997 | Schwartz et al. |
| 5,621,903 A | 4/1997 | Luciw et al. |
| 5,627,939 A | 5/1997 | Huang et al. |
| 5,634,084 A | 5/1997 | Malsheen et al. |
| 5,636,325 A | 6/1997 | Farrett |
| 5,638,425 A | 6/1997 | Meador, III et al. |
| 5,638,489 A | 6/1997 | Tsuboka |
| 5,638,523 A | 6/1997 | Mullet et al. |
| 5,640,487 A | 6/1997 | Lau et al. |
| 5,642,464 A | 6/1997 | Yue et al. |
| 5,642,466 A | 6/1997 | Narayan |
| 5,642,519 A | 6/1997 | Martin |
| 5,644,656 A | 7/1997 | Akra et al. |
| 5,644,727 A | 7/1997 | Atkins |
| 5,649,060 A | 7/1997 | Ellozy et al. |
| 5,652,828 A | 7/1997 | Silverman |
| 5,652,884 A | 7/1997 | Palevich |
| 5,652,897 A | 7/1997 | Linebarger et al. |
| 5,661,787 A | 8/1997 | Pocock |
| 5,664,055 A | 9/1997 | Kroon |
| 5,670,985 A | 9/1997 | Cappels, Sr. et al. |
| 5,675,819 A | 10/1997 | Schuetze |
| 5,682,475 A | 10/1997 | Johnson et al. |
| 5,682,539 A | 10/1997 | Conrad et al. |
| 5,684,513 A | 11/1997 | Decker |
| 5,687,077 A | 11/1997 | Gough, Jr. |
| 5,689,287 A | 11/1997 | Mackinlay et al. |
| 5,689,618 A | 11/1997 | Gasper et al. |
| 5,696,962 A | 12/1997 | Kupiec |
| 5,699,082 A | 12/1997 | Marks et al. |
| 5,701,400 A | 12/1997 | Amado |
| 5,706,442 A | 1/1998 | Anderson et al. |
| 5,708,659 A | 1/1998 | Rostoker et al. |
| 5,708,822 A | 1/1998 | Wical |
| 5,710,886 A | 1/1998 | Christensen et al. |
| 5,710,922 A | 1/1998 | Alley et al. |
| 5,712,949 A | 1/1998 | Kato et al. |
| 5,712,957 A | 1/1998 | Waibel et al. |
| 5,715,468 A | 2/1998 | Budzinski |
| 5,717,877 A | 2/1998 | Orton et al. |
| 5,721,827 A | 2/1998 | Logan et al. |
| 5,721,949 A | 2/1998 | Smith et al. |
| 5,724,406 A | 3/1998 | Juster |
| 5,724,985 A | 3/1998 | Snell et al. |
| 5,726,672 A | 3/1998 | Hernandez et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,732,395 A | 3/1998 | Silverman |
| 5,734,750 A | 3/1998 | Arai et al. |
| 5,734,791 A | 3/1998 | Acero et al. |
| 5,736,974 A | 4/1998 | Selker |
| 5,737,487 A | 4/1998 | Bellegarda et al. |
| 5,737,734 A | 4/1998 | Schultz |
| 5,739,451 A | 4/1998 | Winksy et al. |
| 5,740,143 A | 4/1998 | Suetomi |
| 5,742,705 A | 4/1998 | Parthasarathy |
| 5,742,736 A | 4/1998 | Haddock |
| 5,745,116 A | 4/1998 | Pisutha-Arnond |
| 5,745,873 A | 4/1998 | Braida et al. |
| 5,748,512 A | 5/1998 | Vargas |
| 5,748,974 A | 5/1998 | Johnson |
| 5,749,071 A | 5/1998 | Silverman |
| 5,749,081 A | 5/1998 | Whiteis |
| 5,751,906 A | 5/1998 | Silverman |
| 5,757,358 A | 5/1998 | Osga |
| 5,757,979 A | 5/1998 | Hongo et al. |
| 5,758,079 A | 5/1998 | Ludwig et al. |
| 5,758,314 A | 5/1998 | McKenna |
| 5,759,101 A | 6/1998 | Von Kohorn |
| 5,761,640 A | 6/1998 | Kalyanswamy et al. |
| 5,765,131 A | 6/1998 | Stentiford et al. |
| 5,765,168 A | 6/1998 | Burrows |
| 5,771,276 A | 6/1998 | Wolf |
| 5,774,834 A | 6/1998 | Visser |
| 5,774,855 A | 6/1998 | Foti et al. |
| 5,774,859 A | 6/1998 | Houser et al. |
| 5,777,614 A | 7/1998 | Ando et al. |
| 5,778,405 A | 7/1998 | Ogawa |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,797,008 A | 8/1998 | Burrows |
| 5,799,268 A | 8/1998 | Boguraev |

(56) References Cited

U.S. PATENT DOCUMENTS

| | | |
|---|---|---|
| 5,799,269 A | 8/1998 | Schabes et al. |
| 5,799,276 A | 8/1998 | Komissarchik et al. |
| 5,801,692 A | 9/1998 | Muzio et al. |
| 5,802,466 A | 9/1998 | Gallant et al. |
| 5,802,526 A | 9/1998 | Fawcett et al. |
| 5,812,697 A | 9/1998 | Sakai et al. |
| 5,812,698 A | 9/1998 | Platt et al. |
| 5,815,142 A | 9/1998 | Allard et al. |
| 5,815,225 A | 9/1998 | Nelson |
| 5,818,451 A | 10/1998 | Bertram et al. |
| 5,818,924 A | 10/1998 | King et al. |
| 5,822,288 A | 10/1998 | Shinada |
| 5,822,730 A | 10/1998 | Roth et al. |
| 5,822,743 A | 10/1998 | Gupta et al. |
| 5,825,349 A | 10/1998 | Meier et al. |
| 5,825,881 A | 10/1998 | Colvin, Sr. |
| 5,826,261 A | 10/1998 | Spencer |
| 5,828,768 A | 10/1998 | Eatwell et al. |
| 5,828,999 A | 10/1998 | Bellegarda et al. |
| 5,832,433 A | 11/1998 | Yashchin et al. |
| 5,832,435 A | 11/1998 | Silverman |
| 5,835,077 A | 11/1998 | Dao et al. |
| 5,835,721 A | 11/1998 | Donahue et al. |
| 5,835,732 A | 11/1998 | Kikinis et al. |
| 5,835,893 A | 11/1998 | Ushioda |
| 5,839,106 A | 11/1998 | Bellegarda |
| 5,841,902 A | 11/1998 | Tu |
| 5,842,165 A | 11/1998 | Raman et al. |
| 5,845,255 A | 12/1998 | Mayaud |
| 5,850,480 A | 12/1998 | Scanlon |
| 5,850,629 A | 12/1998 | Holm et al. |
| 5,854,893 A | 12/1998 | Ludwig et al. |
| 5,857,184 A | 1/1999 | Lynch |
| 5,860,063 A | 1/1999 | Gorin et al. |
| 5,860,064 A | 1/1999 | Henton |
| 5,860,075 A | 1/1999 | Hashizume et al. |
| 5,862,223 A | 1/1999 | Walker et al. |
| 5,864,806 A | 1/1999 | Mokbel et al. |
| 5,864,815 A | 1/1999 | Rozak et al. |
| 5,864,844 A | 1/1999 | James et al. |
| 5,864,855 A | 1/1999 | Ruocco et al. |
| 5,864,868 A | 1/1999 | Contois |
| 5,867,799 A | 2/1999 | Lang et al. |
| 5,870,710 A | 2/1999 | Ozawa et al. |
| 5,873,056 A | 2/1999 | Liddy et al. |
| 5,875,427 A | 2/1999 | Yamazaki |
| 5,875,437 A | 2/1999 | Atkins |
| 5,876,396 A | 3/1999 | Lo et al. |
| 5,877,751 A | 3/1999 | Kanemitsu et al. |
| 5,878,393 A | 3/1999 | Hata et al. |
| 5,878,394 A | 3/1999 | Muhling |
| 5,878,396 A | 3/1999 | Henton |
| 5,880,731 A | 3/1999 | Liles et al. |
| 5,884,039 A | 3/1999 | Ludwig et al. |
| 5,884,323 A | 3/1999 | Hawkins et al. |
| 5,890,117 A | 3/1999 | Silverman |
| 5,890,122 A | 3/1999 | Van et al. |
| 5,891,180 A | 4/1999 | Greeninger et al. |
| 5,895,448 A | 4/1999 | Vysotsky et al. |
| 5,895,464 A | 4/1999 | Bhandari et al. |
| 5,895,466 A | 4/1999 | Goldberg et al. |
| 5,896,321 A | 4/1999 | Miller et al. |
| 5,896,500 A | 4/1999 | Ludwig et al. |
| 5,899,972 A | 5/1999 | Miyazawa et al. |
| 5,909,666 A | 6/1999 | Gould et al. |
| 5,912,951 A | 6/1999 | Checchio et al. |
| 5,912,952 A | 6/1999 | Brendzel |
| 5,913,193 A | 6/1999 | Huang et al. |
| 5,915,236 A | 6/1999 | Gould et al. |
| 5,915,238 A | 6/1999 | Tjaden |
| 5,915,249 A | 6/1999 | Spencer |
| 5,917,487 A | 6/1999 | Ulrich |
| 5,918,303 A | 6/1999 | Yamaura et al. |
| 5,920,327 A | 7/1999 | Seidensticker, Jr. |
| 5,920,836 A | 7/1999 | Gould et al. |
| 5,920,837 A | 7/1999 | Gould et al. |
| 5,923,757 A | 7/1999 | Hocker et al. |
| 5,924,068 A | 7/1999 | Richard et al. |
| 5,926,769 A | 7/1999 | Valimaa et al. |
| 5,926,789 A | 7/1999 | Barbara et al. |
| 5,930,408 A | 7/1999 | Seto |
| 5,930,751 A | 7/1999 | Cohrs et al. |
| 5,930,754 A | 7/1999 | Karaali et al. |
| 5,930,769 A | 7/1999 | Rose |
| 5,930,783 A | 7/1999 | Li et al. |
| 5,933,477 A | 8/1999 | Wu |
| 5,933,806 A | 8/1999 | Beyerlein et al. |
| 5,933,822 A | 8/1999 | Braden-Harder et al. |
| 5,936,926 A | 8/1999 | Yokouchi et al. |
| 5,940,811 A | 8/1999 | Norris |
| 5,940,841 A | 8/1999 | Schmuck et al. |
| 5,941,944 A | 8/1999 | Messerly |
| 5,943,043 A | 8/1999 | Furuhata et al. |
| 5,943,049 A | 8/1999 | Matsubara et al. |
| 5,943,052 A | 8/1999 | Allen et al. |
| 5,943,443 A | 8/1999 | Itonori et al. |
| 5,943,670 A | 8/1999 | Prager |
| 5,948,040 A | 9/1999 | DeLorme et al. |
| 5,949,961 A | 9/1999 | Sharman |
| 5,950,123 A | 9/1999 | Schwelb et al. |
| 5,952,992 A | 9/1999 | Helms |
| 5,953,541 A | 9/1999 | King et al. |
| 5,956,021 A | 9/1999 | Kubota et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,973,676 A | 10/1999 | Kawakura |
| 5,974,146 A | 10/1999 | Randle et al. |
| 5,977,950 A | 11/1999 | Rhyne |
| 5,982,352 A | 11/1999 | Pryor |
| 5,982,891 A | 11/1999 | Ginter et al. |
| 5,982,902 A | 11/1999 | Terano |
| 5,983,179 A | 11/1999 | Gould et al. |
| 5,987,132 A | 11/1999 | Rowney |
| 5,987,140 A | 11/1999 | Rowney et al. |
| 5,987,401 A | 11/1999 | Trudeau |
| 5,987,404 A | 11/1999 | Della Pietra et al. |
| 5,987,440 A | 11/1999 | O'Neil et al. |
| 5,990,887 A | 11/1999 | Redpath et al. |
| 5,991,441 A | 11/1999 | Jourjine |
| 5,995,460 A | 11/1999 | Takagi et al. |
| 5,995,590 A | 11/1999 | Brunet et al. |
| 5,998,972 A | 12/1999 | Gong |
| 5,999,169 A | 12/1999 | Lee |
| 5,999,895 A | 12/1999 | Forest |
| 5,999,908 A | 12/1999 | Abelow |
| 5,999,927 A | 12/1999 | Tukey et al. |
| 6,006,274 A | 12/1999 | Hawkins et al. |
| 6,009,237 A | 12/1999 | Hirabayashi et al. |
| 6,011,585 A | 1/2000 | Anderson |
| 6,014,428 A | 1/2000 | Wolf |
| 6,016,471 A | 1/2000 | Kuhn et al. |
| 6,018,705 A | 1/2000 | Gaudet |
| 6,018,711 A | 1/2000 | French-St. George et al. |
| 6,020,881 A | 2/2000 | Naughton et al. |
| 6,023,536 A | 2/2000 | Visser |
| 6,023,676 A | 2/2000 | Erell |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,035,267 A | 3/2000 | Watanabe et al. |
| 6,035,303 A | 3/2000 | Baer et al. |
| 6,035,336 A | 3/2000 | Lu et al. |
| 6,038,533 A | 3/2000 | Buchsbaum et al. |
| 6,040,824 A | 3/2000 | Maekawa et al. |
| 6,041,023 A | 3/2000 | Lakhansingh |
| 6,047,255 A | 4/2000 | Williamson |

(56) References Cited

U.S. PATENT DOCUMENTS

| | | |
|---|---|---|
| 6,052,654 A | 4/2000 | Gaudet et al. |
| 6,052,656 A | 4/2000 | Suda et al. |
| 6,054,990 A | 4/2000 | Tran |
| 6,055,514 A | 4/2000 | Wren |
| 6,055,531 A | 4/2000 | Bennett et al. |
| 6,064,767 A | 5/2000 | Muir et al. |
| 6,064,959 A | 5/2000 | Young et al. |
| 6,064,960 A | 5/2000 | Bellegarda et al. |
| 6,064,963 A | 5/2000 | Gainsboro |
| 6,067,519 A | 5/2000 | Lowry |
| 6,069,648 A | 5/2000 | Suso et al. |
| 6,070,138 A | 5/2000 | Iwata |
| 6,070,139 A | 5/2000 | Miyazawa et al. |
| 6,070,147 A | 5/2000 | Harms et al. |
| 6,073,033 A | 6/2000 | Campo |
| 6,073,036 A | 6/2000 | Heikkinen et al. |
| 6,073,097 A | 6/2000 | Gould et al. |
| 6,076,051 A | 6/2000 | Messerly et al. |
| 6,076,060 A | 6/2000 | Lin et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,081,780 A | 6/2000 | Lumelsky |
| 6,088,671 A | 7/2000 | Gould et al. |
| 6,088,731 A | 7/2000 | Kiraly et al. |
| 6,092,043 A | 7/2000 | Squires et al. |
| 6,094,649 A | 7/2000 | Bowen et al. |
| 6,097,391 A | 8/2000 | Wilcox |
| 6,101,468 A | 8/2000 | Gould et al. |
| 6,101,470 A | 8/2000 | Eide et al. |
| 6,105,865 A | 8/2000 | Hardesty |
| 6,108,627 A | 8/2000 | Sabourin |
| 6,111,562 A | 8/2000 | Downs et al. |
| 6,116,907 A | 9/2000 | Baker et al. |
| 6,119,101 A | 9/2000 | Peckover |
| 6,121,960 A | 9/2000 | Carroll et al. |
| 6,122,340 A | 9/2000 | Darley et al. |
| 6,122,614 A | 9/2000 | Kahn et al. |
| 6,122,616 A | 9/2000 | Henton |
| 6,125,284 A | 9/2000 | Moore et al. |
| 6,125,346 A | 9/2000 | Nishimura et al. |
| 6,125,356 A | 9/2000 | Brockman et al. |
| 6,129,582 A | 10/2000 | Wilhite et al. |
| 6,138,098 A | 10/2000 | Shieber et al. |
| 6,141,642 A | 10/2000 | Oh |
| 6,141,644 A | 10/2000 | Kuhn et al. |
| 6,144,377 A | 11/2000 | Oppermann et al. |
| 6,144,938 A | 11/2000 | Surace et al. |
| 6,144,939 A | 11/2000 | Pearson et al. |
| 6,151,401 A | 11/2000 | Annaratone |
| 6,154,551 A | 11/2000 | Frenkel |
| 6,154,720 A | 11/2000 | Onishi et al. |
| 6,157,935 A | 12/2000 | Tran et al. |
| 6,161,084 A | 12/2000 | Messerly et al. |
| 6,161,087 A | 12/2000 | Wightman et al. |
| 6,161,944 A | 12/2000 | Leman |
| 6,163,769 A | 12/2000 | Acero et al. |
| 6,163,809 A | 12/2000 | Buckley |
| 6,167,369 A | 12/2000 | Schulze |
| 6,169,538 B1 | 1/2001 | Nowlan et al. |
| 6,172,948 B1 | 1/2001 | Keller et al. |
| 6,173,194 B1 | 1/2001 | Vanttila |
| 6,173,251 B1 | 1/2001 | Ito et al. |
| 6,173,261 B1 | 1/2001 | Arai et al. |
| 6,173,263 B1 | 1/2001 | Conkie |
| 6,173,279 B1 | 1/2001 | Levin et al. |
| 6,177,905 B1 | 1/2001 | Welch |
| 6,177,931 B1 | 1/2001 | Alexander et al. |
| 6,179,432 B1 | 1/2001 | Zhang et al. |
| 6,182,028 B1 | 1/2001 | Karaali et al. |
| 6,185,533 B1 | 2/2001 | Holm et al. |
| 6,188,999 B1 | 2/2001 | Moody |
| 6,191,939 B1 | 2/2001 | Burnett |
| 6,192,253 B1 | 2/2001 | Charlier et al. |
| 6,192,340 B1 | 2/2001 | Abecassis |
| 6,195,641 B1 | 2/2001 | Loring et al. |
| 6,205,456 B1 | 3/2001 | Nakao |
| 6,208,044 B1 | 3/2001 | Viswanadham et al. |
| 6,208,956 B1 | 3/2001 | Motoyama |
| 6,208,964 B1 | 3/2001 | Sabourin |
| 6,208,967 B1 | 3/2001 | Pauws et al. |
| 6,208,971 B1 | 3/2001 | Bellegarda et al. |
| 6,216,102 B1 | 4/2001 | Martino et al. |
| 6,216,131 B1 | 4/2001 | Liu et al. |
| 6,217,183 B1 | 4/2001 | Shipman |
| 6,222,347 B1 | 4/2001 | Gong |
| 6,226,403 B1 | 5/2001 | Parthasarathy |
| 6,226,533 B1 | 5/2001 | Akahane |
| 6,226,614 B1 | 5/2001 | Mizuno et al. |
| 6,230,322 B1 | 5/2001 | Saib et al. |
| 6,232,539 B1 | 5/2001 | Looney et al. |
| 6,232,966 B1 | 5/2001 | Kurlander |
| 6,233,545 B1 | 5/2001 | Datig |
| 6,233,559 B1 | 5/2001 | Balakrishnan |
| 6,233,578 B1 | 5/2001 | Machihara et al. |
| 6,237,025 B1 | 5/2001 | Ludwig et al. |
| 6,240,303 B1 | 5/2001 | Katzur |
| 6,243,681 B1 | 6/2001 | Guji et al. |
| 6,246,981 B1 | 6/2001 | Papineni et al. |
| 6,248,946 B1 | 6/2001 | Dwek |
| 6,249,606 B1 | 6/2001 | Kiraly et al. |
| 6,259,436 B1 | 7/2001 | Moon et al. |
| 6,259,826 B1 | 7/2001 | Pollard et al. |
| 6,260,011 B1 | 7/2001 | Heckerman et al. |
| 6,260,013 B1 | 7/2001 | Sejnoha |
| 6,260,016 B1 | 7/2001 | Holm et al. |
| 6,260,024 B1 | 7/2001 | Shkedy |
| 6,266,637 B1 | 7/2001 | Donovan et al. |
| 6,268,859 B1 | 7/2001 | Andresen et al. |
| 6,269,712 B1 | 8/2001 | Zentmyer |
| 6,271,835 B1 | 8/2001 | Hoeksma |
| 6,272,456 B1 | 8/2001 | De Campos |
| 6,272,464 B1 | 8/2001 | Kiraz et al. |
| 6,275,795 B1 | 8/2001 | Tzirkel-Hancock |
| 6,275,824 B1 | 8/2001 | O'Flaherty et al. |
| 6,278,970 B1 | 8/2001 | Milner |
| 6,282,507 B1 | 8/2001 | Horiguchi et al. |
| 6,285,785 B1 | 9/2001 | Bellegarda et al. |
| 6,285,786 B1 | 9/2001 | Seni et al. |
| 6,289,085 B1 | 9/2001 | Miyashita et al. |
| 6,289,124 B1 | 9/2001 | Okamoto |
| 6,289,301 B1 | 9/2001 | Higginbotham et al. |
| 6,289,353 B1 | 9/2001 | Hazlehurst et al. |
| 6,292,772 B1 | 9/2001 | Kantrowitz |
| 6,292,778 B1 | 9/2001 | Sukkar |
| 6,295,390 B1 | 9/2001 | Kobayashi et al. |
| 6,295,541 B1 | 9/2001 | Bodnar et al. |
| 6,297,818 B1 | 10/2001 | Ulrich et al. |
| 6,298,314 B1 | 10/2001 | Blackadar et al. |
| 6,298,321 B1 | 10/2001 | Karlov et al. |
| 6,304,844 B1 | 10/2001 | Pan et al. |
| 6,304,846 B1 | 10/2001 | George et al. |
| 6,307,548 B1 | 10/2001 | Flinchem et al. |
| 6,308,149 B1 | 10/2001 | Gaussier et al. |
| 6,311,157 B1 | 10/2001 | Strong |
| 6,311,189 B1 | 10/2001 | deVries et al. |
| 6,317,237 B1 | 11/2001 | Nakao et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,324,512 B1 | 11/2001 | Junqua et al. |
| 6,330,538 B1 | 12/2001 | Breen |
| 6,332,175 B1 | 12/2001 | Birrell et al. |
| 6,334,103 B1 | 12/2001 | Surace et al. |
| 6,335,722 B1 | 1/2002 | Tani et al. |
| 6,336,365 B1 | 1/2002 | Blackadar et al. |
| 6,336,727 B1 | 1/2002 | Kim |
| 6,340,937 B1 | 1/2002 | Stepita-Klauco |
| 6,341,316 B1 | 1/2002 | Kloba et al. |
| 6,343,267 B1 | 1/2002 | Kuhn et al. |
| 6,345,250 B1 | 2/2002 | Martin |
| 6,351,522 B1 | 2/2002 | Vitikainen |

(56) References Cited

U.S. PATENT DOCUMENTS

| | | |
|---|---|---|
| 6,351,762 B1 | 2/2002 | Ludwig et al. |
| 6,353,442 B1 | 3/2002 | Masui |
| 6,353,794 B1 | 3/2002 | Davis et al. |
| 6,356,854 B1 | 3/2002 | Schubert et al. |
| 6,356,864 B1 | 3/2002 | Foltz et al. |
| 6,356,905 B1 | 3/2002 | Gershman et al. |
| 6,357,147 B1 | 3/2002 | Darley et al. |
| 6,359,572 B1 | 3/2002 | Vale |
| 6,359,970 B1 | 3/2002 | Burgess |
| 6,360,227 B1 | 3/2002 | Aggarwal et al. |
| 6,360,237 B1 | 3/2002 | Schulz et al. |
| 6,366,883 B1 | 4/2002 | Campbell et al. |
| 6,366,884 B1 | 4/2002 | Bellegarda et al. |
| 6,374,217 B1 | 4/2002 | Bellegarda |
| 6,377,530 B1 | 4/2002 | Burrows |
| 6,377,925 B1 | 4/2002 | Greene, Jr. et al. |
| 6,377,928 B1 | 4/2002 | Saxena et al. |
| 6,385,586 B1 | 5/2002 | Dietz |
| 6,385,662 B1 | 5/2002 | Moon et al. |
| 6,389,114 B1 | 5/2002 | Dowens et al. |
| 6,397,183 B1 | 5/2002 | Baba et al. |
| 6,397,186 B1 | 5/2002 | Bush et al. |
| 6,401,065 B1 | 6/2002 | Kanevsky et al. |
| 6,405,169 B1 | 6/2002 | Kondo et al. |
| 6,408,272 B1 | 6/2002 | White et al. |
| 6,411,932 B1 | 6/2002 | Molnar et al. |
| 6,415,250 B1 | 7/2002 | Van Den Akker |
| 6,421,305 B1 | 7/2002 | Gioscia et al. |
| 6,421,672 B1 | 7/2002 | McAllister et al. |
| 6,421,707 B1 | 7/2002 | Miller et al. |
| 6,424,944 B1 | 7/2002 | Hikawa |
| 6,430,551 B1 | 8/2002 | Thelen et al. |
| 6,434,522 B1 | 8/2002 | Tsuboka |
| 6,434,524 B1 | 8/2002 | Weber |
| 6,434,604 B1 | 8/2002 | Harada et al. |
| 6,437,818 B1 | 8/2002 | Ludwig et al. |
| 6,438,523 B1 | 8/2002 | Oberteuffer et al. |
| 6,442,518 B1 | 8/2002 | Van Thong et al. |
| 6,442,523 B1 | 8/2002 | Siegel |
| 6,446,076 B1 | 9/2002 | Burkey et al. |
| 6,448,485 B1 | 9/2002 | Barile |
| 6,448,986 B1 | 9/2002 | Smith |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,453,315 B1 | 9/2002 | Weissman et al. |
| 6,456,616 B1 | 9/2002 | Rantanen |
| 6,456,972 B1 | 9/2002 | Gladstein et al. |
| 6,460,015 B1 | 10/2002 | Hetherington et al. |
| 6,460,029 B1 | 10/2002 | Fries et al. |
| 6,462,778 B1 | 10/2002 | Abram et al. |
| 6,463,128 B1 | 10/2002 | Elwin |
| 6,466,654 B1 | 10/2002 | Cooper et al. |
| 6,467,924 B2 | 10/2002 | Shipman |
| 6,469,712 B1 | 10/2002 | Hilpert, Jr. et al. |
| 6,469,722 B1 | 10/2002 | Kinoe et al. |
| 6,469,732 B1 | 10/2002 | Chang et al. |
| 6,470,347 B1 | 10/2002 | Gillam |
| 6,473,630 B1 | 10/2002 | Baranowski et al. |
| 6,477,488 B1 | 11/2002 | Bellegarda |
| 6,477,494 B2 | 11/2002 | Hyde-Thomson et al. |
| 6,487,533 B2 | 11/2002 | Hyde-Thomson et al. |
| 6,487,534 B1 | 11/2002 | Thelen et al. |
| 6,487,663 B1 | 11/2002 | Jaisimha et al. |
| 6,489,951 B1 | 12/2002 | Wong et al. |
| 6,490,560 B1 | 12/2002 | Ramaswamy et al. |
| 6,493,428 B1 | 12/2002 | Hillier |
| 6,493,652 B1 | 12/2002 | Ohlenbusch et al. |
| 6,493,667 B1 | 12/2002 | De Souza et al. |
| 6,499,013 B1 | 12/2002 | Weber |
| 6,499,014 B1 | 12/2002 | Chihara |
| 6,501,937 B1 | 12/2002 | Ho et al. |
| 6,502,194 B1 | 12/2002 | Berman et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,406 B1 | 1/2003 | Marchisio |
| 6,510,417 B1 | 1/2003 | Woods et al. |
| 6,513,008 B2 | 1/2003 | Pearson et al. |
| 6,513,063 B1 | 1/2003 | Julia et al. |
| 6,519,565 B1 | 2/2003 | Clements et al. |
| 6,519,566 B1 | 2/2003 | Boyer et al. |
| 6,523,026 B1 | 2/2003 | Gillis |
| 6,523,061 B1 | 2/2003 | Halverson et al. |
| 6,523,172 B1 | 2/2003 | Martinez-Guerra et al. |
| 6,526,351 B2 | 2/2003 | Whitham |
| 6,526,382 B1 | 2/2003 | Yuschik |
| 6,526,395 B1 | 2/2003 | Morris |
| 6,529,592 B1 | 3/2003 | Khan |
| 6,529,608 B2 | 3/2003 | Gersabeck et al. |
| 6,532,444 B1 | 3/2003 | Weber |
| 6,532,446 B1 | 3/2003 | King |
| 6,535,610 B1 | 3/2003 | Stewart |
| 6,535,852 B2 | 3/2003 | Eide |
| 6,535,983 B1 | 3/2003 | McCormack et al. |
| 6,536,139 B2 | 3/2003 | Darley et al. |
| 6,538,665 B2 | 3/2003 | Crow et al. |
| 6,542,171 B1 | 4/2003 | Satou et al. |
| 6,542,584 B1 | 4/2003 | Sherwood et al. |
| 6,546,262 B1 | 4/2003 | Freadman |
| 6,546,367 B2 | 4/2003 | Otsuka |
| 6,546,388 B1 | 4/2003 | Edlund et al. |
| 6,549,497 B2 | 4/2003 | Miyamoto et al. |
| 6,553,343 B1 | 4/2003 | Kagoshima et al. |
| 6,553,344 B2 | 4/2003 | Bellegarda et al. |
| 6,556,971 B1 | 4/2003 | Rigsby et al. |
| 6,556,983 B1 | 4/2003 | Altschuler et al. |
| 6,560,903 B1 | 5/2003 | Darley |
| 6,563,769 B1 | 5/2003 | Van Der Meulen |
| 6,564,186 B1 | 5/2003 | Kiraly et al. |
| 6,582,342 B2 | 6/2003 | Kaufman |
| 6,583,806 B2 | 6/2003 | Ludwig et al. |
| 6,584,464 B1 | 6/2003 | Warthen |
| 6,587,403 B1 | 7/2003 | Keller et al. |
| 6,587,404 B1 | 7/2003 | Keller et al. |
| 6,591,379 B1 | 7/2003 | LeVine et al. |
| 6,594,673 B1 | 7/2003 | Smith et al. |
| 6,594,688 B2 | 7/2003 | Ludwig et al. |
| 6,597,345 B2 | 7/2003 | Hirshberg |
| 6,598,021 B1 | 7/2003 | Shambaugh et al. |
| 6,598,022 B2 | 7/2003 | Yuschik |
| 6,598,039 B1 | 7/2003 | Livowsky |
| 6,598,054 B2 | 7/2003 | Schuetze et al. |
| 6,601,026 B2 | 7/2003 | Appelt et al. |
| 6,601,234 B1 | 7/2003 | Bowman-Amuah |
| 6,603,837 B1 | 8/2003 | Kesanupalli et al. |
| 6,604,059 B2 | 8/2003 | Strubbe et al. |
| 6,606,388 B1 | 8/2003 | Townsend et al. |
| 6,606,632 B1 | 8/2003 | Saulpaugh et al. |
| 6,611,789 B1 | 8/2003 | Darley |
| 6,615,172 B1 | 9/2003 | Bennett et al. |
| 6,615,175 B1 | 9/2003 | Gazdzinski |
| 6,615,176 B2 | 9/2003 | Lewis et al. |
| 6,615,220 B1 | 9/2003 | Austin et al. |
| 6,621,768 B1 | 9/2003 | Keller et al. |
| 6,621,892 B1 | 9/2003 | Banister et al. |
| 6,622,121 B1 | 9/2003 | Crepy et al. |
| 6,622,136 B2 | 9/2003 | Russell |
| 6,623,529 B1 | 9/2003 | Lakritz |
| 6,625,583 B1 | 9/2003 | Silverman et al. |
| 6,628,808 B1 | 9/2003 | Bach et al. |
| 6,631,186 B1 | 10/2003 | Adams et al. |
| 6,631,346 B1 | 10/2003 | Karaorman et al. |
| 6,633,846 B1 | 10/2003 | Bennett et al. |
| 6,633,932 B1 | 10/2003 | Bork et al. |
| 6,643,401 B1 | 11/2003 | Kashioka et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,658,389 B1 | 12/2003 | Alpdemir |
| 6,658,577 B2 | 12/2003 | Huppi et al. |
| 6,662,023 B1 | 12/2003 | Helle |
| 6,665,639 B2 | 12/2003 | Mozer et al. |
| 6,665,640 B1 | 12/2003 | Bennett et al. |

(56) References Cited

U.S. PATENT DOCUMENTS

| | | |
|---|---|---|
| 6,665,641 B1 | 12/2003 | Coorman et al. |
| 6,671,672 B1 | 12/2003 | Heck |
| 6,671,683 B2 | 12/2003 | Kanno |
| 6,671,856 B1 | 12/2003 | Gillam |
| 6,675,169 B1 | 1/2004 | Bennett et al. |
| 6,675,233 B1 | 1/2004 | Du et al. |
| 6,680,675 B1 | 1/2004 | Suzuki |
| 6,684,187 B1 | 1/2004 | Conkie |
| 6,684,376 B1 | 1/2004 | Kerzman et al. |
| 6,690,387 B2 | 2/2004 | Zimmerman et al. |
| 6,690,800 B2 | 2/2004 | Resnick |
| 6,690,828 B2 | 2/2004 | Meyers |
| 6,691,064 B2 | 2/2004 | Vroman |
| 6,691,090 B1 | 2/2004 | Laurila et al. |
| 6,691,111 B2 | 2/2004 | Lazaridis et al. |
| 6,691,151 B1 | 2/2004 | Cheyer et al. |
| 6,694,295 B2 | 2/2004 | Lindholm et al. |
| 6,694,297 B2 | 2/2004 | Sato |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,701,305 B1 | 3/2004 | Holt et al. |
| 6,701,318 B2 | 3/2004 | Fox et al. |
| 6,704,015 B1 | 3/2004 | Bovarnick et al. |
| 6,704,698 B1 | 3/2004 | Paulsen, Jr. et al. |
| 6,704,710 B2 | 3/2004 | Strong |
| 6,708,153 B2 | 3/2004 | Brittan et al. |
| 6,711,585 B1 | 3/2004 | Copperman et al. |
| 6,714,221 B1 | 3/2004 | Christie et al. |
| 6,716,139 B1 | 4/2004 | Hosseinzadeh-Dolkhani et al. |
| 6,718,324 B2 | 4/2004 | Edlund et al. |
| 6,718,331 B2 | 4/2004 | Davis et al. |
| 6,720,980 B1 | 4/2004 | Lui et al. |
| 6,721,728 B2 | 4/2004 | McGreevy |
| 6,721,734 B1 | 4/2004 | Subasic et al. |
| 6,724,370 B2 | 4/2004 | Dutta et al. |
| 6,728,675 B1 | 4/2004 | Maddalozzo, Jr. et al. |
| 6,728,729 B1 | 4/2004 | Jawa et al. |
| 6,731,312 B2 | 5/2004 | Robbin |
| 6,732,142 B1 | 5/2004 | Bates et al. |
| 6,735,632 B1 | 5/2004 | Kiraly et al. |
| 6,738,738 B2 | 5/2004 | Henton |
| 6,741,264 B1 | 5/2004 | Lesser |
| 6,742,021 B1 | 5/2004 | Halverson et al. |
| 6,751,592 B1 | 6/2004 | Shiga |
| 6,751,595 B2 | 6/2004 | Busayapongchai et al. |
| 6,751,621 B1 | 6/2004 | Calistri-Yeh et al. |
| 6,754,504 B1 | 6/2004 | Reed |
| 6,757,362 B1 | 6/2004 | Cooper et al. |
| 6,757,365 B1 | 6/2004 | Bogard |
| 6,757,646 B2 | 6/2004 | Marchisio |
| 6,757,653 B2 | 6/2004 | Buth et al. |
| 6,757,718 B1 | 6/2004 | Halverson et al. |
| 6,760,412 B1 | 7/2004 | Loucks |
| 6,760,700 B2 | 7/2004 | Lewis et al. |
| 6,760,754 B1 | 7/2004 | Isaacs et al. |
| 6,762,741 B2 | 7/2004 | Weindorf |
| 6,763,089 B2 | 7/2004 | Feigenbaum |
| 6,766,294 B2 | 7/2004 | MacGinite et al. |
| 6,766,320 B1 | 7/2004 | Wang et al. |
| 6,766,324 B2 | 7/2004 | Carlson et al. |
| 6,768,979 B1 | 7/2004 | Menendez-Pidal et al. |
| 6,772,123 B2 | 8/2004 | Cooklev et al. |
| 6,772,195 B1 | 8/2004 | Hatlelid et al. |
| 6,775,358 B1 | 8/2004 | Breitenbach et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,778,979 B2 | 8/2004 | Grefenstette et al. |
| 6,782,510 B1 | 8/2004 | Gross et al. |
| 6,784,901 B1 | 8/2004 | Harvey et al. |
| 6,789,094 B2 | 9/2004 | Rudoff et al. |
| 6,789,231 B1 | 9/2004 | Reynar et al. |
| 6,790,704 B2 | 9/2004 | Doyle et al. |
| 6,792,082 B1 | 9/2004 | Levine |
| 6,792,086 B1 | 9/2004 | Saylor et al. |
| 6,792,407 B2 | 9/2004 | Kibre et al. |
| 6,794,566 B2 | 9/2004 | Pachet |
| 6,795,059 B2 | 9/2004 | Endo |
| 6,799,226 B1 | 9/2004 | Robbin et al. |
| 6,801,604 B2 | 10/2004 | Maes et al. |
| 6,801,964 B1 | 10/2004 | Mahdavi |
| 6,803,905 B1 | 10/2004 | Capps et al. |
| 6,804,649 B2 | 10/2004 | Miranda |
| 6,804,677 B2 | 10/2004 | Shadmon et al. |
| 6,807,536 B2 | 10/2004 | Achlioptas et al. |
| 6,807,574 B1 | 10/2004 | Partovi et al. |
| 6,810,379 B1 | 10/2004 | Vermeulen et al. |
| 6,813,218 B1 | 11/2004 | Antonelli et al. |
| 6,813,491 B1 | 11/2004 | McKinney |
| 6,813,607 B1 | 11/2004 | Faruquie et al. |
| 6,816,578 B1 | 11/2004 | Kredo et al. |
| 6,820,055 B2 | 11/2004 | Saindon et al. |
| 6,829,018 B2 | 12/2004 | Lin et al. |
| 6,829,603 B1 | 12/2004 | Chai et al. |
| 6,832,194 B1 | 12/2004 | Mozer et al. |
| 6,832,381 B1 | 12/2004 | Mathur et al. |
| 6,836,760 B1 | 12/2004 | Bellegarda et al. |
| 6,839,464 B2 | 1/2005 | Hawkins et al. |
| 6,839,669 B1 | 1/2005 | Gould et al. |
| 6,839,670 B1 | 1/2005 | Stammler et al. |
| 6,839,742 B1 | 1/2005 | Dyer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,850,775 B1 | 2/2005 | Berg |
| 6,850,887 B2 | 2/2005 | Epstein et al. |
| 6,851,115 B1 | 2/2005 | Cheyer et al. |
| 6,857,800 B2 | 2/2005 | Zhang et al. |
| 6,859,931 B1 | 2/2005 | Cheyer et al. |
| 6,862,568 B2 | 3/2005 | Case |
| 6,862,710 B1 | 3/2005 | Marchisio |
| 6,865,533 B2 | 3/2005 | Addison et al. |
| 6,868,045 B1 | 3/2005 | Schroder |
| 6,868,385 B1 | 3/2005 | Gerson |
| 6,870,529 B1 | 3/2005 | Davis |
| 6,871,346 B1 | 3/2005 | Kumbalimutt et al. |
| 6,873,986 B2 | 3/2005 | McConnell et al. |
| 6,876,947 B1 | 4/2005 | Darley et al. |
| 6,877,003 B2 | 4/2005 | Ho et al. |
| 6,879,957 B1 | 4/2005 | Pechter et al. |
| 6,882,335 B2 | 4/2005 | Saarinen |
| 6,882,747 B2 | 4/2005 | Thawonmas et al. |
| 6,882,955 B1 | 4/2005 | Ohlenbusch et al. |
| 6,882,971 B2 | 4/2005 | Craner |
| 6,885,734 B1 | 4/2005 | Eberle et al. |
| 6,889,361 B1 | 5/2005 | Bates et al. |
| 6,895,084 B1 | 5/2005 | Saylor et al. |
| 6,895,257 B2 | 5/2005 | Boman et al. |
| 6,895,380 B2 | 5/2005 | Sepe, Jr. |
| 6,895,558 B1 | 5/2005 | Loveland |
| 6,898,550 B1 | 5/2005 | Blackadar et al. |
| 6,901,364 B2 | 5/2005 | Nguyen et al. |
| 6,901,399 B1 | 5/2005 | Corston et al. |
| 6,904,405 B2 | 6/2005 | Suominen |
| 6,907,112 B1 | 6/2005 | Guedalia et al. |
| 6,910,004 B2 | 6/2005 | Tarbouriech et al. |
| 6,910,007 B2 | 6/2005 | Stylianou et al. |
| 6,910,186 B2 | 6/2005 | Kim |
| 6,911,971 B2 | 6/2005 | Suzuki et al. |
| 6,912,407 B1 | 6/2005 | Clarke et al. |
| 6,912,498 B2 | 6/2005 | Stevens et al. |
| 6,912,499 B1 | 6/2005 | Sabourin et al. |
| 6,915,138 B2 | 7/2005 | Kraft |
| 6,915,246 B2 | 7/2005 | Gusler et al. |
| 6,917,373 B2 | 7/2005 | Vong et al. |
| 6,918,677 B2 | 7/2005 | Shipman |
| 6,924,828 B1 | 8/2005 | Hirsch |
| 6,925,438 B2 | 8/2005 | Mohamed et al. |
| 6,928,149 B1 | 8/2005 | Panjwani et al. |
| 6,928,614 B1 | 8/2005 | Everhart |
| 6,931,255 B2 | 8/2005 | Mekuria |
| 6,931,384 B1 | 8/2005 | Horvitz et al. |

(56) References Cited

U.S. PATENT DOCUMENTS

| | | |
|---|---|---|
| 6,932,708 B2 | 8/2005 | Yamashita et al. |
| 6,934,394 B1 | 8/2005 | Anderson |
| 6,934,684 B2 | 8/2005 | Alpdemir et al. |
| 6,934,756 B2 | 8/2005 | Maes |
| 6,934,812 B1 | 8/2005 | Robbin et al. |
| 6,937,975 B1 | 8/2005 | Elworthy |
| 6,937,986 B2 | 8/2005 | Denenberg et al. |
| 6,944,593 B2 | 9/2005 | Kuzunuki et al. |
| 6,948,094 B2 | 9/2005 | Schultz et al. |
| 6,950,087 B2 | 9/2005 | Knox et al. |
| 6,950,502 B1 | 9/2005 | Jenkins |
| 6,954,755 B2 | 10/2005 | Reisman |
| 6,954,899 B1 | 10/2005 | Anderson |
| 6,956,845 B2 | 10/2005 | Baker et al. |
| 6,957,076 B2 | 10/2005 | Hunzinger |
| 6,960,734 B1 | 11/2005 | Park |
| 6,961,699 B1 | 11/2005 | Kahn et al. |
| 6,963,841 B2 | 11/2005 | Handal et al. |
| 6,964,023 B2 | 11/2005 | Maes et al. |
| 6,965,376 B2 | 11/2005 | Tani et al. |
| 6,968,311 B2 | 11/2005 | Knockeart et al. |
| 6,970,820 B2 | 11/2005 | Junqua et al. |
| 6,970,881 B1 | 11/2005 | Mohan et al. |
| 6,970,915 B1 | 11/2005 | Partovi et al. |
| 6,970,935 B1 | 11/2005 | Maes |
| 6,976,090 B2 | 12/2005 | Ben-Shaul et al. |
| 6,978,127 B1 | 12/2005 | Bulthuis et al. |
| 6,978,239 B2 | 12/2005 | Chu et al. |
| 6,980,949 B2 | 12/2005 | Ford |
| 6,980,955 B2 | 12/2005 | Okutani et al. |
| 6,983,251 B1 | 1/2006 | Umemoto et al. |
| 6,985,858 B2 | 1/2006 | Frey et al. |
| 6,985,865 B1 | 1/2006 | Packingham et al. |
| 6,988,071 B1 | 1/2006 | Gazdzinski |
| 6,990,450 B2 | 1/2006 | Case et al. |
| 6,996,520 B2 | 2/2006 | Levin |
| 6,996,531 B2 | 2/2006 | Korall et al. |
| 6,996,575 B2 | 2/2006 | Cox et al. |
| 6,999,066 B2 | 2/2006 | Litwiller |
| 6,999,914 B1 | 2/2006 | Boerner et al. |
| 6,999,925 B2 | 2/2006 | Fischer et al. |
| 6,999,927 B2 | 2/2006 | Mozer et al. |
| 7,000,189 B2 | 2/2006 | Dutta et al. |
| 7,003,099 B1 | 2/2006 | Zhang et al. |
| 7,003,463 B1 | 2/2006 | Maes et al. |
| 7,007,239 B1 | 2/2006 | Hawkins et al. |
| 7,010,581 B2 | 3/2006 | Brown et al. |
| 7,013,289 B2 | 3/2006 | Horn et al. |
| 7,013,429 B2 | 3/2006 | Fujimoto et al. |
| 7,020,685 B1 | 3/2006 | Chen et al. |
| 7,024,363 B1 | 4/2006 | Comerford et al. |
| 7,024,364 B2 | 4/2006 | Guerra et al. |
| 7,024,366 B1 | 4/2006 | Deyoe et al. |
| 7,024,460 B2 | 4/2006 | Koopmas et al. |
| 7,027,568 B1 | 4/2006 | Simpson et al. |
| 7,027,974 B1 | 4/2006 | Busch et al. |
| 7,027,990 B2 | 4/2006 | Sussman |
| 7,028,252 B1 | 4/2006 | Baru et al. |
| 7,031,530 B2 | 4/2006 | Driggs et al. |
| 7,031,909 B2 | 4/2006 | Mao et al. |
| 7,035,794 B2 | 4/2006 | Sirivara |
| 7,035,801 B2 | 4/2006 | Jimenez-Feltstrom |
| 7,035,807 B1 | 4/2006 | Brittain et al. |
| 7,036,128 B1 | 4/2006 | Julia et al. |
| 7,038,659 B2 | 5/2006 | Rajkowski |
| 7,039,588 B2 | 5/2006 | Okutani et al. |
| 7,043,420 B2 | 5/2006 | Ratnaparkhi |
| 7,043,422 B2 | 5/2006 | Gao et al. |
| 7,046,230 B2 | 5/2006 | Zadesky et al. |
| 7,046,850 B2 | 5/2006 | Braspenning et al. |
| 7,047,193 B1 | 5/2006 | Bellegarda |
| 7,050,976 B1 | 5/2006 | Packingham |
| 7,050,977 B1 | 5/2006 | Bennett |
| 7,051,096 B1 | 5/2006 | Krawiec et al. |
| 7,054,419 B2 | 5/2006 | Culliss |
| 7,054,888 B2 | 5/2006 | LaChapelle et al. |
| 7,057,607 B2 | 6/2006 | Mayoraz et al. |
| 7,058,569 B2 | 6/2006 | Coorman et al. |
| 7,058,888 B1 | 6/2006 | Gjerstad et al. |
| 7,058,889 B2 | 6/2006 | Trovato et al. |
| 7,062,223 B2 | 6/2006 | Gerber et al. |
| 7,062,225 B2 | 6/2006 | White |
| 7,062,428 B2 | 6/2006 | Hogenhout et al. |
| 7,062,438 B2 | 6/2006 | Kobayashi et al. |
| 7,065,185 B1 | 6/2006 | Koch |
| 7,065,485 B1 | 6/2006 | Chong-White et al. |
| 7,069,213 B2 | 6/2006 | Thompson |
| 7,069,220 B2 | 6/2006 | Coffman et al. |
| 7,069,560 B1 | 6/2006 | Cheyer et al. |
| 7,072,686 B1 | 7/2006 | Schrager |
| 7,072,941 B2 | 7/2006 | Griffin et al. |
| 7,076,527 B2 | 7/2006 | Bellegarda et al. |
| 7,082,322 B2 | 7/2006 | Harano |
| 7,084,758 B1 | 8/2006 | Cole |
| 7,084,856 B2 | 8/2006 | Huppi |
| 7,085,723 B2 | 8/2006 | Ross et al. |
| 7,085,960 B2 | 8/2006 | Bouat et al. |
| 7,092,370 B2 | 8/2006 | Jiang et al. |
| 7,092,887 B2 | 8/2006 | Mozer et al. |
| 7,092,928 B1 | 8/2006 | Elad et al. |
| 7,092,950 B2 | 8/2006 | Wong et al. |
| 7,093,693 B1 | 8/2006 | Gazdzinski |
| 7,095,733 B1 | 8/2006 | Yarlagadda et al. |
| 7,096,183 B2 | 8/2006 | Junqua |
| 7,103,548 B2 | 9/2006 | Squibbs et al. |
| 7,107,204 B1 | 9/2006 | Liu et al. |
| 7,111,248 B2 | 9/2006 | Mulvey et al. |
| 7,113,803 B2 | 9/2006 | Dehlin |
| 7,113,943 B2 | 9/2006 | Bradford et al. |
| 7,115,035 B2 | 10/2006 | Tanaka |
| 7,117,231 B2 | 10/2006 | Fischer et al. |
| 7,123,696 B2 | 10/2006 | Lowe |
| 7,124,081 B1 | 10/2006 | Bellegarda |
| 7,124,082 B2 | 10/2006 | Freedman |
| 7,124,164 B1 | 10/2006 | Chemtob |
| 7,127,046 B1 | 10/2006 | Smith et al. |
| 7,127,396 B2 | 10/2006 | Chu et al. |
| 7,127,403 B1 | 10/2006 | Saylor et al. |
| 7,133,900 B1 | 11/2006 | Szeto |
| 7,136,710 B1 | 11/2006 | Hoffberg et al. |
| 7,136,818 B1 | 11/2006 | Cosatto et al. |
| 7,137,126 B1 | 11/2006 | Coffman et al. |
| 7,139,697 B2 | 11/2006 | Häkkinen et al. |
| 7,139,714 B2 | 11/2006 | Bennett et al. |
| 7,139,722 B2 | 11/2006 | Perrella et al. |
| 7,143,028 B2 | 11/2006 | Hillis et al. |
| 7,143,038 B2 | 11/2006 | Katae |
| 7,143,040 B2 | 11/2006 | Durston et al. |
| 7,146,319 B2 | 12/2006 | Hunt |
| 7,146,437 B2 | 12/2006 | Robbin et al. |
| 7,149,319 B2 | 12/2006 | Roeck |
| 7,149,695 B1 | 12/2006 | Bellegarda |
| 7,149,964 B1 | 12/2006 | Cottrille et al. |
| 7,152,070 B1 | 12/2006 | Musick et al. |
| 7,152,093 B2 | 12/2006 | Ludwig et al. |
| 7,154,526 B2 | 12/2006 | Foote et al. |
| 7,155,668 B2 | 12/2006 | Holland et al. |
| 7,158,647 B2 | 1/2007 | Azima et al. |
| 7,159,174 B2 | 1/2007 | Johnson et al. |
| 7,162,412 B2 | 1/2007 | Yamada et al. |
| 7,162,482 B1 | 1/2007 | Dunning |
| 7,165,073 B2 | 1/2007 | Vandersluis |
| 7,166,791 B2 | 1/2007 | Robbin et al. |
| 7,171,360 B2 | 1/2007 | Huang et al. |
| 7,174,295 B1 | 2/2007 | Kivimaki |
| 7,174,297 B2 | 2/2007 | Guerra et al. |
| 7,177,794 B2 | 2/2007 | Mani et al. |
| 7,177,798 B2 | 2/2007 | Hsu et al. |
| 7,177,817 B1 | 2/2007 | Khosla et al. |
| 7,181,386 B2 | 2/2007 | Mohri et al. |
| 7,181,388 B2 | 2/2007 | Tian |
| 7,185,276 B2 | 2/2007 | Keswa |
| 7,188,085 B2 | 3/2007 | Pelletier |
| 7,190,794 B2 | 3/2007 | Hinde |

(56) References Cited

U.S. PATENT DOCUMENTS

| | | |
|---|---|---|
| 7,191,118 B2 | 3/2007 | Bellegarda |
| 7,191,131 B1 | 3/2007 | Nagao |
| 7,193,615 B2 | 3/2007 | Kim et al. |
| 7,194,186 B1 | 3/2007 | Strub et al. |
| 7,194,413 B2 | 3/2007 | Mahoney et al. |
| 7,194,471 B1 | 3/2007 | Nagatsuka et al. |
| 7,194,611 B2 | 3/2007 | Bear et al. |
| 7,194,699 B2 | 3/2007 | Thomson et al. |
| 7,197,120 B2 | 3/2007 | Luehrig et al. |
| 7,197,460 B1 | 3/2007 | Gupta et al. |
| 7,200,550 B2 | 4/2007 | Menezes et al. |
| 7,200,558 B2 | 4/2007 | Kato et al. |
| 7,200,559 B2 | 4/2007 | Wang |
| 7,203,646 B2 | 4/2007 | Bennett |
| 7,206,809 B2 | 4/2007 | Ludwig et al. |
| 7,216,008 B2 | 5/2007 | Sakata |
| 7,216,073 B2 | 5/2007 | Lavi et al. |
| 7,216,080 B2 | 5/2007 | Tsiao et al. |
| 7,218,920 B2 | 5/2007 | Hyon |
| 7,218,943 B2 | 5/2007 | Klassen et al. |
| 7,219,063 B2 | 5/2007 | Schalk et al. |
| 7,219,123 B1 | 5/2007 | Fiechter et al. |
| 7,225,125 B2 | 5/2007 | Bennett et al. |
| 7,228,278 B2 | 6/2007 | Nguyen et al. |
| 7,231,343 B1 | 6/2007 | Treadgold et al. |
| 7,233,790 B2 | 6/2007 | Kjellberg et al. |
| 7,233,904 B2 | 6/2007 | Luisi |
| 7,234,026 B2 | 6/2007 | Robbin et al. |
| 7,236,932 B1 | 6/2007 | Grajski |
| 7,240,002 B2 | 7/2007 | Minamino et al. |
| 7,243,305 B2 | 7/2007 | Schabes et al. |
| 7,246,151 B2 | 7/2007 | Isaacs et al. |
| 7,251,454 B2 | 7/2007 | White |
| 7,254,773 B2 | 8/2007 | Bates et al. |
| 7,260,529 B1 | 8/2007 | Lengen |
| 7,263,373 B2 | 8/2007 | Mattisson |
| 7,266,189 B1 | 9/2007 | Day |
| 7,266,495 B1 | 9/2007 | Beaufays et al. |
| 7,266,496 B2 | 9/2007 | Wang et al. |
| 7,266,499 B2 | 9/2007 | Surace et al. |
| 7,269,544 B2 | 9/2007 | Simske |
| 7,269,556 B2 | 9/2007 | Kiss et al. |
| 7,275,063 B2 | 9/2007 | Horn |
| 7,277,088 B2 | 10/2007 | Robinson et al. |
| 7,277,854 B2 | 10/2007 | Bennett et al. |
| 7,277,855 B1 | 10/2007 | Acker et al. |
| 7,280,958 B2 | 10/2007 | Pavlov et al. |
| 7,283,072 B1 | 10/2007 | Plachta et al. |
| 7,290,039 B1 | 10/2007 | Lisitsa et al. |
| 7,292,579 B2 | 11/2007 | Morris |
| 7,292,979 B2 | 11/2007 | Karas et al. |
| 7,299,033 B2 | 11/2007 | Kjellberg et al. |
| 7,302,392 B1 | 11/2007 | Thenthiruperai et al. |
| 7,302,686 B2 | 11/2007 | Togawa |
| 7,308,408 B1 | 12/2007 | Stifelman et al. |
| 7,310,329 B2 | 12/2007 | Vieri et al. |
| 7,310,600 B1 | 12/2007 | Garner et al. |
| 7,310,605 B2 | 12/2007 | Janakiraman et al. |
| 7,313,523 B1 | 12/2007 | Bellegarda et al. |
| 7,315,818 B2 | 1/2008 | Stevens et al. |
| 7,319,957 B2 | 1/2008 | Robinson et al. |
| 7,321,783 B2 | 1/2008 | Kim |
| 7,324,833 B2 | 1/2008 | White et al. |
| 7,324,947 B2 | 1/2008 | Jordan et al. |
| 7,328,155 B2 | 2/2008 | Endo et al. |
| 7,349,953 B2 | 3/2008 | Lisitsa et al. |
| 7,353,139 B1 | 4/2008 | Burrell et al. |
| 7,359,493 B1 | 4/2008 | Wang et al. |
| 7,359,671 B2 | 4/2008 | Richenstein et al. |
| 7,359,851 B2 | 4/2008 | Tong et al. |
| 7,362,738 B2 | 4/2008 | Taube et al. |
| 7,363,227 B2 | 4/2008 | Mapes-Riordan et al. |
| 7,365,260 B2 | 4/2008 | Kawashima |
| 7,366,461 B1 | 4/2008 | Brown |
| 7,373,612 B2 | 5/2008 | Risch et al. |
| 7,376,556 B2 | 5/2008 | Bennett |
| 7,376,632 B1 | 5/2008 | Sadek et al. |
| 7,376,645 B2 | 5/2008 | Bernard |
| 7,378,963 B1 | 5/2008 | Begault et al. |
| 7,379,874 B2 | 5/2008 | Schmid et al. |
| 7,380,203 B2 | 5/2008 | Keely et al. |
| 7,383,170 B2 | 6/2008 | Mills et al. |
| 7,386,449 B2 | 6/2008 | Sun et al. |
| 7,386,799 B1 | 6/2008 | Clanton et al. |
| 7,389,224 B1 | 6/2008 | Elworthy |
| 7,389,225 B1 | 6/2008 | Jensen et al. |
| 7,392,185 B2 | 6/2008 | Bennett |
| 7,394,947 B2 | 7/2008 | Li et al. |
| 7,398,209 B2 | 7/2008 | Kennewick et al. |
| 7,401,300 B2 | 7/2008 | Nurmi |
| 7,403,938 B2 | 7/2008 | Harrison et al. |
| 7,404,143 B2 | 7/2008 | Freelander et al. |
| 7,409,337 B1 | 8/2008 | Potter et al. |
| 7,409,347 B1 | 8/2008 | Bellegarda |
| 7,412,470 B2 | 8/2008 | Masuno et al. |
| 7,415,100 B2 | 8/2008 | Cooper et al. |
| 7,418,389 B2 | 8/2008 | Chu et al. |
| 7,418,392 B1 | 8/2008 | Mozer et al. |
| 7,426,467 B2 | 9/2008 | Nashida et al. |
| 7,426,468 B2 | 9/2008 | Coifman et al. |
| 7,427,024 B1 | 9/2008 | Gazdzinski et al. |
| 7,428,541 B2 | 9/2008 | Houle |
| 7,433,869 B2 | 10/2008 | Gollapudi |
| 7,433,921 B2 | 10/2008 | Ludwig et al. |
| 7,441,184 B2 | 10/2008 | Frerebeau et al. |
| 7,443,316 B2 | 10/2008 | Lim |
| 7,447,635 B1 | 11/2008 | Konopka et al. |
| 7,454,351 B2 | 11/2008 | Jeschke et al. |
| 7,460,652 B2 | 12/2008 | Chang |
| 7,467,087 B1 | 12/2008 | Gillick et al. |
| 7,467,164 B2 | 12/2008 | Marsh |
| 7,472,061 B1 | 12/2008 | Alewine et al. |
| 7,472,065 B2 | 12/2008 | Aaron et al. |
| 7,475,010 B2 | 1/2009 | Chao |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |
| 7,478,091 B2 | 1/2009 | Mojsilovic et al. |
| 7,478,129 B1 | 1/2009 | Chemtob |
| 7,483,832 B2 | 1/2009 | Tischer |
| 7,483,894 B2 | 1/2009 | Cao |
| 7,487,089 B2 | 2/2009 | Mozer |
| 7,487,093 B2 | 2/2009 | Mutsuno et al. |
| 7,490,034 B2 | 2/2009 | Finnigan et al. |
| 7,496,498 B2 | 2/2009 | Chu et al. |
| 7,496,512 B2 | 2/2009 | Zhao et al. |
| 7,499,923 B2 | 3/2009 | Kawatani |
| 7,502,738 B2 | 3/2009 | Kennewick et al. |
| 7,505,795 B1 | 3/2009 | Lim et al. |
| 7,508,324 B2 | 3/2009 | Suraqui |
| 7,508,373 B2 | 3/2009 | Lin et al. |
| 7,516,123 B2 | 4/2009 | Betz et al. |
| 7,519,327 B2 | 4/2009 | White |
| 7,522,927 B2 | 4/2009 | Fitch et al. |
| 7,523,036 B2 | 4/2009 | Akabane et al. |
| 7,523,108 B2 | 4/2009 | Cao |
| 7,526,466 B2 | 4/2009 | Au |
| 7,526,738 B2 | 4/2009 | Ording et al. |
| 7,528,713 B2 | 5/2009 | Singh et al. |
| 7,529,671 B2 | 5/2009 | Rockenbeck et al. |
| 7,529,676 B2 | 5/2009 | Koyama |
| 7,535,997 B1 | 5/2009 | McQuaide, Jr. et al. |
| 7,536,029 B2 | 5/2009 | Choi et al. |
| 7,536,565 B2 | 5/2009 | Girish et al. |
| 7,538,685 B1 | 5/2009 | Cooper et al. |
| 7,539,619 B1 | 5/2009 | Seligman et al. |
| 7,539,656 B2 | 5/2009 | Fratkina et al. |
| 7,541,940 B2 | 6/2009 | Upton |
| 7,542,967 B2 | 6/2009 | Hurst-Hiller et al. |
| 7,543,232 B2 | 6/2009 | Easton, Jr. et al. |
| 7,546,382 B2 | 6/2009 | Healey et al. |
| 7,546,529 B2 | 6/2009 | Reynar et al. |
| 7,548,895 B2 | 6/2009 | Pulsipher |

(56) References Cited

U.S. PATENT DOCUMENTS

| | | |
|---|---|---|
| 7,552,045 B2 | 6/2009 | Barliga et al. |
| 7,552,055 B2 | 6/2009 | Lecoeuche |
| 7,555,431 B2 | 6/2009 | Bennett |
| 7,555,496 B1 | 6/2009 | Lantrip et al. |
| 7,558,381 B1 | 7/2009 | Ali et al. |
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,565,104 B1 | 7/2009 | Brown et al. |
| 7,565,380 B1 | 7/2009 | Venkatachary |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,093 B2 | 9/2009 | Potter et al. |
| 7,593,868 B2 | 9/2009 | Margiloff et al. |
| 7,596,499 B2 | 9/2009 | Anguera et al. |
| 7,599,918 B2 | 10/2009 | Shen et al. |
| 7,603,381 B2 | 10/2009 | Burke et al. |
| 7,609,179 B2 | 10/2009 | Diaz-Gutierrez et al. |
| 7,613,264 B2 | 11/2009 | Wells et al. |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,624,007 B2 | 11/2009 | Bennett |
| 7,627,481 B1 | 12/2009 | Kuo et al. |
| 7,630,901 B2 | 12/2009 | Omi |
| 7,634,409 B2 | 12/2009 | Kennewick et al. |
| 7,634,413 B1 | 12/2009 | Kuo et al. |
| 7,636,657 B2 | 12/2009 | Ju et al. |
| 7,640,160 B2 | 12/2009 | Di Cristo et al. |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,656,393 B2 | 2/2010 | King et al. |
| 7,657,424 B2 | 2/2010 | Bennett |
| 7,664,558 B2 | 2/2010 | Lindahl et al. |
| 7,664,638 B2 | 2/2010 | Cooper et al. |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,408 B2 | 3/2010 | Chen et al. |
| 7,689,409 B2 | 3/2010 | Heinecke |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,721,301 B2 | 5/2010 | Wong et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,868 B2 | 7/2010 | Lee |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,204 B2 | 8/2010 | Mozer et al. |
| 7,774,388 B1 | 8/2010 | Runchey |
| 7,778,432 B2 | 8/2010 | Larsen |
| 7,778,595 B2 | 8/2010 | White et al. |
| 7,778,632 B2 | 8/2010 | Kurlander et al. |
| 7,779,353 B2 | 8/2010 | Grigoriu et al. |
| 7,783,283 B2 | 8/2010 | Kuusinen et al. |
| 7,783,486 B2 | 8/2010 | Rosser et al. |
| 7,797,265 B2 | 9/2010 | Brinker et al. |
| 7,797,269 B2 | 9/2010 | Rieman et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,291 B2 | 10/2010 | Ferguson et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,423 B2 | 11/2010 | Schubert |
| 7,831,426 B2 | 11/2010 | Bennett |
| 7,831,432 B2 | 11/2010 | Bodin et al. |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,869,999 B2 | 1/2011 | Amato et al. |
| 7,870,118 B2 | 1/2011 | Jiang et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,936 B2 | 2/2011 | Longe et al. |
| 7,885,844 B1 | 2/2011 | Cohen et al. |
| 7,890,330 B2 | 2/2011 | Ozkaragoz et al. |
| 7,890,652 B2 | 2/2011 | Bull et al. |
| 7,899,666 B2 | 3/2011 | Varone |
| 7,908,287 B1 | 3/2011 | Katragadda |
| 7,912,699 B1 | 3/2011 | Saraclar et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |

(56) References Cited

U.S. PATENT DOCUMENTS

| | | | |
|---|---|---|---|
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,941,009 B2 | 5/2011 | Li et al. |
| 7,949,529 B2 | 5/2011 | Weider et al. |
| 7,949,534 B2 | 5/2011 | Davis et al. |
| 7,953,679 B2 | 5/2011 | Chidlovskii et al. |
| 7,962,179 B2 | 6/2011 | Huang |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,244 B1 | 7/2011 | Lewis et al. |
| 7,991,614 B2 | 8/2011 | Washio et al. |
| 7,996,228 B2 | 8/2011 | Miller et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,019,271 B1 | 9/2011 | Izdepski |
| 8,024,195 B2 | 9/2011 | Mozer et al. |
| 8,027,836 B2 | 9/2011 | Baker et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,046,363 B2 | 10/2011 | Cha et al. |
| 8,050,500 B1 | 11/2011 | Batty et al. |
| 8,055,502 B2 | 11/2011 | Clark et al. |
| 8,055,708 B2 | 11/2011 | Chitsaz et al. |
| 8,065,143 B2 | 11/2011 | Yanagihara |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,122,353 B2 | 2/2012 | Bouta |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,335 B2 | 3/2012 | Kennewick et al. |
| 8,140,567 B2 | 3/2012 | Padovitz et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,170,790 B2 | 5/2012 | Lee et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,195,467 B2 | 6/2012 | Mozer et al. |
| 8,200,495 B2 | 6/2012 | Braho et al. |
| 8,204,238 B2 | 6/2012 | Mozer |
| 8,205,788 B1 | 6/2012 | Gazdzinski et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,239,207 B2 | 8/2012 | Seligman et al. |
| 8,255,217 B2 | 8/2012 | Stent et al. |
| 8,275,621 B2 | 9/2012 | Alewine et al. |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,383 B2 | 10/2012 | Lindahl |
| 8,301,456 B2 | 10/2012 | Gazdzinski |
| 8,311,834 B1 | 11/2012 | Gazdzinski |
| 8,332,224 B2 | 12/2012 | Di Cristo et al. |
| 8,345,665 B2 | 1/2013 | Vieri et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,380,504 B1 | 2/2013 | Peden et al. |
| 8,381,107 B2 | 2/2013 | Rottler et al. |
| 8,396,714 B2 | 3/2013 | Rogers et al. |
| 8,428,758 B2 | 4/2013 | Naik et al. |
| 8,447,612 B2 | 5/2013 | Gazdzinski |
| 8,498,857 B2 | 7/2013 | Kopparapu et al. |
| 8,521,513 B2 | 8/2013 | Millett et al. |
| 8,595,004 B2 | 11/2013 | Koshinaka |
| 8,620,659 B2 | 12/2013 | Di Cristo et al. |
| 8,645,137 B2 | 2/2014 | Bellegarda et al. |
| 8,660,849 B2 | 2/2014 | Gruber et al. |
| 8,660,970 B1 | 2/2014 | Fiedorowicz |
| 2001/0005859 A1 | 6/2001 | Okuyama et al. |
| 2001/0020259 A1 | 9/2001 | Sekiguchi et al. |
| 2001/0027396 A1 | 10/2001 | Sato |
| 2001/0029455 A1 | 10/2001 | Chin et al. |
| 2001/0030660 A1 | 10/2001 | Zainoulline |
| 2001/0032080 A1 | 10/2001 | Fukada |
| 2001/0041021 A1 | 11/2001 | Boyle et al. |
| 2001/0042107 A1 | 11/2001 | Palm |
| 2001/0044724 A1 | 11/2001 | Hon et al. |
| 2001/0047264 A1 | 11/2001 | Roundtree |
| 2001/0056342 A1 | 12/2001 | Piehn et al. |
| 2001/0056347 A1 | 12/2001 | Chazan et al. |
| 2002/0001395 A1 | 1/2002 | Davis et al. |
| 2002/0002039 A1 | 1/2002 | Qureshey et al. |
| 2002/0002413 A1 | 1/2002 | Tokue |
| 2002/0002461 A1 | 1/2002 | Tetsumoto |
| 2002/0004703 A1 | 1/2002 | Gaspard, II |
| 2002/0010581 A1 | 1/2002 | Euler et al. |
| 2002/0010584 A1 | 1/2002 | Schultz et al. |
| 2002/0010726 A1 | 1/2002 | Rogson |
| 2002/0010798 A1 | 1/2002 | Ben-Shaul et al. |
| 2002/0013784 A1 | 1/2002 | Swanson |
| 2002/0013852 A1 | 1/2002 | Janik |
| 2002/0015064 A1 | 2/2002 | Robotham et al. |
| 2002/0021278 A1 | 2/2002 | Hinckley et al. |
| 2002/0026315 A1 | 2/2002 | Miranda |
| 2002/0026456 A1 | 2/2002 | Bradford |
| 2002/0031254 A1 | 3/2002 | Lantrip et al. |
| 2002/0031262 A1 | 3/2002 | Imagawa et al. |
| 2002/0032564 A1 | 3/2002 | Ehsani et al. |
| 2002/0032751 A1 | 3/2002 | Bharadwaj |

(56) References Cited

U.S. PATENT DOCUMENTS

| | | |
|---|---|---|
| 2002/0035467 A1 | 3/2002 | Morimoto et al. |
| 2002/0035469 A1 | 3/2002 | Holzapfel |
| 2002/0035474 A1 | 3/2002 | Alpdemir |
| 2002/0040359 A1 | 4/2002 | Green et al. |
| 2002/0042707 A1 | 4/2002 | Zhao et al. |
| 2002/0045438 A1 | 4/2002 | Tagawa et al. |
| 2002/0045961 A1 | 4/2002 | Gibbs et al. |
| 2002/0046025 A1 | 4/2002 | Hain |
| 2002/0046315 A1 | 4/2002 | Miller et al. |
| 2002/0052730 A1 | 5/2002 | Nakao |
| 2002/0052740 A1 | 5/2002 | Charlesworth et al. |
| 2002/0052747 A1 | 5/2002 | Sarukkai |
| 2002/0054094 A1 | 5/2002 | Matsuda |
| 2002/0055844 A1 | 5/2002 | L'Esperance et al. |
| 2002/0055934 A1 | 5/2002 | Lipscomb et al. |
| 2002/0059066 A1 | 5/2002 | O'hagan |
| 2002/0059068 A1 | 5/2002 | Rose et al. |
| 2002/0065659 A1 | 5/2002 | Isono et al. |
| 2002/0067308 A1 | 6/2002 | Robertson |
| 2002/0069063 A1 | 6/2002 | Buchner et al. |
| 2002/0069220 A1 | 6/2002 | Tran |
| 2002/0072816 A1 | 6/2002 | Shdema et al. |
| 2002/0072908 A1 | 6/2002 | Case et al. |
| 2002/0077082 A1 | 6/2002 | Cruickshank |
| 2002/0077817 A1 | 6/2002 | Atal |
| 2002/0078041 A1 | 6/2002 | Wu |
| 2002/0080163 A1 | 6/2002 | Morey |
| 2002/0085037 A1 | 7/2002 | Leavitt et al. |
| 2002/0087508 A1 | 7/2002 | Hull et al. |
| 2002/0091511 A1 | 7/2002 | Hellwig et al. |
| 2002/0095286 A1 | 7/2002 | Ross et al. |
| 2002/0099547 A1 | 7/2002 | Chu et al. |
| 2002/0099552 A1 | 7/2002 | Rubin et al. |
| 2002/0103641 A1 | 8/2002 | Kuo et al. |
| 2002/0103646 A1 | 8/2002 | Kochanski et al. |
| 2002/0107684 A1 | 8/2002 | Gao |
| 2002/0109709 A1 | 8/2002 | Sagar |
| 2002/0111810 A1 | 8/2002 | Khan et al. |
| 2002/0116082 A1 | 8/2002 | Gudorf |
| 2002/0116171 A1 | 8/2002 | Russell |
| 2002/0116185 A1 | 8/2002 | Cooper et al. |
| 2002/0116189 A1 | 8/2002 | Yeh et al. |
| 2002/0120697 A1 | 8/2002 | Generous et al. |
| 2002/0120925 A1 | 8/2002 | Logan |
| 2002/0122053 A1 | 9/2002 | Dutta et al. |
| 2002/0123894 A1 | 9/2002 | Woodward |
| 2002/0126097 A1 | 9/2002 | Savolainen |
| 2002/0128827 A1 | 9/2002 | Bu et al. |
| 2002/0128840 A1 | 9/2002 | Hinde et al. |
| 2002/0133347 A1 | 9/2002 | Schoneburg et al. |
| 2002/0133348 A1 | 9/2002 | Pearson et al. |
| 2002/0135565 A1 | 9/2002 | Gordon et al. |
| 2002/0138254 A1 | 9/2002 | Isaka et al. |
| 2002/0138265 A1 | 9/2002 | Stevens et al. |
| 2002/0138270 A1 | 9/2002 | Bellegarda et al. |
| 2002/0138616 A1 | 9/2002 | Basson et al. |
| 2002/0140679 A1 | 10/2002 | Wen |
| 2002/0143533 A1 | 10/2002 | Lucas et al. |
| 2002/0143542 A1 | 10/2002 | Eide |
| 2002/0143551 A1 | 10/2002 | Sharma et al. |
| 2002/0143826 A1 | 10/2002 | Day et al. |
| 2002/0151297 A1 | 10/2002 | Remboski et al. |
| 2002/0152045 A1 | 10/2002 | Dowling et al. |
| 2002/0152255 A1 | 10/2002 | Smith et al. |
| 2002/0154160 A1 | 10/2002 | Hosokawa |
| 2002/0161865 A1 | 10/2002 | Nguyen |
| 2002/0163544 A1 | 11/2002 | Baker et al. |
| 2002/0164000 A1 | 11/2002 | Cohen et al. |
| 2002/0165918 A1 | 11/2002 | Bettis |
| 2002/0169592 A1 | 11/2002 | Aityan |
| 2002/0169605 A1 | 11/2002 | Damiba et al. |
| 2002/0173273 A1 | 11/2002 | Spurgat et al. |
| 2002/0173889 A1 | 11/2002 | Odinak et al. |
| 2002/0173961 A1 | 11/2002 | Guerra |
| 2002/0173962 A1 | 11/2002 | Tang et al. |
| 2002/0173966 A1 | 11/2002 | Henton |
| 2002/0177993 A1 | 11/2002 | Veditz et al. |
| 2002/0184189 A1 | 12/2002 | Hay et al. |
| 2002/0189426 A1 | 12/2002 | Hirade et al. |
| 2002/0191029 A1 | 12/2002 | Gillespie et al. |
| 2002/0193996 A1 | 12/2002 | Squibbs et al. |
| 2002/0198714 A1 | 12/2002 | Zhou |
| 2002/0198715 A1 | 12/2002 | Belrose |
| 2003/0001881 A1 | 1/2003 | Mannheimer et al. |
| 2003/0002632 A1 | 1/2003 | Bhogal et al. |
| 2003/0013483 A1 | 1/2003 | Ausems et al. |
| 2003/0016770 A1 | 1/2003 | Trans et al. |
| 2003/0020760 A1 | 1/2003 | Takatsu et al. |
| 2003/0026402 A1 | 2/2003 | Clapper |
| 2003/0028380 A1 | 2/2003 | Freeland et al. |
| 2003/0033153 A1 | 2/2003 | Olson et al. |
| 2003/0033214 A1 | 2/2003 | Mikkelsen et al. |
| 2003/0037073 A1 | 2/2003 | Tokuda et al. |
| 2003/0037254 A1 | 2/2003 | Fischer et al. |
| 2003/0040908 A1 | 2/2003 | Yang et al. |
| 2003/0046401 A1 | 3/2003 | Abbott et al. |
| 2003/0046434 A1 | 3/2003 | Flanagin et al. |
| 2003/0050781 A1 | 3/2003 | Tamura et al. |
| 2003/0051136 A1 | 3/2003 | Curtis et al. |
| 2003/0061317 A1 | 3/2003 | Brown et al. |
| 2003/0074198 A1 | 4/2003 | Sussman |
| 2003/0074457 A1 | 4/2003 | Kluth |
| 2003/0076301 A1 | 4/2003 | Tsuk et al. |
| 2003/0078766 A1 | 4/2003 | Appelt et al. |
| 2003/0078780 A1 | 4/2003 | Kochanski et al. |
| 2003/0078969 A1 | 4/2003 | Sprague et al. |
| 2003/0079024 A1 | 4/2003 | Hough et al. |
| 2003/0079038 A1 | 4/2003 | Robbin et al. |
| 2003/0080991 A1 | 5/2003 | Crow et al. |
| 2003/0083878 A1 | 5/2003 | Lee et al. |
| 2003/0083884 A1 | 5/2003 | Odinak et al. |
| 2003/0088414 A1 | 5/2003 | Huang et al. |
| 2003/0090467 A1 | 5/2003 | Hohl et al. |
| 2003/0090474 A1 | 5/2003 | Schaefer |
| 2003/0095096 A1 | 5/2003 | Robbin et al. |
| 2003/0097210 A1 | 5/2003 | Horst et al. |
| 2003/0097379 A1 | 5/2003 | Ireton |
| 2003/0097408 A1 | 5/2003 | Kageyama et al. |
| 2003/0098892 A1 | 5/2003 | Hiipakka |
| 2003/0099335 A1 | 5/2003 | Tanaka et al. |
| 2003/0101045 A1 | 5/2003 | Moffatt et al. |
| 2003/0115060 A1 | 6/2003 | Junqua et al. |
| 2003/0115064 A1 | 6/2003 | Gusler et al. |
| 2003/0115186 A1 | 6/2003 | Wilkinson et al. |
| 2003/0115552 A1 | 6/2003 | Jahnke et al. |
| 2003/0117365 A1 | 6/2003 | Shteyn |
| 2003/0120494 A1 | 6/2003 | Jost et al. |
| 2003/0122787 A1 | 7/2003 | Zimmerman et al. |
| 2003/0125927 A1 | 7/2003 | Seme |
| 2003/0126559 A1 | 7/2003 | Fuhrmann |
| 2003/0128819 A1 | 7/2003 | Lee et al. |
| 2003/0133694 A1 | 7/2003 | Yea |
| 2003/0134678 A1 | 7/2003 | Tanaka |
| 2003/0135740 A1 | 7/2003 | Talmor et al. |
| 2003/0144846 A1 | 7/2003 | Denenberge et al. |
| 2003/0145285 A1 | 7/2003 | Miyahira et al. |
| 2003/0147512 A1 | 8/2003 | Abburi |
| 2003/0149557 A1 | 8/2003 | Cox et al. |
| 2003/0149567 A1 | 8/2003 | Schmitz et al. |
| 2003/0149978 A1 | 8/2003 | Plotnick |
| 2003/0152203 A1 | 8/2003 | Berger et al. |
| 2003/0154081 A1 | 8/2003 | Chu et al. |
| 2003/0157968 A1 | 8/2003 | Boman et al. |
| 2003/0158735 A1 | 8/2003 | Yamada et al. |
| 2003/0158737 A1 | 8/2003 | Csicsatka |
| 2003/0160702 A1 | 8/2003 | Tanaka |
| 2003/0163316 A1 | 8/2003 | Addison et al. |
| 2003/0164848 A1 | 9/2003 | Dutta et al. |
| 2003/0167318 A1 | 9/2003 | Robbin et al. |
| 2003/0167335 A1 | 9/2003 | Alexander |
| 2003/0171928 A1 | 9/2003 | Falcon et al. |
| 2003/0171936 A1 | 9/2003 | Sall et al. |
| 2003/0179222 A1 | 9/2003 | Noma et al. |
| 2003/0187655 A1 | 10/2003 | Dunsmuir |

(56) References Cited

U.S. PATENT DOCUMENTS

| | | |
|---|---|---|
| 2003/0187844 A1 | 10/2003 | Li et al. |
| 2003/0187925 A1 | 10/2003 | Inala et al. |
| 2003/0190074 A1 | 10/2003 | Loudon et al. |
| 2003/0191645 A1 | 10/2003 | Zhou |
| 2003/0193481 A1 | 10/2003 | Sokolsky |
| 2003/0195741 A1 | 10/2003 | Mani et al. |
| 2003/0197736 A1 | 10/2003 | Murphy |
| 2003/0197744 A1 | 10/2003 | Irvine |
| 2003/0200858 A1 | 10/2003 | Xie |
| 2003/0204392 A1 | 10/2003 | Finnigan et al. |
| 2003/0204492 A1 | 10/2003 | Wolf et al. |
| 2003/0208756 A1 | 11/2003 | Macrae et al. |
| 2003/0210266 A1 | 11/2003 | Cragun et al. |
| 2003/0212961 A1 | 11/2003 | Soin et al. |
| 2003/0214519 A1 | 11/2003 | Smith et al. |
| 2003/0224760 A1 | 12/2003 | Day |
| 2003/0228863 A1 | 12/2003 | Vander Veen et al. |
| 2003/0228909 A1 | 12/2003 | Tanaka et al. |
| 2003/0229490 A1 | 12/2003 | Etter |
| 2003/0229616 A1 | 12/2003 | Wong |
| 2003/0233230 A1 | 12/2003 | Ammicht et al. |
| 2003/0233237 A1 | 12/2003 | Garside et al. |
| 2003/0233240 A1 | 12/2003 | Kaatrasalo |
| 2003/0234824 A1 | 12/2003 | Litwiller |
| 2003/0236663 A1 | 12/2003 | Dimitrova et al. |
| 2004/0001396 A1 | 1/2004 | Keller et al. |
| 2004/0006467 A1 | 1/2004 | Anisimovich et al. |
| 2004/0012556 A1 | 1/2004 | Yong et al. |
| 2004/0013252 A1 | 1/2004 | Craner |
| 2004/0021676 A1 | 2/2004 | Chen et al. |
| 2004/0022373 A1 | 2/2004 | Suder et al. |
| 2004/0023643 A1 | 2/2004 | Vander Veen et al. |
| 2004/0030556 A1 | 2/2004 | Bennett |
| 2004/0030996 A1 | 2/2004 | Van Liempd et al. |
| 2004/0036715 A1 | 2/2004 | Warren |
| 2004/0048627 A1 | 3/2004 | Olvera-Hernandez |
| 2004/0049391 A1 | 3/2004 | Polanyi et al. |
| 2004/0051729 A1 | 3/2004 | Borden, IV |
| 2004/0052338 A1 | 3/2004 | Celi, Jr. et al. |
| 2004/0054533 A1 | 3/2004 | Bellegarda |
| 2004/0054534 A1 | 3/2004 | Junqua |
| 2004/0054535 A1 | 3/2004 | Mackie et al. |
| 2004/0054541 A1 | 3/2004 | Kryze et al. |
| 2004/0054690 A1 | 3/2004 | Hillerbrand et al. |
| 2004/0055446 A1 | 3/2004 | Robbin et al. |
| 2004/0056899 A1 | 3/2004 | Sinclair, II et al. |
| 2004/0059577 A1 | 3/2004 | Pickering |
| 2004/0059790 A1 | 3/2004 | Austin-Lane et al. |
| 2004/0061717 A1 | 4/2004 | Menon et al. |
| 2004/0062367 A1 | 4/2004 | Fellenstein et al. |
| 2004/0064593 A1 | 4/2004 | Sinclair et al. |
| 2004/0069122 A1 | 4/2004 | Wilson |
| 2004/0070567 A1 | 4/2004 | Longe et al. |
| 2004/0070612 A1 | 4/2004 | Sinclair et al. |
| 2004/0073427 A1 | 4/2004 | Moore |
| 2004/0073428 A1 | 4/2004 | Zlokarnik et al. |
| 2004/0076086 A1 | 4/2004 | Keller et al. |
| 2004/0078382 A1 | 4/2004 | Mercer et al. |
| 2004/0085162 A1 | 5/2004 | Agarwal et al. |
| 2004/0086120 A1 | 5/2004 | Akins, III et al. |
| 2004/0093213 A1 | 5/2004 | Conkie |
| 2004/0093215 A1 | 5/2004 | Gupta et al. |
| 2004/0094018 A1 | 5/2004 | Ueshima et al. |
| 2004/0100479 A1 | 5/2004 | Nakano et al. |
| 2004/0106432 A1 | 6/2004 | Kanamori et al. |
| 2004/0107169 A1 | 6/2004 | Lowe |
| 2004/0111266 A1 | 6/2004 | Coorman et al. |
| 2004/0111332 A1 | 6/2004 | Baar et al. |
| 2004/0114731 A1 | 6/2004 | Gillett et al. |
| 2004/0122656 A1 | 6/2004 | Abir |
| 2004/0124583 A1 | 7/2004 | Landis |
| 2004/0125088 A1 | 7/2004 | Zimmerman et al. |
| 2004/0125922 A1 | 7/2004 | Specht |
| 2004/0127198 A1 | 7/2004 | Roskind et al. |
| 2004/0127241 A1 | 7/2004 | Shostak |
| 2004/0128137 A1 | 7/2004 | Bush et al. |
| 2004/0133817 A1 | 7/2004 | Choi |
| 2004/0135701 A1 | 7/2004 | Yasuda et al. |
| 2004/0135774 A1 | 7/2004 | La Monica |
| 2004/0136510 A1 | 7/2004 | Vander Veen |
| 2004/0138869 A1 | 7/2004 | Heinecke |
| 2004/0145607 A1 | 7/2004 | Alderson |
| 2004/0153306 A1 | 8/2004 | Tanner et al. |
| 2004/0160419 A1 | 8/2004 | Padgitt |
| 2004/0162741 A1 | 8/2004 | Flaxer et al. |
| 2004/0176958 A1 | 9/2004 | Salmenkaita et al. |
| 2004/0177319 A1 | 9/2004 | Horn |
| 2004/0178994 A1 | 9/2004 | Kairls, Jr. |
| 2004/0183833 A1 | 9/2004 | Chua |
| 2004/0186713 A1 | 9/2004 | Gomas et al. |
| 2004/0186714 A1 | 9/2004 | Baker |
| 2004/0186777 A1 | 9/2004 | Margiloff et al. |
| 2004/0193398 A1 | 9/2004 | Chu et al. |
| 2004/0193420 A1 | 9/2004 | Kennewick et al. |
| 2004/0193421 A1 | 9/2004 | Blass |
| 2004/0193426 A1 | 9/2004 | Maddux et al. |
| 2004/0196256 A1 | 10/2004 | Wobbrock et al. |
| 2004/0198436 A1 | 10/2004 | Alden |
| 2004/0199375 A1 | 10/2004 | Ehsani et al. |
| 2004/0199387 A1 | 10/2004 | Wang et al. |
| 2004/0199663 A1 | 10/2004 | Horvitz et al. |
| 2004/0203520 A1 | 10/2004 | Schirtzinger et al. |
| 2004/0205151 A1 | 10/2004 | Sprigg et al. |
| 2004/0205671 A1 | 10/2004 | Sukehiro et al. |
| 2004/0208302 A1 | 10/2004 | Urban et al. |
| 2004/0210634 A1 | 10/2004 | Ferrer et al. |
| 2004/0215731 A1 | 10/2004 | Tzann-en Szeto |
| 2004/0218451 A1 | 11/2004 | Said et al. |
| 2004/0220798 A1 | 11/2004 | Chi et al. |
| 2004/0223485 A1 | 11/2004 | Arellano et al. |
| 2004/0224638 A1 | 11/2004 | Fadell et al. |
| 2004/0225650 A1 | 11/2004 | Cooper et al. |
| 2004/0225746 A1 | 11/2004 | Niell et al. |
| 2004/0236778 A1 | 11/2004 | Junqua et al. |
| 2004/0242286 A1 | 12/2004 | Benco et al. |
| 2004/0243419 A1 | 12/2004 | Wang |
| 2004/0249629 A1 | 12/2004 | Webster |
| 2004/0249667 A1 | 12/2004 | Oon |
| 2004/0252119 A1 | 12/2004 | Hunleth et al. |
| 2004/0252604 A1 | 12/2004 | Johnson et al. |
| 2004/0252966 A1 | 12/2004 | Holloway et al. |
| 2004/0254791 A1 | 12/2004 | Coifman et al. |
| 2004/0254792 A1 | 12/2004 | Busayapongchai et al. |
| 2004/0257432 A1 | 12/2004 | Girish et al. |
| 2004/0259536 A1 | 12/2004 | Keskar et al. |
| 2004/0263636 A1 | 12/2004 | Cutler et al. |
| 2004/0267825 A1 | 12/2004 | Novak et al. |
| 2004/0268262 A1 | 12/2004 | Gupta et al. |
| 2005/0002507 A1 | 1/2005 | Timmins et al. |
| 2005/0015254 A1 | 1/2005 | Beaman |
| 2005/0015772 A1 | 1/2005 | Saare et al. |
| 2005/0022114 A1 | 1/2005 | Shanahan et al. |
| 2005/0024341 A1 | 2/2005 | Gillespie et al. |
| 2005/0024345 A1 | 2/2005 | Eastty et al. |
| 2005/0027385 A1 | 2/2005 | Yueh |
| 2005/0030175 A1 | 2/2005 | Wolfe |
| 2005/0031106 A1 | 2/2005 | Henderson |
| 2005/0033582 A1 | 2/2005 | Gadd et al. |
| 2005/0033771 A1 | 2/2005 | Schmitter et al. |
| 2005/0043946 A1 | 2/2005 | Ueyama et al. |
| 2005/0043949 A1 | 2/2005 | Roth et al. |
| 2005/0044569 A1 | 2/2005 | Marcus |
| 2005/0045373 A1 | 3/2005 | Born |
| 2005/0049880 A1 | 3/2005 | Roth et al. |
| 2005/0055403 A1 | 3/2005 | Brittan |
| 2005/0058438 A1 | 3/2005 | Hayashi |
| 2005/0060155 A1 | 3/2005 | Chu et al. |
| 2005/0071165 A1 | 3/2005 | Hofstader et al. |
| 2005/0071332 A1 | 3/2005 | Ortega et al. |
| 2005/0071437 A1 | 3/2005 | Bear et al. |
| 2005/0074113 A1 | 4/2005 | Mathew et al. |
| 2005/0080613 A1 | 4/2005 | Colledge et al. |
| 2005/0080625 A1 | 4/2005 | Bennett et al. |
| 2005/0080632 A1 | 4/2005 | Endo et al. |

(56) References Cited

U.S. PATENT DOCUMENTS

| | | |
|---|---|---|
| 2005/0080780 A1 | 4/2005 | Colledge et al. |
| 2005/0086059 A1 | 4/2005 | Bennett |
| 2005/0086605 A1 | 4/2005 | Ferrer et al. |
| 2005/0091118 A1 | 4/2005 | Fano |
| 2005/0099398 A1 | 5/2005 | Garside et al. |
| 2005/0100214 A1 | 5/2005 | Zhang et al. |
| 2005/0102144 A1 | 5/2005 | Rapoport |
| 2005/0102614 A1 | 5/2005 | Brackett et al. |
| 2005/0102625 A1 | 5/2005 | Lee et al. |
| 2005/0108001 A1 | 5/2005 | Aarskog |
| 2005/0108074 A1 | 5/2005 | Bloechl et al. |
| 2005/0108338 A1 | 5/2005 | Simske et al. |
| 2005/0108344 A1 | 5/2005 | Tafoya et al. |
| 2005/0114124 A1 | 5/2005 | Liu et al. |
| 2005/0114140 A1 | 5/2005 | Brackett et al. |
| 2005/0119890 A1 | 6/2005 | Hirose |
| 2005/0119897 A1 | 6/2005 | Bennett et al. |
| 2005/0125216 A1 | 6/2005 | Chitrapura et al. |
| 2005/0125235 A1 | 6/2005 | Lazay et al. |
| 2005/0131951 A1 | 6/2005 | Zhang et al. |
| 2005/0132301 A1 | 6/2005 | Ikeda |
| 2005/0136949 A1 | 6/2005 | Barnes, Jr. |
| 2005/0138305 A1 | 6/2005 | Zellner |
| 2005/0140504 A1 | 6/2005 | Marshall et al. |
| 2005/0143972 A1 | 6/2005 | Gopalakrishnan et al. |
| 2005/0144003 A1 | 6/2005 | Iso-Sipila |
| 2005/0144070 A1 | 6/2005 | Cheshire |
| 2005/0144568 A1 | 6/2005 | Gruen et al. |
| 2005/0148356 A1 | 7/2005 | Ferguson et al. |
| 2005/0149214 A1 | 7/2005 | Yoo et al. |
| 2005/0149330 A1 | 7/2005 | Katae |
| 2005/0149332 A1 | 7/2005 | Kuzunuki et al. |
| 2005/0149510 A1 | 7/2005 | Shafrir |
| 2005/0152558 A1 | 7/2005 | Van Tassel |
| 2005/0152602 A1 | 7/2005 | Chen et al. |
| 2005/0154578 A1 | 7/2005 | Tong et al. |
| 2005/0162395 A1 | 7/2005 | Unruh |
| 2005/0165607 A1 | 7/2005 | Di Fabbrizio et al. |
| 2005/0166153 A1 | 7/2005 | Eytchison et al. |
| 2005/0177445 A1 | 8/2005 | Church |
| 2005/0181770 A1 | 8/2005 | Helferich |
| 2005/0182616 A1 | 8/2005 | Kotipalli |
| 2005/0182627 A1 | 8/2005 | Tanaka et al. |
| 2005/0182628 A1 | 8/2005 | Choi |
| 2005/0182629 A1 | 8/2005 | Coorman et al. |
| 2005/0182630 A1 | 8/2005 | Miro et al. |
| 2005/0187773 A1 | 8/2005 | Filoche et al. |
| 2005/0190970 A1 | 9/2005 | Griffin |
| 2005/0192801 A1 | 9/2005 | Lewis et al. |
| 2005/0195429 A1 | 9/2005 | Archbold |
| 2005/0196733 A1 | 9/2005 | Budra et al. |
| 2005/0201572 A1 | 9/2005 | Lindahl et al. |
| 2005/0203747 A1 | 9/2005 | Lecoeuche |
| 2005/0203991 A1 | 9/2005 | Kawamura et al. |
| 2005/0209848 A1 | 9/2005 | Ishii |
| 2005/0210394 A1 | 9/2005 | Crandall et al. |
| 2005/0216331 A1 | 9/2005 | Ahrens et al. |
| 2005/0222843 A1 | 10/2005 | Kahn et al. |
| 2005/0222973 A1 | 10/2005 | Kaiser |
| 2005/0228665 A1 | 10/2005 | Kobayashi et al. |
| 2005/0245243 A1 | 11/2005 | Zuniga |
| 2005/0246350 A1 | 11/2005 | Canaran |
| 2005/0246365 A1 | 11/2005 | Lowles et al. |
| 2005/0271216 A1 | 12/2005 | Lashkari |
| 2005/0273337 A1 | 12/2005 | Erell et al. |
| 2005/0273626 A1 | 12/2005 | Pearson et al. |
| 2005/0278297 A1 | 12/2005 | Nelson |
| 2005/0278643 A1 | 12/2005 | Ukai et al. |
| 2005/0278647 A1 | 12/2005 | Leavitt et al. |
| 2005/0283364 A1 | 12/2005 | Longe et al. |
| 2005/0283726 A1 | 12/2005 | Lunati |
| 2005/0288934 A1 | 12/2005 | Omi |
| 2005/0288936 A1 | 12/2005 | Busayapongchai et al. |
| 2005/0289463 A1 | 12/2005 | Wu et al. |
| 2006/0001652 A1 | 1/2006 | Chiu et al. |
| 2006/0004570 A1 | 1/2006 | Ju et al. |
| 2006/0004744 A1 | 1/2006 | Nevidomski et al. |
| 2006/0007174 A1 | 1/2006 | Shen |
| 2006/0009973 A1 | 1/2006 | Nguyen et al. |
| 2006/0013414 A1 | 1/2006 | Shih |
| 2006/0015819 A1 | 1/2006 | Hawkins et al. |
| 2006/0018446 A1 | 1/2006 | Schmandt et al. |
| 2006/0018492 A1 | 1/2006 | Chiu et al. |
| 2006/0025999 A1 | 2/2006 | Feng et al. |
| 2006/0026233 A1 | 2/2006 | Tenembaum et al. |
| 2006/0026521 A1 | 2/2006 | Hotelling et al. |
| 2006/0026535 A1 | 2/2006 | Hotelling et al. |
| 2006/0033724 A1 | 2/2006 | Chaudhri et al. |
| 2006/0035632 A1 | 2/2006 | Sorvari et al. |
| 2006/0041424 A1 | 2/2006 | Todhunter et al. |
| 2006/0041431 A1 | 2/2006 | Maes |
| 2006/0047632 A1 | 3/2006 | Zhang |
| 2006/0050865 A1 | 3/2006 | Kortum et al. |
| 2006/0053379 A1 | 3/2006 | Henderson et al. |
| 2006/0061488 A1 | 3/2006 | Dunton |
| 2006/0067535 A1 | 3/2006 | Culbert et al. |
| 2006/0067536 A1 | 3/2006 | Culbert et al. |
| 2006/0069567 A1 | 3/2006 | Tischer et al. |
| 2006/0072248 A1 | 4/2006 | Watanabe et al. |
| 2006/0072716 A1 | 4/2006 | Pham |
| 2006/0074660 A1 | 4/2006 | Waters et al. |
| 2006/0074674 A1 | 4/2006 | Zhang et al. |
| 2006/0074750 A1 | 4/2006 | Clark et al. |
| 2006/0074898 A1 | 4/2006 | Gavalda et al. |
| 2006/0077055 A1 | 4/2006 | Basir |
| 2006/0080098 A1 | 4/2006 | Campbell |
| 2006/0085187 A1 | 4/2006 | Barquilla |
| 2006/0085465 A1 | 4/2006 | Nori et al. |
| 2006/0095265 A1 | 5/2006 | Chu et al. |
| 2006/0095846 A1 | 5/2006 | Nurmi |
| 2006/0095848 A1 | 5/2006 | Naik |
| 2006/0100848 A1 | 5/2006 | Cozzi et al. |
| 2006/0100849 A1 | 5/2006 | Chan |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0111906 A1 | 5/2006 | Cross et al. |
| 2006/0111909 A1 | 5/2006 | Maes et al. |
| 2006/0116874 A1 | 6/2006 | Samuelsson et al. |
| 2006/0116877 A1 | 6/2006 | Pickering et al. |
| 2006/0117002 A1 | 6/2006 | Swen |
| 2006/0119582 A1 | 6/2006 | Ng et al. |
| 2006/0122834 A1 | 6/2006 | Bennett |
| 2006/0122836 A1 | 6/2006 | Cross et al. |
| 2006/0129929 A1 | 6/2006 | Weber et al. |
| 2006/0143007 A1 | 6/2006 | Koh et al. |
| 2006/0143576 A1 | 6/2006 | Gupta et al. |
| 2006/0148520 A1 | 7/2006 | Baker et al. |
| 2006/0152496 A1 | 7/2006 | Knaven |
| 2006/0153040 A1 | 7/2006 | Girish et al. |
| 2006/0156252 A1 | 7/2006 | Sheshagiri et al. |
| 2006/0161872 A1 | 7/2006 | Rytivaara et al. |
| 2006/0167676 A1 | 7/2006 | Plumb |
| 2006/0168150 A1 | 7/2006 | Naik et al. |
| 2006/0168507 A1 | 7/2006 | Hansen |
| 2006/0168539 A1 | 7/2006 | Hawkins et al. |
| 2006/0174207 A1 | 8/2006 | Deshpande |
| 2006/0184886 A1 | 8/2006 | Chung et al. |
| 2006/0187073 A1 | 8/2006 | Lin et al. |
| 2006/0190269 A1 | 8/2006 | Tessel et al. |
| 2006/0190577 A1 | 8/2006 | Yamada |
| 2006/0193518 A1 | 8/2006 | Dong |
| 2006/0195206 A1 | 8/2006 | Moon et al. |
| 2006/0195323 A1 | 8/2006 | Monne et al. |
| 2006/0197753 A1 | 9/2006 | Hotelling |
| 2006/0197755 A1 | 9/2006 | Bawany |
| 2006/0200253 A1 | 9/2006 | Hoffberg et al. |
| 2006/0200342 A1 | 9/2006 | Corston-Oliver et al. |
| 2006/0200347 A1 | 9/2006 | Kim et al. |
| 2006/0205432 A1 | 9/2006 | Hawkins et al. |
| 2006/0206454 A1 | 9/2006 | Forstall et al. |
| 2006/0212415 A1 | 9/2006 | Backer et al. |
| 2006/0217967 A1 | 9/2006 | Goertzen et al. |
| 2006/0221788 A1 | 10/2006 | Lindahl et al. |

(56) References Cited

U.S. PATENT DOCUMENTS

| | | |
|---|---|---|
| 2006/0229870 A1 | 10/2006 | Kobal |
| 2006/0229876 A1 | 10/2006 | Aaron et al. |
| 2006/0234680 A1 | 10/2006 | Doulton |
| 2006/0235550 A1 | 10/2006 | Csicsatka et al. |
| 2006/0235700 A1 | 10/2006 | Wong et al. |
| 2006/0235841 A1 | 10/2006 | Betz et al. |
| 2006/0236262 A1 | 10/2006 | Bathiche et al. |
| 2006/0239419 A1 | 10/2006 | Joseph et al. |
| 2006/0239471 A1 | 10/2006 | Mao et al. |
| 2006/0240866 A1 | 10/2006 | Eilts et al. |
| 2006/0242190 A1 | 10/2006 | Wnek |
| 2006/0246955 A1 | 11/2006 | Nirhamo et al. |
| 2006/0247931 A1 | 11/2006 | Caskey et al. |
| 2006/0252457 A1 | 11/2006 | Schrager |
| 2006/0253210 A1 | 11/2006 | Rosenberg |
| 2006/0253787 A1 | 11/2006 | Fogg |
| 2006/0256934 A1 | 11/2006 | Mazor |
| 2006/0262876 A1 | 11/2006 | LaDue |
| 2006/0265208 A1 | 11/2006 | Assadollahi |
| 2006/0265503 A1 | 11/2006 | Jones et al. |
| 2006/0265648 A1 | 11/2006 | Rainisto et al. |
| 2006/0274051 A1 | 12/2006 | Longe et al. |
| 2006/0274905 A1 | 12/2006 | Lindahl et al. |
| 2006/0277058 A1 | 12/2006 | J'maev et al. |
| 2006/0282264 A1 | 12/2006 | Denny et al. |
| 2006/0282415 A1 | 12/2006 | Shibata et al. |
| 2006/0288024 A1 | 12/2006 | Braica |
| 2006/0293876 A1 | 12/2006 | Kamatani et al. |
| 2006/0293880 A1 | 12/2006 | Elshishiny et al. |
| 2006/0293886 A1 | 12/2006 | Odell et al. |
| 2007/0003026 A1 | 1/2007 | Hodge et al. |
| 2007/0004451 A1 | 1/2007 | C. Anderson |
| 2007/0005849 A1 | 1/2007 | Oliver |
| 2007/0006098 A1 | 1/2007 | Krumm et al. |
| 2007/0011154 A1 | 1/2007 | Musgrove et al. |
| 2007/0016563 A1 | 1/2007 | Omoigui |
| 2007/0016865 A1 | 1/2007 | Johnson et al. |
| 2007/0021956 A1 | 1/2007 | Qu et al. |
| 2007/0025704 A1 | 2/2007 | Tsukazaki et al. |
| 2007/0026852 A1 | 2/2007 | Logan et al. |
| 2007/0027732 A1 | 2/2007 | Hudgens |
| 2007/0028009 A1 | 2/2007 | Robbin et al. |
| 2007/0032247 A1 | 2/2007 | Shaffer et al. |
| 2007/0033003 A1 | 2/2007 | Morris |
| 2007/0038436 A1 | 2/2007 | Cristoe et al. |
| 2007/0038609 A1 | 2/2007 | Wu |
| 2007/0040813 A1 | 2/2007 | Kushler et al. |
| 2007/0041361 A1 | 2/2007 | Iso-Sipila |
| 2007/0043568 A1 | 2/2007 | Dhanakshirur et al. |
| 2007/0044038 A1 | 2/2007 | Horentrup et al. |
| 2007/0046641 A1 | 3/2007 | Lim |
| 2007/0047719 A1 | 3/2007 | Dhawan et al. |
| 2007/0050184 A1 | 3/2007 | Drucker et al. |
| 2007/0050191 A1 | 3/2007 | Weider et al. |
| 2007/0050393 A1 | 3/2007 | Vogel et al. |
| 2007/0050712 A1 | 3/2007 | Hull et al. |
| 2007/0052586 A1 | 3/2007 | Horstemeyer |
| 2007/0055493 A1 | 3/2007 | Lee |
| 2007/0055514 A1 | 3/2007 | Beattie et al. |
| 2007/0055525 A1 | 3/2007 | Kennewick et al. |
| 2007/0055529 A1 | 3/2007 | Kanevsky et al. |
| 2007/0058832 A1 | 3/2007 | Hug et al. |
| 2007/0061487 A1 | 3/2007 | Moore et al. |
| 2007/0061754 A1 | 3/2007 | Ardhanari et al. |
| 2007/0067173 A1 | 3/2007 | Bellegarda |
| 2007/0067272 A1 | 3/2007 | Flynt et al. |
| 2007/0073540 A1 | 3/2007 | Hirakawa et al. |
| 2007/0073541 A1 | 3/2007 | Tian |
| 2007/0080936 A1 | 4/2007 | Tsuk et al. |
| 2007/0083467 A1 | 4/2007 | Lindahl et al. |
| 2007/0083623 A1 | 4/2007 | Nishimura et al. |
| 2007/0088556 A1 | 4/2007 | Andrew |
| 2007/0089132 A1 | 4/2007 | Qureshey et al. |
| 2007/0089135 A1 | 4/2007 | Qureshey et al. |
| 2007/0093277 A1 | 4/2007 | Cavacuiti et al. |
| 2007/0094026 A1 | 4/2007 | Ativanichayaphong et al. |
| 2007/0098195 A1 | 5/2007 | Holmes |
| 2007/0100206 A1 | 5/2007 | Lin et al. |
| 2007/0100602 A1 | 5/2007 | Kim |
| 2007/0100635 A1 | 5/2007 | Mahajan et al. |
| 2007/0100790 A1 | 5/2007 | Cheyer et al. |
| 2007/0100883 A1 | 5/2007 | Rose et al. |
| 2007/0106512 A1 | 5/2007 | Acero et al. |
| 2007/0106513 A1 | 5/2007 | Boillot et al. |
| 2007/0106674 A1 | 5/2007 | Agrawal et al. |
| 2007/0116195 A1 | 5/2007 | Thompson et al. |
| 2007/0118377 A1 | 5/2007 | Badino et al. |
| 2007/0118378 A1 | 5/2007 | Skuratovsky |
| 2007/0121846 A1 | 5/2007 | Altberg et al. |
| 2007/0124149 A1 | 5/2007 | Shen et al. |
| 2007/0124676 A1 | 5/2007 | Amundsen et al. |
| 2007/0127888 A1 | 6/2007 | Hayashi et al. |
| 2007/0128777 A1 | 6/2007 | Yin et al. |
| 2007/0129059 A1 | 6/2007 | Nadarajah et al. |
| 2007/0130014 A1 | 6/2007 | Altberg et al. |
| 2007/0130128 A1 | 6/2007 | Garg et al. |
| 2007/0132738 A1 | 6/2007 | Lowles et al. |
| 2007/0135949 A1 | 6/2007 | Snover et al. |
| 2007/0136064 A1 | 6/2007 | Carroll |
| 2007/0136778 A1 | 6/2007 | Birger et al. |
| 2007/0152978 A1 | 7/2007 | Kocienda et al. |
| 2007/0155346 A1 | 7/2007 | Mijatovic et al. |
| 2007/0156410 A1 | 7/2007 | Stohr et al. |
| 2007/0157268 A1 | 7/2007 | Girish et al. |
| 2007/0162296 A1 | 7/2007 | Altberg et al. |
| 2007/0162414 A1 | 7/2007 | Horowitz et al. |
| 2007/0173233 A1 | 7/2007 | Vander Veen et al. |
| 2007/0173267 A1 | 7/2007 | Klassen et al. |
| 2007/0174188 A1 | 7/2007 | Fish |
| 2007/0174396 A1 | 7/2007 | Kumar et al. |
| 2007/0180383 A1 | 8/2007 | Naik |
| 2007/0182595 A1 | 8/2007 | Ghasabian |
| 2007/0185551 A1 | 8/2007 | Meadows et al. |
| 2007/0185754 A1 | 8/2007 | Schmidt |
| 2007/0185831 A1 | 8/2007 | Churcher |
| 2007/0185917 A1 | 8/2007 | Prahlad et al. |
| 2007/0188901 A1 | 8/2007 | Heckerman et al. |
| 2007/0192027 A1 | 8/2007 | Lee et al. |
| 2007/0192105 A1 | 8/2007 | Neeracher et al. |
| 2007/0192293 A1 | 8/2007 | Swen |
| 2007/0192403 A1 | 8/2007 | Heine et al. |
| 2007/0192744 A1 | 8/2007 | Reponen |
| 2007/0198269 A1 | 8/2007 | Braho et al. |
| 2007/0198273 A1 | 8/2007 | Hennecke |
| 2007/0198566 A1 | 8/2007 | Sustik |
| 2007/0207785 A1 | 9/2007 | Chatterjee et al. |
| 2007/0208569 A1 | 9/2007 | Subramanian et al. |
| 2007/0208579 A1 | 9/2007 | Peterson |
| 2007/0208726 A1 | 9/2007 | Krishnaprasad et al. |
| 2007/0211071 A1 | 9/2007 | Slotznick et al. |
| 2007/0213099 A1 | 9/2007 | Bast |
| 2007/0213857 A1 | 9/2007 | Bodin et al. |
| 2007/0219777 A1 | 9/2007 | Chu et al. |
| 2007/0219803 A1 | 9/2007 | Chiu et al. |
| 2007/0225980 A1 | 9/2007 | Sumita |
| 2007/0225984 A1 | 9/2007 | Milstein et al. |
| 2007/0226652 A1 | 9/2007 | Kikuchi et al. |
| 2007/0229323 A1 | 10/2007 | Plachta et al. |
| 2007/0233490 A1 | 10/2007 | Yao |
| 2007/0233725 A1 | 10/2007 | Michmerhuizen et al. |
| 2007/0238520 A1 | 10/2007 | Kacmarcik |
| 2007/0239429 A1 | 10/2007 | Johnson et al. |
| 2007/0244702 A1 | 10/2007 | Kahn et al. |
| 2007/0255435 A1 | 11/2007 | Cohen et al. |
| 2007/0255979 A1 | 11/2007 | Deily et al. |
| 2007/0260460 A1 | 11/2007 | Hyatt |
| 2007/0260595 A1 | 11/2007 | Beatty et al. |
| 2007/0260822 A1 | 11/2007 | Adams |
| 2007/0261080 A1 | 11/2007 | Saetti |
| 2007/0265831 A1 | 11/2007 | Dinur et al. |
| 2007/0271510 A1 | 11/2007 | Grigoriu et al. |
| 2007/0274468 A1 | 11/2007 | Cai |
| 2007/0276651 A1 | 11/2007 | Bliss et al. |
| 2007/0276714 A1 | 11/2007 | Beringer |

(56) References Cited

U.S. PATENT DOCUMENTS

| | | |
|---|---|---|
| 2007/0276810 A1 | 11/2007 | Rosen |
| 2007/0282595 A1 | 12/2007 | Tunning et al. |
| 2007/0285958 A1 | 12/2007 | Platchta et al. |
| 2007/0286363 A1 | 12/2007 | Burg et al. |
| 2007/0288241 A1 | 12/2007 | Cross et al. |
| 2007/0288449 A1 | 12/2007 | Datta et al. |
| 2007/0291108 A1 | 12/2007 | Huber et al. |
| 2007/0294077 A1 | 12/2007 | Narayanan et al. |
| 2007/0294263 A1 | 12/2007 | Punj et al. |
| 2007/0299664 A1 | 12/2007 | Peters et al. |
| 2008/0010355 A1 | 1/2008 | Vieri et al. |
| 2008/0012950 A1 | 1/2008 | Lee et al. |
| 2008/0013751 A1 | 1/2008 | Hiselius |
| 2008/0015864 A1 | 1/2008 | Ross et al. |
| 2008/0016575 A1 | 1/2008 | Vincent et al. |
| 2008/0021708 A1 | 1/2008 | Bennett et al. |
| 2008/0022208 A1 | 1/2008 | Morse |
| 2008/0031475 A1 | 2/2008 | Goldstein |
| 2008/0034032 A1 | 2/2008 | Healey et al. |
| 2008/0034044 A1 | 2/2008 | Bhakta et al. |
| 2008/0040339 A1 | 2/2008 | Zhou et al. |
| 2008/0042970 A1 | 2/2008 | Liang et al. |
| 2008/0043936 A1 | 2/2008 | Liebermann |
| 2008/0043943 A1 | 2/2008 | Sipher et al. |
| 2008/0046239 A1 | 2/2008 | Boo |
| 2008/0046422 A1 | 2/2008 | Lee et al. |
| 2008/0046948 A1 | 2/2008 | Verosub |
| 2008/0048908 A1 | 2/2008 | Sato |
| 2008/0052063 A1 | 2/2008 | Bennett et al. |
| 2008/0052073 A1 | 2/2008 | Goto et al. |
| 2008/0052077 A1 | 2/2008 | Bennett et al. |
| 2008/0056459 A1 | 3/2008 | Vallier et al. |
| 2008/0056579 A1 | 3/2008 | Guha |
| 2008/0059190 A1 | 3/2008 | Chu et al. |
| 2008/0059200 A1 | 3/2008 | Puli |
| 2008/0059876 A1 | 3/2008 | Hantler et al. |
| 2008/0065382 A1 | 3/2008 | Gerl et al. |
| 2008/0071529 A1 | 3/2008 | Silverman et al. |
| 2008/0071544 A1 | 3/2008 | Beaufays et al. |
| 2008/0075296 A1 | 3/2008 | Lindahl et al. |
| 2008/0077384 A1 | 3/2008 | Agapi et al. |
| 2008/0077391 A1 | 3/2008 | Chino et al. |
| 2008/0077393 A1 | 3/2008 | Gao et al. |
| 2008/0077406 A1 | 3/2008 | Ganong, III |
| 2008/0077859 A1 | 3/2008 | Schabes et al. |
| 2008/0079566 A1 | 4/2008 | Singh et al. |
| 2008/0082332 A1 | 4/2008 | Mallett et al. |
| 2008/0082338 A1 | 4/2008 | O'Neil et al. |
| 2008/0082390 A1 | 4/2008 | Hawkins et al. |
| 2008/0082576 A1 | 4/2008 | Bodin et al. |
| 2008/0082651 A1 | 4/2008 | Singh et al. |
| 2008/0091406 A1 | 4/2008 | Baldwin et al. |
| 2008/0091426 A1 | 4/2008 | Rempel et al. |
| 2008/0091443 A1 | 4/2008 | Strope et al. |
| 2008/0096726 A1 | 4/2008 | Riley et al. |
| 2008/0097937 A1 | 4/2008 | Hadjarian |
| 2008/0098302 A1 | 4/2008 | Roose |
| 2008/0100579 A1 | 5/2008 | Robinson et al. |
| 2008/0109222 A1 | 5/2008 | Liu |
| 2008/0114480 A1 | 5/2008 | Harb |
| 2008/0114598 A1 | 5/2008 | Prieto et al. |
| 2008/0114841 A1 | 5/2008 | Lambert |
| 2008/0118143 A1 | 5/2008 | Gordon et al. |
| 2008/0120102 A1 | 5/2008 | Rao |
| 2008/0120112 A1 | 5/2008 | Jordan et al. |
| 2008/0120342 A1 | 5/2008 | Reed et al. |
| 2008/0122796 A1 | 5/2008 | Jobs et al. |
| 2008/0126100 A1 | 5/2008 | Grost et al. |
| 2008/0129520 A1 | 6/2008 | Lee |
| 2008/0130867 A1 | 6/2008 | Bowen |
| 2008/0131006 A1 | 6/2008 | Oliver |
| 2008/0133215 A1 | 6/2008 | Sarukkai |
| 2008/0133228 A1 | 6/2008 | Rao |
| 2008/0133241 A1 | 6/2008 | Baker et al. |
| 2008/0140413 A1 | 6/2008 | Millman et al. |
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0141180 A1 | 6/2008 | Reed et al. |
| 2008/0146290 A1 | 6/2008 | Sreeram et al. |
| 2008/0147408 A1 | 6/2008 | Da Palma et al. |
| 2008/0147411 A1 | 6/2008 | Dames et al. |
| 2008/0154600 A1 | 6/2008 | Tian et al. |
| 2008/0154612 A1 | 6/2008 | Evermann et al. |
| 2008/0157867 A1 | 7/2008 | Krah |
| 2008/0163131 A1 | 7/2008 | Hirai et al. |
| 2008/0165144 A1 | 7/2008 | Forstall et al. |
| 2008/0165980 A1 | 7/2008 | Pavlovic et al. |
| 2008/0165994 A1 | 7/2008 | Caren et al. |
| 2008/0167013 A1 | 7/2008 | Novick et al. |
| 2008/0167858 A1 | 7/2008 | Christie et al. |
| 2008/0168366 A1 | 7/2008 | Kocienda et al. |
| 2008/0183473 A1 | 7/2008 | Nagano et al. |
| 2008/0189099 A1 | 8/2008 | Friedman et al. |
| 2008/0189106 A1 | 8/2008 | Low et al. |
| 2008/0189110 A1 | 8/2008 | Freeman et al. |
| 2008/0189114 A1 | 8/2008 | Fail et al. |
| 2008/0189606 A1 | 8/2008 | Rybak |
| 2008/0195601 A1 | 8/2008 | Ntoulas et al. |
| 2008/0195940 A1 | 8/2008 | Gail et al. |
| 2008/0201306 A1 | 8/2008 | Cooper et al. |
| 2008/0201375 A1 | 8/2008 | Khedouri et al. |
| 2008/0204379 A1 | 8/2008 | Perez-Noguera |
| 2008/0207176 A1 | 8/2008 | Brackbill et al. |
| 2008/0208585 A1 | 8/2008 | Ativanichayaphong et al. |
| 2008/0208587 A1 | 8/2008 | Ben-David et al. |
| 2008/0212796 A1 | 9/2008 | Denda |
| 2008/0221866 A1 | 9/2008 | Katragadda et al. |
| 2008/0221880 A1 | 9/2008 | Cerra et al. |
| 2008/0221889 A1 | 9/2008 | Cerra et al. |
| 2008/0221903 A1 | 9/2008 | Kanevsky et al. |
| 2008/0222118 A1 | 9/2008 | Scian et al. |
| 2008/0228463 A1 | 9/2008 | Mori et al. |
| 2008/0228485 A1 | 9/2008 | Owen |
| 2008/0228490 A1 | 9/2008 | Fischer et al. |
| 2008/0228496 A1 | 9/2008 | Yu et al. |
| 2008/0228928 A1 | 9/2008 | Donelli et al. |
| 2008/0229185 A1 | 9/2008 | Lynch |
| 2008/0235024 A1 | 9/2008 | Goldberg et al. |
| 2008/0240569 A1 | 10/2008 | Tonouchi |
| 2008/0242280 A1 | 10/2008 | Shapiro et al. |
| 2008/0244390 A1 | 10/2008 | Fux et al. |
| 2008/0247519 A1 | 10/2008 | Abella et al. |
| 2008/0248797 A1 | 10/2008 | Freeman et al. |
| 2008/0249770 A1 | 10/2008 | Kim et al. |
| 2008/0253577 A1 | 10/2008 | Eppolito |
| 2008/0255845 A1 | 10/2008 | Bennett |
| 2008/0256613 A1 | 10/2008 | Grover |
| 2008/0259022 A1 | 10/2008 | Mansfield et al. |
| 2008/0262838 A1 | 10/2008 | Nurminen et al. |
| 2008/0262846 A1 | 10/2008 | Burns et al. |
| 2008/0270118 A1 | 10/2008 | Kuo et al. |
| 2008/0270138 A1 | 10/2008 | Knight et al. |
| 2008/0270139 A1 | 10/2008 | Shi et al. |
| 2008/0270140 A1 | 10/2008 | Hertz et al. |
| 2008/0281510 A1 | 11/2008 | Shahine |
| 2008/0292112 A1 | 11/2008 | Valenzuela et al. |
| 2008/0294651 A1 | 11/2008 | Masuyama et al. |
| 2008/0298766 A1 | 12/2008 | Wen et al. |
| 2008/0300871 A1 | 12/2008 | Gilbert |
| 2008/0300878 A1 | 12/2008 | Bennett |
| 2008/0306727 A1 | 12/2008 | Thurmair et al. |
| 2008/0312909 A1 | 12/2008 | Hermansen et al. |
| 2008/0313335 A1 | 12/2008 | Jung et al. |
| 2008/0319753 A1 | 12/2008 | Hancock |
| 2008/0319763 A1 | 12/2008 | Di Fabbrizio et al. |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006097 A1 | 1/2009 | Etezadi et al. |
| 2009/0006099 A1 | 1/2009 | Sharpe et al. |
| 2009/0006100 A1 | 1/2009 | Badger et al. |
| 2009/0006343 A1 | 1/2009 | Platt et al. |
| 2009/0006488 A1 | 1/2009 | Lindahl et al. |

(56) References Cited

U.S. PATENT DOCUMENTS

| | | |
|---|---|---|
| 2009/0006671 A1 | 1/2009 | Batson et al. |
| 2009/0007001 A1 | 1/2009 | Morin et al. |
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018835 A1 | 1/2009 | Cooper et al. |
| 2009/0018839 A1 | 1/2009 | Cooper et al. |
| 2009/0018840 A1 | 1/2009 | Lutz et al. |
| 2009/0022329 A1 | 1/2009 | Mahowald |
| 2009/0028435 A1 | 1/2009 | Wu et al. |
| 2009/0030800 A1 | 1/2009 | Grois |
| 2009/0030978 A1 | 1/2009 | Johnson et al. |
| 2009/0043583 A1 | 2/2009 | Agapi et al. |
| 2009/0048821 A1 | 2/2009 | Yam et al. |
| 2009/0048845 A1 | 2/2009 | Burckart et al. |
| 2009/0049067 A1 | 2/2009 | Murray |
| 2009/0055179 A1 | 2/2009 | Cho et al. |
| 2009/0055186 A1 | 2/2009 | Lance et al. |
| 2009/0058823 A1 | 3/2009 | Kocienda |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077165 A1 | 3/2009 | Rhodes et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0100049 A1 | 4/2009 | Cao |
| 2009/0100454 A1 | 4/2009 | Weber |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0112572 A1 | 4/2009 | Thorn |
| 2009/0112677 A1 | 4/2009 | Rhett |
| 2009/0112892 A1 | 4/2009 | Cardie et al. |
| 2009/0123021 A1 | 5/2009 | Jung et al. |
| 2009/0123071 A1 | 5/2009 | Iwasaki |
| 2009/0125477 A1 | 5/2009 | Lu et al. |
| 2009/0137286 A1 | 5/2009 | Luke et al. |
| 2009/0138736 A1 | 5/2009 | Chin |
| 2009/0138828 A1 | 5/2009 | Schultz et al. |
| 2009/0144049 A1 | 6/2009 | Haddad et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0158423 A1 | 6/2009 | Orlassino et al. |
| 2009/0164441 A1 | 6/2009 | Cheyer |
| 2009/0164655 A1 | 6/2009 | Pettersson et al. |
| 2009/0167508 A1 | 7/2009 | Fadell et al. |
| 2009/0167509 A1 | 7/2009 | Fadell et al. |
| 2009/0171664 A1 | 7/2009 | Kennewick et al. |
| 2009/0172542 A1 | 7/2009 | Girish et al. |
| 2009/0174667 A1 | 7/2009 | Kocienda et al. |
| 2009/0177461 A1 | 7/2009 | Ehsani et al. |
| 2009/0182445 A1 | 7/2009 | Girish et al. |
| 2009/0187577 A1 | 7/2009 | Reznik et al. |
| 2009/0191895 A1 | 7/2009 | Singh et al. |
| 2009/0192782 A1 | 7/2009 | Drewes |
| 2009/0198497 A1 | 8/2009 | Kwon |
| 2009/0204409 A1 | 8/2009 | Mozer et al. |
| 2009/0213134 A1 | 8/2009 | Stephanick et al. |
| 2009/0216704 A1 | 8/2009 | Zheng et al. |
| 2009/0222488 A1 | 9/2009 | Boerries et al. |
| 2009/0228273 A1 | 9/2009 | Wang et al. |
| 2009/0228281 A1 | 9/2009 | Singleton et al. |
| 2009/0234655 A1 | 9/2009 | Kwon |
| 2009/0239552 A1 | 9/2009 | Churchill et al. |
| 2009/0240485 A1 | 9/2009 | Dalal et al. |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0249198 A1 | 10/2009 | Davis et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0274315 A1 | 11/2009 | Carnes et al. |
| 2009/0281789 A1 | 11/2009 | Waibel et al. |
| 2009/0287583 A1 | 11/2009 | Holmes |
| 2009/0290718 A1 | 11/2009 | Kahn et al. |
| 2009/0296552 A1 | 12/2009 | Hicks et al. |
| 2009/0299745 A1 | 12/2009 | Kennewick et al. |
| 2009/0299849 A1 | 12/2009 | Cao et al. |
| 2009/0300488 A1 | 12/2009 | Salamon et al. |
| 2009/0304198 A1 | 12/2009 | Herre et al. |
| 2009/0306967 A1 | 12/2009 | Nicolov et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318198 A1 | 12/2009 | Carroll |
| 2009/0319266 A1 | 12/2009 | Brown et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004931 A1 | 1/2010 | Ma et al. |
| 2010/0005081 A1 | 1/2010 | Bennett |
| 2010/0023318 A1 | 1/2010 | Lemoine |
| 2010/0023320 A1 | 1/2010 | Di Cristo et al. |
| 2010/0030928 A1 | 2/2010 | Conroy et al. |
| 2010/0031143 A1 | 2/2010 | Rao et al. |
| 2010/0036655 A1 | 2/2010 | Cecil et al. |
| 2010/0036660 A1 | 2/2010 | Bennett |
| 2010/0042400 A1 | 2/2010 | Block et al. |
| 2010/0049514 A1 | 2/2010 | Kennewick et al. |
| 2010/0054512 A1 | 3/2010 | Solum |
| 2010/0057457 A1 | 3/2010 | Ogata et al. |
| 2010/0057643 A1 | 3/2010 | Yang |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0067723 A1 | 3/2010 | Bergmann et al. |
| 2010/0070899 A1 | 3/2010 | Hunt et al. |
| 2010/0076760 A1 | 3/2010 | Kraenzel et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082327 A1 | 4/2010 | Rogers et al. |
| 2010/0082328 A1 | 4/2010 | Rogers et al. |

(56) References Cited

U.S. PATENT DOCUMENTS

| | | |
|---|---|---|
| 2010/0082329 A1 | 4/2010 | Silverman et al. |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0100212 A1 | 4/2010 | Lindahl et al. |
| 2010/0100384 A1 | 4/2010 | Ju et al. |
| 2010/0103776 A1 | 4/2010 | Chan |
| 2010/0106500 A1 | 4/2010 | McKee et al. |
| 2010/0125460 A1 | 5/2010 | Mellott et al. |
| 2010/0131273 A1 | 5/2010 | Aley-Raz et al. |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0146442 A1 | 6/2010 | Nagasaka et al. |
| 2010/0161313 A1 | 6/2010 | Karttunen |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169097 A1 | 7/2010 | Nachman et al. |
| 2010/0179991 A1 | 7/2010 | Lorch et al. |
| 2010/0185448 A1 | 7/2010 | Meisel |
| 2010/0204986 A1 | 8/2010 | Kennewick et al. |
| 2010/0211199 A1 | 8/2010 | Naik et al. |
| 2010/0217604 A1 | 8/2010 | Baldwin et al. |
| 2010/0222098 A1 | 9/2010 | Garg |
| 2010/0228540 A1 | 9/2010 | Bennett |
| 2010/0228691 A1 | 9/2010 | Yang et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0250542 A1 | 9/2010 | Fujimaki |
| 2010/0250599 A1 | 9/2010 | Schmidt et al. |
| 2010/0257160 A1 | 10/2010 | Cao |
| 2010/0257478 A1 | 10/2010 | Longe et al. |
| 2010/0262599 A1 | 10/2010 | Nitz |
| 2010/0268539 A1 | 10/2010 | Xu et al. |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286985 A1 | 11/2010 | Kennewick et al. |
| 2010/0299133 A1 | 11/2010 | Kopparapu et al. |
| 2010/0299142 A1 | 11/2010 | Freeman et al. |
| 2010/0302056 A1 | 12/2010 | Dutton et al. |
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |
| 2010/0318576 A1 | 12/2010 | Kim |
| 2010/0322438 A1 | 12/2010 | Siotis |
| 2010/0324905 A1 | 12/2010 | Kurzweil et al. |
| 2010/0325588 A1 | 12/2010 | Reddy et al. |
| 2010/0332224 A1 | 12/2010 | Mäkelä et al. |
| 2010/0332235 A1 | 12/2010 | David |
| 2010/0332280 A1 | 12/2010 | Bradley et al. |
| 2010/0332348 A1 | 12/2010 | Cao |
| 2010/0332976 A1 | 12/2010 | Fux et al. |
| 2011/0002487 A1 | 1/2011 | Panther et al. |
| 2011/0010178 A1 | 1/2011 | Lee et al. |
| 2011/0022292 A1 | 1/2011 | Shen et al. |
| 2011/0022952 A1 | 1/2011 | Wu et al. |
| 2011/0033064 A1 | 2/2011 | Johnson et al. |
| 2011/0038489 A1 | 2/2011 | Visser et al. |
| 2011/0047072 A1 | 2/2011 | Ciurea |
| 2011/0047161 A1 | 2/2011 | Myaeng et al. |
| 2011/0054901 A1 | 3/2011 | Qin et al. |
| 2011/0060584 A1 | 3/2011 | Ferrucci et al. |
| 2011/0060587 A1 | 3/2011 | Phillips et al. |
| 2011/0060807 A1 | 3/2011 | Martin et al. |
| 2011/0076994 A1 | 3/2011 | Kim et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0090078 A1 | 4/2011 | Kim et al. |
| 2011/0093261 A1 | 4/2011 | Angott |
| 2011/0099000 A1 | 4/2011 | Rai et al. |
| 2011/0103682 A1 | 5/2011 | Chidlovskii et al. |
| 2011/0106736 A1 | 5/2011 | Aharonson et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0119051 A1 | 5/2011 | Li et al. |
| 2011/0125540 A1 | 5/2011 | Jang et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0143811 A1 | 6/2011 | Rodriguez |
| 2011/0144973 A1 | 6/2011 | Bocchieri et al. |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0179002 A1 | 7/2011 | Dumitru et al. |
| 2011/0179372 A1 | 7/2011 | Moore et al. |
| 2011/0184721 A1 | 7/2011 | Subramanian et al. |
| 2011/0184730 A1 | 7/2011 | LeBeau et al. |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0201387 A1 | 8/2011 | Paek et al. |
| 2011/0218855 A1 | 9/2011 | Cao et al. |
| 2011/0224972 A1 | 9/2011 | Millett et al. |
| 2011/0231182 A1 | 9/2011 | Weider et al. |
| 2011/0231188 A1 | 9/2011 | Kennewick et al. |
| 2011/0231474 A1 | 9/2011 | Locker et al. |
| 2011/0238408 A1 | 9/2011 | Larcheveque et al. |
| 2011/0260861 A1 | 10/2011 | Singh et al. |
| 2011/0264643 A1 | 10/2011 | Cao |
| 2011/0274303 A1 | 11/2011 | Filson et al. |
| 2011/0276598 A1 | 11/2011 | Kozempel |
| 2011/0279368 A1 | 11/2011 | Klein et al. |
| 2011/0288861 A1 | 11/2011 | Kurzweil et al. |
| 2011/0298585 A1 | 12/2011 | Barry |
| 2011/0306426 A1 | 12/2011 | Novak et al. |
| 2011/0314404 A1 | 12/2011 | Kotler et al. |
| 2012/0002820 A1 | 1/2012 | Leichter |
| 2012/0011138 A1 | 1/2012 | Dunning et al. |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | Lebeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0053815 A1 | 3/2012 | Montanari et al. |
| 2012/0078627 A1 | 3/2012 | Wagner |
| 2012/0082317 A1 | 4/2012 | Pance et al. |
| 2012/0084086 A1 | 4/2012 | Gilbert et al. |
| 2012/0108221 A1 | 5/2012 | Thomas et al. |

(56) References Cited

U.S. PATENT DOCUMENTS

| | | | |
|---|---|---|---|
| 2012/0136572 A1 | 5/2012 | Norton | |
| 2012/0137367 A1 | 5/2012 | Dupont et al. | |
| 2012/0149394 A1 | 6/2012 | Singh et al. | |
| 2012/0150580 A1 | 6/2012 | Norton | |
| 2012/0158293 A1 | 6/2012 | Burnham | |
| 2012/0158422 A1 | 6/2012 | Burnham et al. | |
| 2012/0173464 A1 | 7/2012 | Tur et al. | |
| 2012/0185237 A1 | 7/2012 | Gajic et al. | |
| 2012/0197998 A1 | 8/2012 | Kessel et al. | |
| 2012/0214517 A1 | 8/2012 | Singh et al. | |
| 2012/0221339 A1 | 8/2012 | Wang et al. | |
| 2012/0245719 A1 | 9/2012 | Story, Jr. et al. | |
| 2012/0245944 A1* | 9/2012 | Gruber | G06F 17/3087 704/270.1 |
| 2012/0265528 A1 | 10/2012 | Gruber et al. | |
| 2012/0271625 A1 | 10/2012 | Bernard | |
| 2012/0271635 A1 | 10/2012 | Ljolje | |
| 2012/0271676 A1 | 10/2012 | Aravamudan et al. | |
| 2012/0284027 A1 | 11/2012 | Mallett et al. | |
| 2012/0296649 A1 | 11/2012 | Bansal et al. | |
| 2012/0309363 A1 | 12/2012 | Gruber et al. | |
| 2012/0310642 A1 | 12/2012 | Cao et al. | |
| 2012/0310649 A1 | 12/2012 | Cannistraro et al. | |
| 2012/0311583 A1 | 12/2012 | Gruber et al. | |
| 2012/0311584 A1 | 12/2012 | Gruber et al. | |
| 2012/0311585 A1 | 12/2012 | Gruber et al. | |
| 2012/0330660 A1 | 12/2012 | Jaiswal | |
| 2012/0330661 A1 | 12/2012 | Lindahl | |
| 2013/0006638 A1 | 1/2013 | Lindahl | |
| 2013/0031162 A1* | 1/2013 | Willis | H04L 65/1069 709/203 |
| 2013/0110505 A1 | 5/2013 | Gruber et al. | |
| 2013/0110515 A1 | 5/2013 | Guzzoni et al. | |
| 2013/0110518 A1 | 5/2013 | Gruber et al. | |
| 2013/0110519 A1 | 5/2013 | Cheyer et al. | |
| 2013/0110520 A1 | 5/2013 | Cheyer et al. | |
| 2013/0110943 A1* | 5/2013 | Menon | G06Q 10/107 709/206 |
| 2013/0111348 A1 | 5/2013 | Gruber et al. | |
| 2013/0111487 A1 | 5/2013 | Cheyer et al. | |
| 2013/0115927 A1 | 5/2013 | Gruber et al. | |
| 2013/0117022 A1 | 5/2013 | Chen et al. | |
| 2013/0185074 A1 | 7/2013 | Gruber et al. | |
| 2013/0185081 A1 | 7/2013 | Cheyer et al. | |
| 2013/0225128 A1 | 8/2013 | Gomar | |
| 2013/0325443 A1 | 12/2013 | Begeja et al. | |
| 2014/0152577 A1 | 6/2014 | Yuen et al. | |
| 2014/0317030 A1* | 10/2014 | Shen | G06N 3/006 706/12 |

FOREIGN PATENT DOCUMENTS

| | | |
|---|---|---|
| CN | 1864204 A | 11/2006 |
| DE | 3837590 A1 | 5/1990 |
| DE | 4126902 A1 | 2/1992 |
| DE | 4334773 A1 | 4/1994 |
| DE | 4445023 A1 | 6/1996 |
| DE | 10-2004-029203 A1 | 12/2005 |
| DE | 19841541 B4 | 12/2007 |
| EP | 0030390 A1 | 6/1981 |
| EP | 0057514 A1 | 8/1982 |
| EP | 0138061 A1 | 4/1985 |
| EP | 0218859 A2 | 4/1987 |
| EP | 0262938 A1 | 4/1988 |
| EP | 0138061 B1 | 6/1988 |
| EP | 0283995 A2 | 9/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0441089 A2 | 8/1991 |
| EP | 0464712 A2 | 1/1992 |
| EP | 0476972 A2 | 3/1992 |
| EP | 0558312 A1 | 9/1993 |
| EP | 0559349 A1 | 9/1993 |
| EP | 0570660 A1 | 11/1993 |
| EP | 0575146 A2 | 12/1993 |
| EP | 0578604 A1 | 1/1994 |
| EP | 0586996 A2 | 3/1994 |
| EP | 0609030 A1 | 8/1994 |
| EP | 0651543 A2 | 5/1995 |
| EP | 0679005 A1 | 10/1995 |
| EP | 0795811 A1 | 9/1997 |
| EP | 0476972 B1 | 5/1998 |
| EP | 0845894 A2 | 6/1998 |
| EP | 0863453 A1 | 9/1998 |
| EP | 0863469 A2 | 9/1998 |
| EP | 0867860 A2 | 9/1998 |
| EP | 0869697 A2 | 10/1998 |
| EP | 0559349 B1 | 1/1999 |
| EP | 0889626 A1 | 1/1999 |
| EP | 0917077 A2 | 5/1999 |
| EP | 0691023 B1 | 9/1999 |
| EP | 0946032 A2 | 9/1999 |
| EP | 0981236 A1 | 2/2000 |
| EP | 0982732 A1 | 3/2000 |
| EP | 0984430 A2 | 3/2000 |
| EP | 1001588 A2 | 5/2000 |
| EP | 1014277 A1 | 6/2000 |
| EP | 1028425 A2 | 8/2000 |
| EP | 1028426 A2 | 8/2000 |
| EP | 1047251 A2 | 10/2000 |
| EP | 1076302 A1 | 2/2001 |
| EP | 1091615 A1 | 4/2001 |
| EP | 1229496 A2 | 8/2002 |
| EP | 1233600 A2 | 8/2002 |
| EP | 1245023 A1 | 10/2002 |
| EP | 1311102 A1 | 5/2003 |
| EP | 1315084 A1 | 5/2003 |
| EP | 1315086 A1 | 5/2003 |
| EP | 1347361 A1 | 9/2003 |
| EP | 1379061 A2 | 1/2004 |
| EP | 1432219 A1 | 6/2004 |
| EP | 1517228 A2 | 3/2005 |
| EP | 1536612 A1 | 6/2005 |
| EP | 1566948 A1 | 8/2005 |
| EP | 1693829 A1 | 8/2006 |
| EP | 1818786 A1 | 8/2007 |
| EP | 1892700 A1 | 2/2008 |
| EP | 1912205 A2 | 4/2008 |
| EP | 1939860 A1 | 7/2008 |
| EP | 0651543 B1 | 9/2008 |
| EP | 1909263 B1 | 1/2009 |
| EP | 1335620 B1 | 3/2009 |
| EP | 2094032 A1 | 8/2009 |
| EP | 2109295 A1 | 10/2009 |
| EP | 1720375 B1 | 7/2010 |
| EP | 2205010 A1 | 7/2010 |
| EP | 2400373 A1 | 12/2011 |
| EP | 2431842 A2 | 3/2012 |
| GB | 2293667 A | 4/1996 |
| GB | 2310559 A | 8/1997 |
| GB | 2342802 A | 4/2000 |
| GB | 2384399 A | 7/2003 |
| GB | 2402855 A | 12/2004 |
| GB | 2445436 A | 7/2008 |
| IT | FI20010199 A1 | 4/2003 |
| JP | 57-41731 A | 3/1982 |
| JP | 59-57336 A | 4/1984 |
| JP | 2-86397 A | 3/1990 |
| JP | 2-153415 A | 6/1990 |
| JP | 3-113578 A | 5/1991 |
| JP | 4-236624 A | 8/1992 |
| JP | 5-79951 A | 3/1993 |
| JP | 5-165459 A | 7/1993 |
| JP | 5-293126 A | 11/1993 |
| JP | 6-19965 A | 1/1994 |
| JP | 6-69954 A | 3/1994 |
| JP | 6-274586 A | 9/1994 |
| JP | 6-332617 A | 12/1994 |

(56) References Cited

FOREIGN PATENT DOCUMENTS

| | | |
|---|---|---|
| JP | 7-199379 A | 8/1995 |
| JP | 7-320051 A | 12/1995 |
| JP | 7-320079 A | 12/1995 |
| JP | 8-63330 A | 3/1996 |
| JP | 8-185265 A | 7/1996 |
| JP | 8-227341 A | 9/1996 |
| JP | 9-18585 A | 1/1997 |
| JP | 9-55792 A | 2/1997 |
| JP | 9-259063 A | 10/1997 |
| JP | 9-265457 A | 10/1997 |
| JP | 10-105324 A | 4/1998 |
| JP | 11-6743 A | 1/1999 |
| JP | 11-45241 A | 2/1999 |
| JP | 2000-99225 A | 4/2000 |
| JP | 2000-134407 A | 5/2000 |
| JP | 2000-339137 A | 12/2000 |
| JP | 2001-56233 A | 2/2001 |
| JP | 2001-125896 A | 5/2001 |
| JP | 2001-148899 A | 5/2001 |
| JP | 2002-14954 A | 1/2002 |
| JP | 2002-024212 A | 1/2002 |
| JP | 2002-82893 A | 3/2002 |
| JP | 2003-44091 A | 2/2003 |
| JP | 2003-84877 A | 3/2003 |
| JP | 2003-517158 A | 5/2003 |
| JP | 2003-233568 A | 8/2003 |
| JP | 2004-48804 A | 2/2004 |
| JP | 2004-505525 A | 2/2004 |
| JP | 2004-152063 A | 5/2004 |
| JP | 2005-86624 A | 3/2005 |
| JP | 2005-92441 A | 4/2005 |
| JP | 2005-181386 A | 7/2005 |
| JP | 2005-221678 A | 8/2005 |
| JP | 2005-311864 A | 11/2005 |
| JP | 2006-146008 A | 6/2006 |
| JP | 2007-4633 A | 1/2007 |
| JP | 2008-26381 A | 2/2008 |
| JP | 2008-97003 A | 4/2008 |
| JP | 2008-236448 A | 10/2008 |
| JP | 2008-271481 A | 11/2008 |
| JP | 2009-036999 A | 2/2009 |
| JP | 2009-98490 A | 5/2009 |
| JP | 2009-294913 A | 12/2009 |
| JP | 2010-535377 A | 11/2010 |
| KR | 10-1999-0073234 | 10/1999 |
| KR | 10-2002-0069952 A | 9/2002 |
| KR | 10-2003-0016993 A | 3/2003 |
| KR | 10-2005-0083561 A | 8/2005 |
| KR | 10-2006-0012730 A | 2/2006 |
| KR | 10-2006-0073574 A | 6/2006 |
| KR | 10-2007-0071675 A | 7/2007 |
| KR | 10-0757496 B1 | 9/2007 |
| KR | 10-0776800 B1 | 11/2007 |
| KR | 10-0801227 B1 | 2/2008 |
| KR | 10-0810500 B1 | 3/2008 |
| KR | 10-2008-0049647 A | 6/2008 |
| KR | 10-2008-0109322 A | 12/2008 |
| KR | 10-2009-0001716 A | 1/2009 |
| KR | 10-2009-0086805 A | 8/2009 |
| KR | 10-0920267 B1 | 10/2009 |
| KR | 10-2010-0119519 A | 11/2010 |
| KR | 10-1032792 B1 | 5/2011 |
| KR | 10-2011-0113414 A | 10/2011 |
| NL | 1014847 C1 | 10/2001 |
| WO | 1993/020640 A1 | 10/1993 |
| WO | 1994/029788 A1 | 12/1994 |
| WO | 1995/002221 A1 | 1/1995 |
| WO | 1995/016950 A1 | 6/1995 |
| WO | 1995/017746 A1 | 6/1995 |
| WO | 1997/010586 A1 | 3/1997 |
| WO | 1997/026612 A1 | 7/1997 |
| WO | 1997/029614 A1 | 8/1997 |
| WO | 1997/038488 A1 | 10/1997 |
| WO | 1998/009270 A1 | 3/1998 |
| WO | 1998/033111 A1 | 7/1998 |
| WO | 1998/041956 A1 | 9/1998 |
| WO | 1999/001834 A1 | 1/1999 |
| WO | 1999/008238 A1 | 2/1999 |
| WO | 1999/016181 A1 | 4/1999 |
| WO | 1999/056227 A1 | 11/1999 |
| WO | 2000/019697 A1 | 4/2000 |
| WO | 2000/022820 A1 | 4/2000 |
| WO | 2000/029964 A1 | 5/2000 |
| WO | 2000/030070 A2 | 5/2000 |
| WO | 2000/038041 A1 | 6/2000 |
| WO | 2000/044173 A1 | 7/2000 |
| WO | 2000/060435 A2 | 10/2000 |
| WO | 2000/063766 A1 | 10/2000 |
| WO | 2000/068936 A1 | 11/2000 |
| WO | 2001/006489 A1 | 1/2001 |
| WO | 2001/030046 A2 | 4/2001 |
| WO | 2001/060435 A3 | 4/2001 |
| WO | 2001/033569 A1 | 5/2001 |
| WO | 2001/035391 A1 | 5/2001 |
| WO | 2001/046946 A1 | 6/2001 |
| WO | 2001/065413 A1 | 9/2001 |
| WO | 2001/067753 A1 | 9/2001 |
| WO | 2002/025610 A1 | 3/2002 |
| WO | 2002/031814 A1 | 4/2002 |
| WO | 2002/037469 A2 | 5/2002 |
| WO | 2002/073603 A1 | 9/2002 |
| WO | 2003/003152 A2 | 1/2003 |
| WO | 2003/003765 A1 | 1/2003 |
| WO | 2003/023786 A2 | 3/2003 |
| WO | 2003/041364 A2 | 5/2003 |
| WO | 2003/049494 A1 | 6/2003 |
| WO | 2003/056789 A1 | 7/2003 |
| WO | 2003/067202 A2 | 8/2003 |
| WO | 2003/084196 A1 | 10/2003 |
| WO | 2004/008801 A1 | 1/2004 |
| WO | 2004/025938 A1 | 3/2004 |
| WO | 2004/047415 A1 | 6/2004 |
| WO | 2004/055637 A2 | 7/2004 |
| WO | 2004/057486 A1 | 7/2004 |
| WO | 2004/061850 A1 | 7/2004 |
| WO | 2004/084413 A2 | 9/2004 |
| WO | 2005/003920 A2 | 1/2005 |
| WO | 2005/008505 A1 | 1/2005 |
| WO | 2005/008899 A1 | 1/2005 |
| WO | 2005/010725 A2 | 2/2005 |
| WO | 2005/027472 A2 | 3/2005 |
| WO | 2005/027485 A1 | 3/2005 |
| WO | 2005/031737 A1 | 4/2005 |
| WO | 2005/034085 A1 | 4/2005 |
| WO | 2005/041455 A1 | 5/2005 |
| WO | 2005/059895 A1 | 6/2005 |
| WO | 2006/020305 A2 | 2/2006 |
| WO | 2006/054724 A1 | 5/2006 |
| WO | 2006/056822 A1 | 6/2006 |
| WO | 2006/078246 A1 | 7/2006 |
| WO | 2006/101649 A2 | 9/2006 |
| WO | 2006/129967 A1 | 12/2006 |
| WO | 2006/133571 A1 | 12/2006 |
| WO | 2007/002753 A2 | 1/2007 |
| WO | 2007/080559 A2 | 7/2007 |
| WO | 2007/083894 A1 | 7/2007 |
| WO | 2008/071231 A1 | 6/2008 |
| WO | 2008/085742 A2 | 7/2008 |
| WO | 2008/109835 A2 | 9/2008 |
| WO | 2008/140236 A1 | 11/2008 |
| WO | 2008/153639 A1 | 12/2008 |
| WO | 2009/009240 A2 | 1/2009 |
| WO | 2009/017280 A1 | 2/2009 |
| WO | 2009/156438 A1 | 12/2009 |
| WO | 2010/075623 A1 | 7/2010 |
| WO | 2011/057346 A1 | 5/2011 |
| WO | 2011/088053 A2 | 7/2011 |
| WO | 2011/133543 A1 | 10/2011 |
| WO | 2011/150730 A1 | 12/2011 |

(56) References Cited

FOREIGN PATENT DOCUMENTS

WO   2011/163350 A1   12/2011
WO   2012/167168 A2   12/2012

OTHER PUBLICATIONS

"Meet Ivee, Your Wi-Fi Voice Activated Assistant", available at <http://www.helloivee.com/>, retrieved on Feb. 10, 2014, 8 pages.
"Speaker Recognition", Wikipedia, The Free Enclyclopedia, Nov. 2, 2010, 4 pages.
International Preliminary Report on Patentability received for PCT Patent Application No. PCT/US2012/029810, dated Oct. 3, 2013, 9 pages.
International Search Report and Written Opinion received for PCT Patent Application No. PCT/US2012/029810, dated Aug. 17, 2012, 11 pages.
Extended European Search Report and Search Opinion received for European Patent Application No. 12185276.8, dated Dec. 18, 2012, 4 pages.
Extended European Search Report received for European Patent Application No. 12186663.6, dated Jul. 16, 2013, 6 pages.
Apple Computer, "Knowledge Navigator", published by Apple Computer no later than 2008, as depicted in Exemplary Screenshots from video entitled 'Knowledge Navigator', 2008, 7 pages.
Applebaum et al., "Enhancing the Discrimination of Speaker Independent Hidden Markov Models with Corrective Training", International Conference on Acoustics, Speech, and Signal Processing, May 23, 1989, pp. 302-305.
Bellegarda, Jerome R. "Latent Semantic Mapping", IEEE Signal Processing Magazine, vol. 22, No. 5, Sep. 2005, pp. 70-80.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Chang et al., "Discriminative Training of Dynamic Programming based Speech Recognizers", IEEE Transactions on Speech and Audio Processing, vol. 1, No. 2, Apr. 1993, pp. 135-143.
Cheyer et al., "Demonstration Video of Multimodal Maps Using an Agent Architecture", published by SRI International no later than 1996, as depicted in Exemplary Screenshots from video entitled Demonstration Video of Multimodal Maps Using an Agent Architecture, 1996, 6 pages.
Cheyer et al., "Demonstration Video of Multimodal Maps Using an Open-Agent Architecture", published by SRI International no later than 1996, as depicted in Exemplary Screenshots from video entitled Demonstration Video of Multimodal Maps Using an Open-Agent Architecture, 6 pages.
Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.
Choi et al., "Acoustic and Visual Signal based Context Awareness System for Mobile Application", IEEE Transactions on Consumer Electronics, vol. 57, No. 2, May 2011, pp. 738-746.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Navigli, Roberto, "Word Sense Disambiguation: A Survey", ACM Computing Surveys, vol. 41, No. 2, Feb. 2009, 70 pages.
International Search Report and Written Opinion received for PCT Patent Application No. PCT/US2014/015418, dated Aug. 26, 2014, 17 pages.
Guim, Mark, "How to Set a Person-Based Reminder with Cortana", available at <http://www.wpcentral.com/how-to-person-based-reminder-cortana>, Apr. 26, 2014, 15 pages.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.

Roddy et al., "Interface Issues in Text Based Chat Rooms", SIGCHI Bulletin, vol. 30, No. 2, Apr. 1998, pp. 119-123.
Viegas et al., "Chat Circles", SIGCHI Conference on Human Factors in Computing Systems, May 15-20, 1999, pp. 9-16.
Markel et al., "Linear Prediction of Speech", Springer-Verlag, Berlin, Heidelberg, New York, 1976, 12 pages.
Martin et al., "Building and Using Practical Agent Applications", SRI International, PAAM Tutorial, 1998, 78 pages.
Martin et al., "Building Distributed Software Systems with the Open Agent Architecture", Proceedings of the Third International Conference on the Practical Application of Intelligent Agents and Multi-Agent Technology, Mar. 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the Second International Conference on the Practical Application of Intelligent Agents and Multi-Agent Technology, Apr. 1997, pp. 1-20.
Martin et al., "Transportability and Generality in a Natural-Language Interface System", Proceedings of the Eighth International Joint Conference on Artificial Intelligence, Technical Note 293, Aug. 1983, 21 pages.
Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf> >, retrieved from internet on Jan.-Mar. 1999.
Matiasek et al., "Tamic-P: A System for NL Access to Social Insurance Database", 4th International Conference on Applications of Natural Language to Information Systems, Jun. 1999, 7 pages.
Mcguire et al., "SHADE: Technology for Knowledge-Based Collaborative Engineering", Journal of Concurrent Engineering Applications and Research (CERA), 1993, 18 pages.
Meng et al., "Wheels: A Conversational System in the Automobile Classified Domain", Proceedings of Fourth International Conference on Spoken Language, ICSLP 96, vol. 1, Oct. 1996, 4 pages.
Michos et al., "Towards an Adaptive Natural Language Interface to Command Languages", Natural Language Engineering, vol. 2, No. 3, 1996, pp. 191-209.
Milstead et al., "Metadata: Cataloging by Any Other Name", available at <http://www.iicm.tugraz.at/thesis/cguetl_diss/literatur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Advances in Database Technology, Lecture Notes in Computer Science, vol. 1777, 2000, pp. 1-15.
Modi et al., "CMRadar: A Personal Assistant Agent for Calendar Management", AAAI, Intelligent Systems Demonstrations, 2004, pp. 1020-1021.
Moore et al., "Combining Linguistic and Statistical Knowledge Sources in Natural-Language Processing for ATIS", SRI International, Artificial Intelligence Center, 1995, 4 pages.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore et al., "SRI's Experience with the ATIS Evaluation", Proceedings of the Workshop on Speech and Natural Language, Jun. 1990, pp. 147-148.
Moore et al., "The Information Warfare Advisor: An Architecture for Interacting with Intelligent Agents Across the Web", Proceedings of Americas Conference on Information Systems (AMCIS), Dec. 31, 1998, pp. 186-188.

(56) References Cited

OTHER PUBLICATIONS

Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-Based User Interfaces", Proceedings of International Workshop on Human Interface Technology, Oct. 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Apple Computer, Inc., Addison-Wesley Publishing Company, Inc., 1990, 17 pages.
Mozer, Michael C., "An Intelligent Environment must be Adaptive", IEEE Intelligent Systems, 1999, pp. 11-13.
Murty et al., "Combining Evidence from Residual Phase and MFCC Features for Speaker Recognition", IEEE Signal Processing Letters, vol. 13, No. 1, Jan. 2006, 4 pages.
Murveit et al., "Integrating Natural Language Constraints into HMM-Based Speech Recognition", International Conference on Acoustics, Speech and Signal Processing, Apr. 1990, 5 pages.
Murveit et al., "Speech Recognition in SRI's Resource Management and ATIS Systems", Proceedings of the Workshop on Speech and Natural Language, 1991, pp. 94-100.
Nakagawa et al., "Speaker Recognition by Combining MFCC and Phase Information", IEEE International Conference on Acoustics, Speech and Signal Processing (ICASSP), Mar. 2010, 4 pages.
Naone, Erica, "TR10: Intelligent Software Assistant", Technology Review, Mar.-Apr. 2009, 2 pages.
Neches et al., "Enabling Technology for Knowledge Sharing", Fall, 1991, pp. 37-56.
Niesler et al., "A Variable-Length Category-Based N-Gram Language Model", IEEE International Conference on Acoustics, Speech and Signal Processing (ICASSP'96), vol. 1, May 1996, 6 pages.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
Odubiyi et al., "SAIRE-A Scalable Agent-Based Information Retrieval Engine", Proceedings of the First International Conference on Autonomous Agents, 1997, 12 pages.
Owei et al., "Natural Language Query Filtration in the Conceptual Query Language", IEEE, 1997, pp. 539-549.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.
Parson, T. W., "Voice and Speech Processing", Pitch and Formant Estimation, McGraw-Hill, Inc., ISBN: 0-07-0485541-0, 1987, 15 pages.
Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Search Report received for PCT Patent Application No. PCT/US1993/012666, dated Nov. 9, 1994, 8 pages.
International Preliminary Report on Patentability received for PCT Patent Application No. PCT/US1994/011011, dated Feb. 28, 1996, 4 pages.
International Search Report received for PCT Patent Application No. PCT/US1994/011011, dated Feb. 8, 1995, 7 pages.
Written Opinion received for PCT Patent Application No. PCT/US1994/011011, dated Aug. 21, 1995, 4 pages.
International Preliminary Report on Patentability received for PCT Patent Application No. PCT/US1995/008369, dated Oct. 9, 1996, 4 pages.
International Search Report received for PCT Patent Application No. PCT/US1995/008369, dated Nov. 8, 1995, 6 pages.
International Search Report and Written Opinion received for PCT Patent Application No. PCT/US2010/037378, dated Aug. 25, 2010, 14 pages.
International Search Report and Written Opinion received for PCT Patent Application No. PCT/US2011/020861, dated Nov. 29, 2011, 12 pages.
International Search Report and Written Opinion received for PCT Patent Application No. PCT/US2012/040571, dated Nov. 16, 2012, 14 pages.
International Search Report and Written Opinion received for PCT Patent Application No. PCT/US2012/056382, dated Dec. 20, 2012, 11 pages.
Pereira, Fernando, "Logic for Natural Language Analysis", SRI International, Technical Note 275, Jan. 1983, 194 pages.
Perrault et al., "Natural-Language Interfaces", SRI International, Technical Note 393, Aug. 22, 1986, 48 pages.
Phoenix Solutions, Inc., "Declaration of Christopher Schmandt Regarding the MIT Galaxy System", West Interactive Corp., A Delaware Corporation, Document 40, Jul. 2, 2010, 162 pages.
Picone, J., "Continuous Speech Recognition using Hidden Markov Models", IEEE ASSP Magazine, vol. 7, No. 3, Jul. 1990, 16 pages.
Pulman et al., "Clare: A Combined Language and Reasoning Engine", Proceedings of JFIT Conference, available at <http://www.cam.sri.com/tr/crc042/paper.ps.Z>, 1993, 8 pages.
Rabiner et al., "Fundamental of Speech Recognition", AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.
Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.
Rayner, M., "Abductive Equivalential Translation and its Application to Natural Language Database Interfacing", Dissertation Paper, SRI International, Sep. 1993, 162 pages.
Rayner et al., "Adapting the Core Language Engine to French and Spanish", Cornell University Library, available at <http:l/arxiv.org/abs/cmp-lg/9605015>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner, Manny, "Linguistic Domain Theories: Natural-Language Database Interfacing from First Principles", SRI International, Cambridge, 1993, 11 pages.
Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.

(56) References Cited

OTHER PUBLICATIONS

Remde et al., "SuperBook: An Automatic Tool for Information Exploration-Hypertext?", In Proceedings of Hypertext, 87 Papers, Nov. 1987, 14 pages.
Reynolds, C. F., "On-Line Reviews: A New Application of the HICOM Conferencing System", IEEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.
Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech and Signal Processing (ICASSP'79), Apr. 1979, 5 pages.
Roddy et al., "Communication and Collaboration in a Landscape of B2B eMarketplaces", VerticalNet Solutions, White Paper, Jun. 15, 2000, 23 pages.
Rosenfeld, R., "A Maximum Entropy Approach to Adaptive Statistical Language Modelling", Computer Speech and Language, vol. 10, No. 3, Jul. 1996, 25 pages.
Roszkiewicz, A., "Extending your Apple", Back Talk-Lip Service, A+ Magazine, The Independent Guide for Apple Computing, vol. 2, No. 2, Feb. 1984, 5 pages.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approach", Prentice Hall, Inc., 1995, 121 pages.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech and Signal Processing, vol. ASSP-26, No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with Security Attributes and Privilege Delegation Access control beyond the ACL", Computer Communications, vol. 20, 1997, 9 pages.
San-Segundo et al., "Confidence Measures for Dialogue Management in the CU Communicator System", Proceedings of Acoustics, Speech and Signal Processing (ICASSP'00), Jun. 2000, 4 pages.
Sato, H., "A Data Model, Knowledge Base and Natural Language Processing for Sharing a Large Statistical Database", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, 15 pages.
Scagliola, C., "Language Models and Search Algorithms for Real-Time Speech Recognition", International Journal of Man-Machine Studies, vol. 22, No. 5, 1985, 25 pages.
Schmandt et al., "Augmenting a Window System with Speech Input", IEEE Computer Society, Computer, vol. 23, No. 8, Aug. 1990, 8 pages.
Schnelle, Dirk, "Context Aware Voice User Interfaces for Workflow Support", Dissertation paper, Aug. 27, 2007, 254 pages.
Schütze, H., "Dimensions of Meaning", Proceedings of Supercomputing'92 Conference, Nov. 1992, 10 pages.
Seneff et al., "A New Restaurant Guide Conversational System: Issues in Rapid Prototyping for Specialized Domains", Proceedings of Fourth International Conference on Spoken Language, vol. 2, 1996, 4 pages.
Sharoff et al., "Register-Domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", Proceedings of the Ninth Conference on Artificial Intelligence for Applications, Mar. 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation through Vector Quantization", IEEE International Conference on Acoustics, Speech and Signal Processing (ICASSP'86), vol. 11, Apr. 1986, 4 pages.
Apple Computer, Inc., "iTunes 2: Specification Sheet", 2001, 2 pages.
Apple Computer, Inc., "iTunes, Playlist Related Help Screens", iTunes v1.0, 2000-2001, 8 pages.
Apple Computer, Inc., "QuickTime Movie Playback Programming Guide", Aug. 11, 2005, pp. 1-58.
Apple Computer, Inc., "QuickTime Overview", Aug. 11, 2005, pp. 1-34.
Apple Computer, Inc., "Welcome to Tiger", available at <http://www.maths.dundee.ac.uk/software/Welcome_to_Mac_OS_X_v10.4_Tiger.pdf>, 2005, pp. 1-32.
"Corporate Ladder", BLOC Publishing Corporation, 1991, 1 page.
Arango et al., "Touring Machine: A Software Platform for Distributed Multimedia Applications", 1992 IFIP International Conference on Upper Layer Protocols, Architectures, and Applications, May 1992, pp. 1-11.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Badino et al., "Language Independent Phoneme Mapping for Foreign TTS", 5th ISCA Speech Synthesis Workshop, Pittsburgh, PA, Jun. 14-16, 2004, 2 pages.
Baechtle et al., "Adjustable Audio Indicator", IBM Technical Disclosure Bulletin, Jul. 1, 1984, 2 pages.
Baeza-Yates, Ricardo, "Visualization of Large Answers in Text Databases", AVI '96 Proceedings of the Workshop on Advanced Visual Interfaces, 1996, pp. 101-107.
Bahl et al., "Recognition of a Continuously Read Natural Corpus", IEEE International Conference on Acoustics, Speech, and Signal Processing, vol. 3, Apr. 1978, pp. 422-424.
Bajarin, Tim, "With Low End Launched, Apple Turns to Portable Future", PC Week, vol. 7, Oct. 1990, p. 153 (1).
Barthel, B., "Information Access for Visually Impaired Persons: Do We Still Keep a "Document" in "Documentation"?", Professional Communication Conference, Sep. 1995, pp. 62-66.
Baudel et al., "2 Techniques for Improved HC Interaction: Toolglass & Magic Lenses: The See-Through Interface", Apple Inc., Video Clip, CHI'94 Video Program on a CD, 1994.
Beck et al., "Integrating Natural Language, Query Processing, and Semantic Data Models", COMCON Spring '90. IEEE Computer Society International Conference, 1990, Feb.26-Mar. 2, 1990, pp. 538-543.
Bederson et al., "PAD++: A Zooming Graphical Interface for Exploring Alternate Interface Physics", UIST' 94 Proceedings of the 7th Annual ACM symposium on User Interface Software and Technology, Nov. 1994, pp. 17-26.
Bederson et al., "The Craft of Information Visualization", Elsevier Science, Inc., 2003, 435 pages.
"Diagrammaker", Action Software, 1989.
"Diagram-Master", Ashton-Tate, 1989.

(56) References Cited

OTHER PUBLICATIONS

Benel et al., "Optimal Size and Spacing of Touchscreen Input Areas", Human-Computer Interaction—INTERACT, 1987, pp. 581-585.

Beringer et al., "Operator Behavioral Biases Using High-Resolution Touch Input Devices", Proceedings of the Human Factors and Ergonomics Society 33rd Annual Meeting, 1989, 3 pages.

Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.

Bernabei et al., "Graphical I/O Devices for Medical Users", 14th Annual International Conference of the IEEE on Engineering in Medicine and Biology Society, vol. 3, 1992, pp. 834-836.

Bernstein, Macrophone, "Speech Corpus", IEEE/ICASSP, Apr. 22, 1994, pp. 1-81 to 1-84.

Berry et al., "Symantec", New version of MORE.TM, Apr. 10, 1990, 1 page.

Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.

Betts et al., "Goals and Objectives for User Interface Software", Computer Graphics, vol. 21, No. 2, Apr. 1987, pp. 73-78.

Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.

Bier et al., "Toolglass and Magic Lenses: The See-Through Interface", Computer Graphics (SIGGRAPH '93 Proceedings), vol. 27, 1993, pp. 73-80.

Birrell, Andrew, "Personal Jukebox (PJB)", available at <http://birrell.org/andrew/talks/pjb-overview.ppt>, Oct. 13, 2000, 6 pages.

Black et al., "Multilingual Text-to-Speech Synthesis", Acoustics, Speech and Signal Processing (ICASSP'04) Proceedings of the IEEE International Conference, vol. 3, May 17-21, 2004, 4 pages.

Bleher et al., "A Graphic Interactive Application Monitor", IBM Systems Journal, vol. 19, No. 3, Sep. 1980, pp. 382-402.

Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.

Bocchieri et al., "Use of Geographical Meta-Data in ASR Language and Acoustic Models", IEEE International Conference on Acoustics Speech and Signal Processing, 2010, pp. 5118-5121.

Bociurkiw, Michael, "Product Guide: Vanessa Matz", available at <http://www.forbes.com/asap/2000/1127/vmartz_print.html>, retrieved on Jan. 23, 2003, 2 pages.

"Glossary of Adaptive Technologies: Word Prediction", available at <http://www.utoronto.ca/atrc/reference/techwordpred.html>, retrieved on Dec. 6, 2005, 5 pages.

Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.

Boy, Guy A., "Intelligent Assistant Systems", Harcourt Brace Jovanovicy, 1991, 1 page.

"IAP Sports Lingo 0x09 Protocol V1.00", May 1, 2006, 17 pages.

Brown et al., "Browing Graphs Using a Fisheye View", Apple Inc., Video Clip, Systems Research Center, CHI '92 Continued Proceedings on a CD, 1992.

Brown et al., "Browsing Graphs Using a Fisheye View", CHI '93 Proceedings of the Interact '93 and CHI '93 Conference on Human Factors in Computing Systems, 1993, p. 516.

Burger, D., "Improved Access to Computers for the Visually Handicapped: New Prospects and Principles", IEEE Transactions on Rehabilitation Engineering, vol. 2, No. 3, Sep. 1994, pp. 111-118.

"IEEE 1394 (Redirected from Firewire", Wikipedia, The Free Encyclopedia, available at <http://www.wikipedia.org/wiki/Firewire>, retrieved on Jun. 8, 2003, 2 pages.

Butler, Travis, "Archos Jukebox 6000 Challenges Nomad Jukebox", available at <http:tidbits.com/article/6521>, Aug. 13, 2001, 5 pages.

Butler, Travis, "Portable MP3: The Nomad Jukebox", available at <http://tidbits.com/article/6261>, Jan. 8, 2001, 4 pages.

Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.

CALL Centre, "Word Prediction", The CALL Centre & Scottish Executive Education Dept., 1999, pp. 63-73.

Campbell et al., "An Expandable Error-Protected 4800 BPS CELP Coder (U.S. Federal Standard 4800 BPS Voice Coder)", (Proceedings of IEEE Int'l Acoustics, Speech, and Signal Processing Conference, May 1983), as reprinted in Vector Quantization (IEEE Press, 1990), 1990, pp. 328-330.

Card et al., "Readings in Information Visualization Using Vision to Think", Interactive Technologies, 1999, 712 pages.

IBM, "Integrated Audio-Graphics User Interface", IBM Technical Disclosure Bulletin, vol. 33, No. 11, Apr. 1991, 4 pages.

IBM, "Speech Recognition with Hidden Markov Models of Speech Waveforms", IBM Technical Disclosure Bulletin, vol. 34, No. 1, Jun. 1991, 10 pages.

Intraspect Software, "The Intraspect Knowledge Management Solution: Technical Overview", available at <http://tomgruber.org/writing/intraspect-whitepaper-1998.pdf>, 1998, 18 pages.

Iowegian International, "FIR Filter Properties, DSPGuru, Digital Signal Processing Central", available at <http://www.dspguru.com/dsp/faq/fir/properties> retrieved on Jul. 28, 2010, 6 pages.

Issar et al., "CMU's Robust Spoken Language Understanding System", Proceedings of Eurospeech, 1993, 4 pages.

Issar, Sunil, "Estimation of Language Models for New Spoken Language Applications", Proceedings of 4th International Conference on Spoken language Processing, Oct. 1996, 4 pages.

Jacobs et al., "Scisor: Extracting Information from On-Line News", Communications of the ACM, vol. 33, No. 11, Nov. 1990, 10 pages.

Janas, Jurgen M., "The Semantics-Based Natural Language Interface to Relational Databases", Chapter 6, Cooperative Interfaces to Information Systems, 1986, pp. 143-188.

Jelinek, F., "Self-Organized Language Modeling for Speech Recognition", Readings in Speech Recognition, Edited by Alex Waibel and Kai-Fu Lee, Morgan Kaufmann Publishers, Inc., ISBN: 1-55860-124-4, 1990, 63 pages.

Jennings et al., "A Personal News Service Based on a User Model Neural Network", IEICE Transactions on Information and Systems, vol. E75-D, No. 2, Mar. 1992, 12 pages.

Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.

Johnson, Julia Ann., "A Data Management Strategy for Transportable Natural Language Interfaces", Doctoral Thesis Submitted to the Department of Computer Science, University of British Columbia, Canada, Jun. 1989, 285 pages.

Jones, J., "Speech Recognition for Cyclone", Apple Computer, Inc., E.R.S. Revision 2.9, Sep. 10, 1992, 93 pages.

Julia et al., "http://www.speech.sri.com/demos/atis.html", Proceedings of AAAI, Spring Symposium, 1997, 5 pages.

Julia et al., "Un Editeur Interactif De Tableaux Dessines a Main Levee (An Interactive Editor for Hand-Sketched Tables)", Traitement du Signal, vol. 12, No. 6, 1995, pp. 619-626.

Kahn et al., "CoABS Grid Scalability Experiments", Autonomous Agents and Multi-Agent Systems, vol. 7, 2003, pp. 171-178.

Kamel et al., "A Graph Based Knowledge Retrieval System", IEEE International Conference on Systems, Man and Cybernetics, 1990, pp. 269-275.

Karp, P. D., "A Generic Knowledge-Base Access Protocol", Available online at <http://lecture.cs.buu.ac.th/-f50353/Document/gfp.pdf>, May 12, 1994, 66 pages.

(56) References Cited

OTHER PUBLICATIONS

Katz, Boris, "A Three-Step Procedure for Language Generation", Massachusetts Institute of Technology, A.I. Memo No. 599, Dec. 1980, pp. 1-40.

Katz, Boris, "Annotating the World Wide Web Using Natural Language", Proceedings of the 5th RIAO Conference on Computer Assisted Information Searching on the Internet, 1997, 7 pages.

Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.

Katz et al., "Exploiting Lexical Regularities in Designing Natural Language Systems", Proceedings of the 12th International Conference on Computational Linguistics, 1988, pp. 1-22.

Katz et al., "REXTOR: A System for Generating Relations from Natural Language", Proceedings of the ACL Workshop on Natural Language Processing and Information Retrieval (NLP&IR), Oct. 2000, 11 pages.

Katz, Boris, "Using English for Indexing and Retrieving", Proceedings of the 1st RIAO Conference on User-Oriented Content-Based Text and Image Handling, 1988, pp. 314-332.

Kitano, H., "PhiDM-Dialog, An Experimental Speech-to-Speech Dialog Translation System", Computer, vol. 24, No. 6, Jun. 1991, 13 pages.

Klabbers et al., "Reducing Audible Spectral Discontinuities", IEEE Transactions on Speech and Audio Processing, vol. 9, No. 1, Jan. 2001, 13 pages.

Klatt et al., "Linguistic Uses of Segmental Duration in English: Acoustic and Perpetual Evidence", Journal of the Acoustical Society of America, vol. 59, No. 5, May 1976, 16 pages.

Knownav, "Knowledge Navigator", YouTube Video available at <http://www.youtube.com/watch?v=QRH8eimU_20>, Apr. 29, 2008, 1 page.

Kominek et al., "Impact of Durational Outlier Removal from Unit Selection Catalogs", 5th ISCA Speech Synthesis Workshop, Jun. 14-16, 2004, 6 pages.

Konolige, Kurt, "A Framework for a Portable Natural-Language Interface to Large Data Bases", SRI International, Technical Note 197, Oct. 12, 1979, 54 pages.

Kubala et al., "Speaker Adaptation from a Speaker-Independent Training Corpus", International Conference on Acoustics, Speech and Signal Processing (ICASSP'90), Apr. 1990, 4 pages.

Kubala et al., "The Hub and Spoke Paradigm for CSR Evaluation", Proceedings of the Spoken Language Technology Workshop, Mar. 1994, 9 pages.

Laird et al., "SOAR: An Architecture for General Intelligence", Artificial Intelligence, vol. 33, 1987, pp. 1-64.

Langley et al., "A Design for the ICARUS Architechture", SIGART Bulletin, vol. 2, No. 4, 1991, pp. 104-109.

Larks, "Intelligent Software Agents", available at <http://www.cs.cmu.edu/~softagents/larks.html> retrieved on Mar. 15, 2013, 2 pages.

Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.

Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.

Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.

Lee, K. F., "Large-Vocabulary Speaker-Independent Continuous Speech Recognition: The SPHINX System", Partial Fulfillment of the Requirements for the Degree of Doctorof Philosophy, Computer Science Department, Carnegie Mellon University, Apr. 1988, 195 pages.

Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.

Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.

Leong et al., "CASIS: A Context-Aware Speech Interface System", Proceedings of the 10th International Conference on Intelligent User Interfaces, Jan. 2005, pp. 231-238.

Lieberman et al., "Out of Context: Computer Systems that Adapt to, and Learn from, Context", IBM Systems Journal, vol. 39, No. 3 & 4, 2000, pp. 617-632.

Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.

Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.

Linde et al., "An Algorithm for Vector Quantizer Design", IEEE Transactions on Communications, vol. 28, No. 1, Jan. 1980, 12 pages.

Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.

Logan et al., "Mel Frequency Cepstral Co-efficients for Music Modeling", International Symposium on Music Information Retrieval, 2000, 2 pages.

Lowerre, B. T., "The-Harpy Speech Recognition System", Doctoral Dissertation, Department of Computer Science, Carnegie Mellon University, Apr. 1976, 20 pages.

Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.

Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.

Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.

Gruber, Tom, "Collective Knowledge Systems: Where the Social Web Meets the Semantic Web", Web Semantics: Science, Services and Agents on the World Wide Web, 2007, pp. 1-19.

Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.

Gruber, Tom, "Enterprise Collaboration Management with Intraspect", Intraspect Technical White Paper, Jul. 2001, pp. 1-24.

Gruber, Tom, "Every Ontology is a Treaty-A Social Agreement-Among People with Some Common Motive in Sharing", Official Quarterly Bulletin of AIS Special Interest Group on Semantic Web and Information Systems, vol. 1, No. 3, 2004, pp. 1-5.

Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.

Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.

Gruber, Tom, "It Is What It Does: The Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.

(56) References Cited

OTHER PUBLICATIONS

Gruber, Tom, "Ontologies, Web 2.0 and Beyond", Ontology Summit, Available online at <http://tomgruber.org/writing/ontolog-social-web-keynote.htm>, Apr. 2007, 17 pages.
Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant-Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber, Tom, "Where the Social Web Meets the Semantic Web", Presentation at the 5th International Semantic Web Conference, Nov. 2006, 38 pages.
Guida et al., "NLI: A Robust Interface for Natural Language Person-Machine Communication", International Journal of Man-Machine Studies, vol. 17, 1982, 17 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: Tools and Applications, 2007, pp. 191-198.
Guzzoni et al., "Active, A platform for Building Intelligent Software", Computational Intelligence, available at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, Aug. 2007, 6 pages.
Guzzoni, D., "Active: A Unified Platform for Building Intelligent Assistant Applications", Oct. 25, 2007, 262 pages.
Guzzoni et al., "Many Robots Make Short Work", AAAI Robot Contest, SRI International, 1996, 9 pages.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systems(AMCIS), 1998, 4 pages.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hawkins et al., "Hierarchical Temporal Memory: Concepts, Theory and Terminology", Numenta, Inc., Mar. 27, 2007, 20 pages.
He et al., "Personal Security Agent: KQML-Based PKI", The Robotics Institute, Carnegie-Mellon University, Paper, 1997, 14 pages.
Helm et al., "Building Visual Language Parsers", Proceedings of CHI'91, Proceedings of the SIGCHI Conference on Human Factors in Computing Systems, 1991, 8 pages.
Hendrix et al., "Developing a Natural Language Interface to Complex Data", ACM Transactions on Database Systems, vol. 3, No. 2, Jun. 1978, pp. 105-147.
Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Hendrix et al., "Transportable Natural-Language Interfaces to Databases", SRI International, Technical Note 228, Apr. 30, 1981, 18 pages.
Hermansky, H., "Perceptual Linear Predictive (PLP) Analysis of Speech", Journal of the Acoustical Society of America, vol. 87, No. 4, Apr. 1990, 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, J. N., "Speech Synthesis and Recognition-Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech and Signal Processing (ICASSP-91), Apr. 1991, 4 pages.
Horvitz et al., "Handsfree Decision Support: Toward a Non-invasive Human-Computer Interface", Proceedings of the Symposium on Computer Applications in Medical Care, IEEE Computer Society Press, 1995, p. 955.
Horvitz et al., "In Pursuit of Effective Handsfree Decision Support: Coupling Bayesian Inference, Speech Understanding, and User Models", 1995, 8 pages.
Huang et al., "The SPHINX-II Speech Recognition System: An Overview", Computer, Speech and Language, vol. 7, No. 2, 1993, 14 pages.
IBM, "Speech Editor", IBM Technical Disclosure Bulletin, vol. 29, No. 10, Mar. 10, 1987, 3 pages.
Jabra, "Bluetooth Introduction", 2004, 15 pages.
Jabra Corporation, "FreeSpeak: BT200 User Manual", 2002, 42 pages.
Jaybird, "Everything Wrong with AIM: Because We've All Thought About It", available at <http://www.psychonoble.com/archives/articles/82.html>, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 10-21.
Jelinek et al., "Interpolated Estimation of Markov Source Parameters from Sparse Data", In Proceedings of the Workshop on Pattern Recognition in Practice,, May 1980, pp. 381-397.
Johnson, Jeff A., "A Comparison of User Interfaces for Panning on a Touch-Controlled Display", CHI '95 Proceedings, 1995, 8 pages.
Kaeppner et al., "Architecture of HeiPhone: A Testbed for Audio/Video Teleconferencing", IBM European Networking Center, 1993.
Kamba et al., "Using Small Screen Space More Efficiently", CHI '96 Proceedings of the SIGCHI Conference on Human Factors in Computing Systems, Apr. 13-18, 1996, pp. 383-390.

(56) References Cited

OTHER PUBLICATIONS

Kang et al., "Quality Improvement of LPC-Processed Noisy Speech by Using Spectral Subtraction", IEEE Transactions on Acoustics, Speech and Signal Processing, vol. 37, No. 6, Jun. 1989, pp. 939-942.
Keahey et al., "Non-Linear Image Magnification", Apr. 24, 1996, 11 pages.
Keahey et al., "Nonlinear Magnification Fields", Proceedings of the 1997 IEEE Symposium on Information Visualization, 1997, 12 pages.
Keahey et al., "Techniques for Non-Linear Magnification Transformations", IEEE Proceedings of Symposium on Information Visualization, Oct. 1996, pp. 38-45.
Keahey et al., "Viewing Text With Non-Linear Magnification: An Experimental Study", Department of Computer Science, Indiana University, Apr. 24, 1996, pp. 1-9.
Kennedy, P. J., "Digital Data Storage Using Video Disc", IBM Technical Disclosure Bulletin, vol. 24, No. 2, Jul. 1981, p. 1171.
Kerr, "An Incremental String Search in C: This Data Matching Algorithm Narrows the Search Space with each Keystroke", Computer Language, vol. 6, No. 12, Dec. 1989, pp. 35-39.
Abut et al., "Vector Quantization of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.
Kim, E.A. S., "The Structure and Processing of Fundamental Frequency Contours", University of Cambridge, Doctoral Thesis, Apr. 1987, 378 pages.
Kirstein et al., "Piloting of Multimedia Integrated Communications for European Researchers", Proc. INET '93, 1993, pp. 1-12.
Kjelldahl et al., "Multimedia—Principles, Systems, and Applications", Proceedings of the 1991 Eurographics Workshop on Multimedia Systems, Applications, and Interaction, Apr. 1991.
Kline et al., "Improving GUI Accessibility for People with Low Vision", CHI '95 Proceedings of the SIGCHI Conference on Human Factors in Computing Systems, May 7-11, 1995, pp. 114-121.
Kline et al., "UnWindows 1.0: X Windows Tools for Low Vision Users", ACM SIGCAPH Computers and the Physically Handicapped, No. 49, Mar. 1994, pp. 1-5.
Knight et al., "Heuristic Search", Production Systems, Artificial Intelligence, 2nd ed., McGraw-Hill, Inc., 1983-1991.
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.
Kuo et al., "A Radical-Partitioned coded Block Adaptive Neural Network Structure for Large-Volume Chinese Characters Recognition", International Joint Conference on Neural Networks, vol. 3, Jun. 1992, pp. 597-601.
Kuo et al., "A Radical-Partitioned Neural Network System Using a Modified Sigmoid Function and a Weight-Dotted Radical Selector for Large-Volume Chinese Character Recognition VLSI", IEEE Int. Symp. Circuits and Systems, Jun. 1994, pp. 3862-3865.
Kurlander et al., "Comic Chat", [Online], 1996 [Retrieved on: Feb. 4, 2013], SIGGRAPH '96 Proceedings of the 23rd annual conference on Computer graphics and interactive techniques, [Retrieved from: http://delivery.acm.org/10.1145/240000/237260/p225-kurlander.pdf], 1996, pp. 225-236.
Laface et al., "A Fast Segmental Viterbi Algorithm for Large Vocabulary Recognition", International Conference on Acoustics, Speech, and Signal Processing, vol. 1, May 1995, pp. 560-563.
Lafferty et al., "Conditional Random Fields: Probabilistic Models for Segmenting and Labeling Sequence Data", Proceedings of the 18th International Conference on Machine Learning, 2001, 9 pages.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
Lamping et al., "Laying Out and Visualizing Large Trees Using a Hyperbolic Space", Proceedings of the ACM Symposium on User Interface Software and Technology, Nov. 1994, pp. 13-14.
Lamping et al., "Visualizing Large Trees Using the Hyperbolic Browser", Apple Inc., Video Clip, MIT Media Library, on a CD, 1995.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", 1986, pp. 267-275.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Lazzaro, Joseph J., "Adapting Desktop Computers to Meet the Needs of Disabled Workers is Easier Than You Might Think", Computers for the Disabled, BYTE Magazine, Jun. 1993, 4 pages.
Leahy et al., "Effect of Touch Screen Target Location on User Accuracy", Proceedings of the Human Factors Society 34th Annual Meeting, 1990, 5 pages.
Lee, Kai-Fu, "Automatic Speech Recognition", 1989, 14 pages (Table of Contents).
Leung et al., "A Review and Taxonomy of Distortion-Oriented Presentation Techniques", ACM Transactions on Computer-Human Interaction (TOCHI), vol. 1, No. 2, Jun. 1994, pp. 126-160.
Levinson et al., "Speech synthesis in telecommunications", IEEE Communications Magazine, vol. 31, No. 11, Nov. 1993, pp. 46-53.
Lewis, "Speech synthesis in a computer aided learning environment", UK IT, Mar. 19-22, 1990, pp. 294-298.
Lewis, Peter, "Two New Ways to Buy Your Bits", CNN Money, available at <http://money.cnn.com/2003/12/30/commentary/ontechnology/download/>,, Dec. 31, 2003, 4 pages.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.
Lyon, R., "A Computational Model of Binaural Localization and Separation", Proceedings of IEEE International Conference on Acoustics, Speech and Signal Processing, Apr. 1983, pp. 1148-1151.
Ahlberg et al., "The Alphaslider: A Compact and Rapid Selector", CHI '94 Proceedings of the SIGCHI Conference on Human Factors in Computing Systems, Apr. 1994, pp. 365-371.
Lyons, Richard F., "CCD Correlators for Auditory Models", Proceedings of the Twenty-Fifth Asilomar Conference on Signals, Systems and Computers, Nov. 4-6, 1991, pp. 785-789.
Mackenzie et al., "Alphanumeric Entry on Pen-Based Computers", International Journal of Human-Computer Studies, vol. 41, 1994, pp. 775-792.
Mackinlay et al., "The Perspective Wall: Detail and Context Smoothly Integrated", ACM, 1991, pp. 173-179.
Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.
Mactech, "KeyStrokes 3.5 for Mac OS X Boosts Word Prediction", available at <http://www.mactech.com/news/?p=1007129>, retrieved on Jan. 7, 2008, 3 pages.
Mahedero et al., "Natural Language Processing of Lyrics", In Proceedings of the 13th Annual ACM International Conference on Multimedia, ACM, Nov. 6-11, 2005, 4 pages.
Marcus et al., "Building a Large Annotated Corpus of English: The Penn Treebank", Computational Linguistics, vol. 19, No. 2, 1993, pp. 313-330.
Markel et al., "Linear Production of Speech", Reviews, 1976, pp. xii, 288.
Masui, Toshiyuki, "POBox: An Efficient Text Input Method for Handheld and Ubiquitous Computers", Proceedings of the 1st International Symposium on Handheld and Ubiquitous Computing, 1999, 12 pages.

(56) References Cited

OTHER PUBLICATIONS

Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, 1-125-1-128.
Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.
Mellinger, David K., "Feature-Map Methods for Extracting Sound Frequency Modulation", IEEE Computer Society Press, 1991, pp. 795-799.
Menico, Costas, "Faster String Searches", Dr. Dobb's Journal, vol. 14, No. 7, Jul. 1989, pp. 74-77.
Menta, Richard, "1200 Song MP3 Portable is a Milestone Player", available at <http://www.mp3newswire.net/stories/personaljuke.html>, Jan. 11, 2000, 4 pages.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Miastkowski, Stan, "paperWorks Makes Paper Intelligent", Byte Magazine, Jun. 1992.
Microsoft, "Turn on and Use Magnifier", available at <http://www.microsoft.com/windowsxp/using/accessibility/magnifierturnon.mspx>, retrieved on Jun. 6, 2009.
Microsoft Corporation, Microsoft Office Word 2003 (SP2), Microsoft Corporation, SP3 as of 2005, pp. MSWord 2003 Figures 1-5, 1983-2003.
Microsoft Corporation, "Microsoft MS-DOS Operating System User's Guide", Microsoft Corporation, 1982, pp. 4-1 to 4-16, 5-1 to 5-19.
Microsoft Press, "Microsoft Windows User's Guide for the Windows Graphical Environment", version 3.0, 1985-1990, pp. 33-41 & 70-74.
Microsoft Windows XP, "Magnifier Utility", Oct. 25, 2001, 2 pages.
Microsoft Word 2000 Microsoft Corporation, pp. MSWord Figures 1-5, 1999.
Microsoft/Ford, "Basic Sync Commands", www.SyncMyRide.com, Sep. 14, 2007, 1 page.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
Miniman, Jared, "Applian Software's Replay Radio and Player v1.02", pocketnow.com—Review, available at <http://www.pocketnow.com/reviews/replay/replay.htm>, Jul. 31, 2001, 16 pages.
Moberg et al., "Cross-Lingual Phoneme Mapping for Multilingual Synthesis Systems", Proceedings of the 8th International Conference on Spoken Language Processing, Jeju Island, Korea, Interspeech 2004, Oct. 4-8, 2004, 4 pages.
Moberg, M., "Contributions to Multilingual Low-Footprint TTS System for Hand-Held Devices", Doctoral Thesis, Tampere University of Technology, Aug. 17, 2007, 82 pages.
Mobile Tech News, "T9 Text Input Software Updated", available at <http://www.mobiletechnews.com/info/2004/11/23/122155.html>, Nov. 23, 2004, 4 pages.
Mok et al., "Media Searching on Mobile Devices", IEEE EIT 2007 Proceedings, 2007, pp. 126-129.
Morland, D. V., "Human Factors Guidelines for Terminal Interface Design", Communications ofthe ACM vol. 26, No. 7, Jul. 1983, pp. 484-494.
Morris et al., "Andrew: A Distributed Personal Computing Environment", Communications of the ACM, (Mar. 1986); vol. 29 No. 3,, Mar. 1986, pp. 184-201.
Muller et al., "CSCW'92 Demonstrations", 1992, pp. 11-14.
Musicmatch, "Musicmatch and Xing Technology Introduce Musicmatch Jukebox", Press Releases, available at <http://www.musicmatch.com/info/company/press/releases/?year=1998&release=2>, May 18, 1998, 2 pages.
Muthesamy et al., "Speaker-Independent Vowel Recognition: Spectograms versus Cochleagrams", IEEE, Apr. 1990.
My Cool Aids, "What's New", available at <http://www.mycoolaids.com/>, 2012, 1 page.
Myers, Brad A., "Shortcutter for Palm", available at <http://www.cs.cmu.edu/-pebbles/v5/shortcutter/palm/index.html>, retrieved on Jun. 18, 2014, 10 pages.
Nadoli et al., "Intelligent Agents in the Simulation of Manufacturing Systems", Proceedings of the SCS Multiconference on AL and Simulation, 1989, 1 page.
Nakagawa et al., "Unknown Word Guessing and Part-of-Speech Tagging Using Support Vector Machines", Proceedings of the 6th NLPRS, 2001, pp. 325-331.
Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998, 2 pages.
NCIP Staff, "Magnification Technology", available at <http://www2.edc.org/ncip/library/vi/magnifi.htm>, 1994, 6 pages.
Newton, Harry, "Newton's Telecom Dictionary", Mar. 1998, pp. 62, 155, 610-611, 771.
Nguyen et al., "Generic Manager for Spoken Dialogue Systems", In DiaBruck: 7th Workshop on the Semantics and Pragmatics of Dialogue, Proceedings, 2003, 2 pages.
Nilsson, B. A., "Microsoft Publisher is an Honorable Start for DTP Beginners", Computer Shopper, Feb. 1, 1992, 2 pages.
Noik, Emanuel G., "Layout-Independent Fisheye Views of Nested Graphs", IEEE Proceedings of Symposium on Visual Languages, 1993, 6 pages.
Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.
Northern Telecom, "Meridian Mail PC User Guide", 1988, 17 Pages.
Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.
O'Connor, Rory J., "Apple Banking on Newton's Brain", San Jose Mercury News, Apr. 22, 1991.
Ohsawa et al., "A computational Model of an Intelligent Agent Who Talks with a Person", Research Reports on Information Sciences, Series C, No. 92, Apr. 1989, pp. 1-18.
Ohtomo et al., "Two-Stage Recognition Method of Hand-Written Chinese Characters Using an Integrated Neural Network Model", Denshi Joohoo Tsuushin Gakkai Ronbunshi, D-II, vol. J74, Feb. 1991, pp. 158-165.
Okazaki et al., "Multi-Fisheye Transformation Method for Large-Scale Network Maps", IEEE Japan, vol. 44, No. 6, 1995, pp. 495-500.
Pearl, Amy, "System Support for Integrated Desktop Video Conferencing", Sunmicrosystems Laboratories, Dec. 1992, pp. 1-15.
Penn et al., "Ale for Speech: A Translation Prototype", Bell Laboratories, 1999, 4 pages.
Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.
Phillips, Dick, "The Multi-Media Workstation", SIGGRAPH '89 Panel Proceedings, 1989, pp. 93-109.
Pickering, J. A., "Touch-Sensitive Screens: The Technologies and Their Application", International Journal of Man-Machine Studies, vol. 25, No. 3, Sep. 1986, pp. 249-269.
Pingali et al., "Audio-Visual Tracking for Natural Interactivity", ACM Multimedia, Oct. 1999, pp. 373-382.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.

(56) References Cited

OTHER PUBLICATIONS

Poly-Optical Products, Inc., "Poly-Optical Fiber Optic Membrane Switch Backlighting", available at <http://www.poly-optical.com/membrane_switches.html>, retrieved on Dec. 19, 2002, 3 pages.
Poor, Alfred, "Microsoft Publisher", PC Magazine, vol. 10, No. 20, Nov. 26, 1991, 1 page.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
Public Safety Technologies, "Tracer 2000 Computer", available at <http://www.pst911.com/tracer.html>, retrieved on Dec. 19, 2002, 3 pages.
Apple Computer, Inc., "Apple Announces iTunes 2", Press Release, Oct. 23, 2001, 2 pages.
Rabiner et al., "Digital Processing of Speech Signals", Prentice Hall, 1978, pp. 274-277.
Rampe et al., "SmartForm Designer and SmartForm Assistant", News release, Claris Corp., Jan. 9, 1989, 1 page.
Rao et al., "Exploring Large Tables with the Table Lens", Apple Inc., Video Clip, Xerox Corp., on a CD, 1994.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raper, Larry K. ,"The C-MU PC Server Project", (CMU-ITC-86-051), Dec. 1986, pp. 1-30.
Ratcliffe et al., "Intelligent Agents Take U.S. Bows", MacWeek, vol. 6, No. 9, Mar. 2, 1992, 1 page.
Reddy, D. R., "Speech Recognition by Machine: A Review", Proceedings of the IEEE, Apr. 1976, pp. 501-531.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al., "The Best among Six Strategies for Selecting a Minute Target and the Determination of the Minute Maximum Size of the Targets on a Pen-Based Computer", Human-Computer Interaction INTERACT, 1997, pp. 85-92.
Apple Computer, Inc., "Apple Introduces iTunes—World's Best and Easiest to Use Jukebox Software", Macworld Expo, Jan. 9, 2001, 2 pages.
Riecken, R D., "Adaptive Direct Manipulation", IEEE Xplore, 1991, pp. 1115-1120.
Rioport, "Rio 500: Getting Started Guide", available at <http://ec1.images-amazon.com/media/i3d/01/A/man-migrate/MANUAL000023453.pdf>, 1999, 2 pages.
Robbin et al., "MP3 Player and Encoder for Macintosh!", SoundJam MP Plus, Version 2.0, 2000, 76 pages.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Root, Robert, "Design of a Multi-Media Vehicle for Social Browsing", Bell Communications Research, 1988, pp. 25-38.

Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.
Rosenberg et al., "An Overview of the Andrew Message System", Information Technology Center Carnegie-Mellon University, Jul. 1987, pp. 99-108.
Rosner et al., "In Touch: A Graphical User Interface Development Tool", IEEE Colloquium on Software Tools for Interface Design, Nov. 8, 1990, pp. 12/1-12/7.
Rossfrank, "Konstenlose Sprachmitteilungins Festnetz", XP002234425, Dec. 10, 2000, pp. 1-4.
Roucos et al., "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.
Roucos et al., "High Quality Time-Scale Modification for Speech", Proceedings of the 1985 IEEE Conference on Acoustics, Speech and Signal Processing, 1985, pp. 493-496.
Sabin et al., "Product Code Vector Quantizers for Waveform and Voice Coding", (IEEE Transactions on Acoustics, Speech and Signal Processing, Jun. 1984), as reprinted in Vector Quantization (IEEE Press, 1990), 1990, pp. 274-288.
Apple Computer, Inc., "Apple's iPod Available in Stores Tomorrow", Press Release, Nov. 9, 2001, 1 page.
Santen, Jan P., "Assignment of Segmental Duration in Text-to-Speech Synthesis", Computer Speech and Language, vol. 8, No. 2, Apr. 1994, pp. 95-128.
Sarawagi, Sunita, "CRF Package Page", available at <http://crf.sourceforge.net/>, retrieved on Apr. 6, 2011, 2 pages.
Sarkar et al., "Graphical Fisheye Views", Communications of the ACM, vol. 37, No. 12, Dec. 1994, pp. 73-83.
Sarkar et al., "Graphical Fisheye Views of Graphs", Systems Research Center, Digital Equipment Corporation,, Mar. 17, 1992, 31 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Stretching the Rubber Sheet: A Metaphor for Viewing Large Layouts on Small Screens", UIST'93, ACM, Nov. 3-5, 1993, pp. 81-91.
Sastry, Ravindra W., "A Need for Speed: A New Speedometer for Runners", submitted to the Department of Electrical Engineering and Computer Science at the Massachusetts Institute of Technology, 1999, pp. 1-42.
Schafer et al., "Digital Representations of Speech Signals", Proceedings of the IEEE, vol. 63, No. 4, Apr. 1975, pp. 662-677.
Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Decker et al., "Designing Behaviors for Information Agents", The Robotics Institute, Carnegie-Mellon University, Paper, Jul. 1996, 15 pages.
Decker et al., "Matchmaking and Brokering", The Robotics Institute, Carnegie-Mellon University, Paper, May 1996, 19 pages.
Deerwester et al., "Indexing by Latent Semantic Analysis", Journal of the American Society for Information Science, vol. 41, No. 6, Sep. 1990, 19 pages.
Deller, Jr. et al., "Discrete-Time Processing of Speech Signals", Prentice Hall, ISBN: 0-02-328301-7, 1987, 14 pages.
Digital Equipment Corporation, "Open VMS Software Overview", Software Manual, Dec. 1995, 159 pages.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Donovan, R. E., "A New Distance Measure for Costing Spectral Discontinuities in Concatenative Speech Synthesisers", available at <http://citeseerx.ist.osu.edu/viewdoc/summarv?doi=1 0.1.1.21.6398>, 2001, 4 pages.
Dowding et al., "Gemini: A Natural Language System for Spoken-Language Understanding", Proceedings of the Thirty-First Annual Meeting of the Association for Computational Linguistics, 1993, 8 pages.

(56) References Cited

OTHER PUBLICATIONS

Dowding et al., "Interleaving Syntax and Semantics in an Efficient Bottom-Up Parser", Proceedings of the 32nd Annual Meeting of the Association for Computational Linguistics, 1994, 7 pages.
Elio et al., "On Abstract Task Models and Conversation Policies", Proc. Workshop on Specifying and Implementing Conversation Policies, Autonomous Agents'99 Conference, 1999, pp. 1-10.
Epstein et al., "Natural Language Access to a Melanoma Data Base", SRI International, Sep. 1978, 7 pages.
Ericsson et al., "Software Illustrating a Unified Approach to Multimodality and Multilinguality in the In-Home Domain", Talk and Look: Tools for Ambient Linguistic Knowledge, Dec. 2006, 127 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Feigenbaum et al., "Computer-Assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-Based Knowledge Representation and its Natural Deduction System", SRI International, Jul. 1977, 43 pages.
Frisse, M. E., "Searching for Information in a Hypertext Medical Handbook", Communications of the ACM, vol. 31, No. 7, Jul. 1988, 8 pages.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gautier et al., "Generating Explanations of Device Behavior Using Compositional Modeling and Causal Ordering", CiteSeerx, 1993, pp. 89-97.
Gervasio et al., "Active Preference Learning for Personalized Calendar Scheduling Assistance", CiteSeerx, Proceedings of IUI'05, Jan. 2005, pp. 90-97.
Glass, Alyssa, "Explaining Preference Learning", CiteSeerx, 2006, pp. 1-5.
Glass et al., "Multilingual Language Generation Across Multiple Domains", International Conference on Spoken Language Processing, Japan, Sep. 1994, 5 pages.
Glass et al., "Multilingual Spoken-Language Understanding in the Mit Voyager System", Available online at <http://groups.csail.mit.edu/sls/publications/1995/speechcomm95-voyager.pdf>, Aug. 1995, 29 pages.
Goddeau et al., "A Form-Based Dialogue Manager for Spoken Language Applications", Available online at <http://phasedance.com/pdflicslp96.pdf>, Oct. 1996, 4 pages.
Goddeau et al., "Galaxy: A Human-Language Interface to On-Line Travel Information", International Conference on Spoken Language Processing, Yokohama, 1994, pp. 707-710.
Goldberg et al., "Using Collaborative Filtering to Weave an Information Tapestry", Communications of the ACM, vol. 35, No. 12, Dec. 1992, 10 pages.
Gong et al., "Guidelines for Handheld Mobile Device Interface Design", Proceedings of DSI 2004 Annual Meeting, 2004, pp. 3751-3756.
Gorin et al., "On Adaptive Acquisition of Language", International Conference on Acoustics, Speech and Signal Processing (ICASSP'90), vol. 1, Apr. 1990, 5 pages.
Gotoh et al., "Document Space Models Using Latent Semantic Analysis", In Proceedings of Eurospeech, 1997, 4 pages.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Gregg et al., "DSS Access on the WWW: An Intelligent Agent Prototype", Proceedings of the Americas Conference on Information Systems, Association for Information Systems, 1998, 3 pages.
Grishman et al., "Computational Linguistics: An Introduction", Cambridge University Press, 1986, 172 pages.
Grosz et al., "Dialogic: A Core Natural-Language Processing System", SRI International, Nov. 1982, 17 pages.
Grosz et al., "Research on Natural-Language Processing at SRI", SRI International, Nov. 1981, 21 pages.
Grosz, B., "Team: A Transportable Natural-Language Interface System", Proceedings of the First Conference on Applied Natural Language Processing, 1983, 7 pages.
Grosz et al., "TEAM: An Experiment in the Design of Transportable Natural-Language Interfaces", Artificial Intelligence, vol. 32, 1987, 71 pages.
Gruber, Tom, "(Avoiding) the Travesty of the Commons", Presentation at NPUC, New Paradigms for User Computing, IBM Almaden Research Center, Jul. 24, 2006, 52 pages.
Gruber, Thomas R., "A Translation Approach to Portable Ontology Specifications", Knowledge Systems Laboratory, Technical Report KSL 92-71, Sep. 1992, Revised Apr. 1993, pp. 1-27.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber, Thomas R., "Automated Knowledge Acquisition for Strategic Knowledge", Machine Learning, vol. 4, 1989, pp. 293-336.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber et al., "Machine-Generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 1992, pp. 1-19.
Gruber, Thomas R., "Toward Principles for the Design of Ontologies used for Knowledge Sharing?", International Journal of Human-Computer Studies, vol. 43, No. 5-6, Nov. 1995, pp. 907-928.
Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schluter et al., "Using Phase Spectrum Information for Improved Speech Recognition Performance", IEEE International Conference on Acoustics, Speech, and Signal Processing, 2001, pp. 133-136.
Schmandt et al., "A Conversational Telephone Messaging System", IEEE Transactions on Consumer Electronics, vol. CE-30, Aug. 1984, pp. xxi-xxiv.
Schmandt et al., "Phone Slave: A Graphical Telecommunications Interface", Society for Information Display, International Symposium Digest of Technical Papers, Jun. 1984, 4 pages.
Schmandt et al., "Phone Slave: A Graphical Telecommunications Interface", Proceedings of the SID, vol. 26, No. 1, 1985, pp. 79-82.
Schmid, H., "Part-of-speech tagging with neural networks", COLING '94 Proceedings of the 15th conference on Computational linguistics—vol. 1, 1994, pp. 172-176.

(56) References Cited

OTHER PUBLICATIONS

Schooler et al., "A Packet-switched Multimedia Conferencing System", by Eve Schooler, et al; ACM SIGOIS Bulletin, vol. I, No. 1, Jan. 1989, pp. 12-22.

Schooler et al., "An Architecture for Multimedia Connection Management", Proceedings IEEE 4th Comsoc International Workshop on Multimedia Communications, Apr. 1992, pp. 271-274.

Schooler et al., "Multimedia Conferencing: Has it Come of Age?", Proceedings 24th Hawaii International Conference on System Sciences, vol. 3, Jan. 1991, pp. 707-716.

Schooler et al., "The Connection Control Protocol: Architecture Overview", USC/Information Sciences Institute, Jan. 28, 1992, pp. 1-6.

Schooler, Eve, "A Distributed Architecture for Multimedia Conference Control", ISI Research Report, Nov. 1991, pp. 1-18.

Schooler, Eve M., "Case Study: Multimedia Conference Control in a Packet-Switched Teleconferencing System", Journal of Internetworking: Research and Experience, vol. 4, No. 2, Jun. 1993, pp. 99-120.

Schooler, Eve M., "The Impact of Scaling on a Multimedia Connection Architecture", Multimedia Systems, vol. 1, No. 1, 1993, pp. 2-9.

Schütze, H., "Distributional part-of-speech tagging", EACL '95 Proceedings of the seventh conference on European chapter of the Association for Computational Linguistics, 1995, pp. 141-148.

Schütze, Hinrich, "Part-of-speech induction from scratch", ACL '93 Proceedings of the 31st annual meeting on Association for Computational Linguistics, 1993, pp. 251-258.

Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.

Schwartz et al., "Improved Hidden Markov Modeling of Phonemes for Continuous Speech Recognition", IEEE International Conference on Acoustics, Speech, and Signal Processing, vol. 9, 1984, pp. 21-24.

Schwartz et al., "The N-Best Algorithm: An Efficient and Exact Procedure for Finding the N Most Likely Sentence Hypotheses", IEEE, 1990, pp. 81-84.

Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.

Seagrave, Jim, "A Faster Way to Search Text", EXE, vol. 5, No. 3, Aug. 1990, pp. 50-52.

Sears et al., "High Precision Touchscreens: Design Strategies and Comparisons with a Mouse", International Journal of Man-Machine Studies, vol. 34, No. 4, Apr. 1991, pp. 593-613.

Sears et al., "Investigating Touchscreen Typing: The Effect of Keyboard Size on Typing Speed", Behavior & Information Technology, vol. 12, No. 1, 1993, pp. 17-22.

Sears et al., "Touchscreen Keyboards", Apple Inc., Video Clip, Human-Computer Interaction Laboratory, on a CD, Apr. 1991.

Seide et al., "Improving Speech Understanding by Incorporating Database Constraints and Dialogue History", Proceedings of Fourth International Conference on Philadelphia,, 1996, pp. 1017-1020.

Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.

Shneiderman, Ben, "Designing the User Interface: Strategies for Effective Human-Computer Interaction", Second Edition, 1992, 599 pages.

Shneiderman, Ben, "Designing the User Interface: Strategies for Effective Human-Computer Interaction", Third Edition, 1998, 669 pages.

Shneiderman, Ben, "Direct Manipulation for Comprehensible, Predictable and Controllable User Interfaces", Proceedings of the 2nd International Conference on Intelligent User Interfaces, 1997, pp. 33-39.

Shneiderman, Ben, "Sparks of Innovation in Human-Computer Interaction", 1993, (Table of Contents, Title Page, Ch. 4, Ch. 6 and List of References).

Shneiderman, Ben, "The Eyes Have It: A Task by Data Type Taxonomy for Information Visualizations", IEEE Proceedings of Symposium on Visual Languages, 1996, pp. 336-343.

Shneiderman, Ben, "Touch Screens Now Offer Compelling Uses", IEEE Software, Mar. 1991, pp. 93-94.

Shoham et al., "Efficient Bit and Allocation for an Arbitrary Set of Quantizers", (IEEE Transactions on Acoustics, Speech, and Signal Processing, Sep. 1988) as reprinted in Vector Quantization (IEEE Press, 1990), 1990, pp. 289-296.

Simkovitz, Daniel, "LP-DOS Magnifies the PC Screen", IEEE, 1992, pp. 203-204.

Singh et al., "Automatic Generation of Phone Sets and Lexical Transcriptions", Acoustics, Speech and Signal Processing (ICASSP'00), 2000, 1 page.

Sinitsyn, Alexander, "A Synchronization Framework for Personal Mobile Servers", Proceedings of the Second IEEE Annual Conference on Pervasive Computing and Communications Workshops, Piscataway, 2004, pp. 1, 3 and 5.

Slaney et al., "On the Importance of Time—A Temporal Representation of Sound", Visual Representation of Speech Signals, 1993, pp. 95-116.

Smeaton, Alan F., "Natural Language Processing and Information Retrieval", Information Processing and Management, vol. 26, No. 1, 1990, pp. 19-20.

Smith et al., "Guidelines for Designing User Interface Software", User Lab, Inc., Aug. 1986, pp. 1-384.

Smith et al., "Relating Distortion to Performance in Distortion Oriented Displays", Proceedings of Sixth Australian Conference on Computer-Human Interaction, Nov. 1996, pp. 6-11.

Sony Eiicsson Corporate, "Sony Ericsson to introduce Auto pairing. TM. to Improve Bluetooth.TM. Connectivity Between Headsets and Phones", Press Release, available at <http://www.sonyericsson.com/spg.jsp?cc=global&lc=en&ver=4001&template=pc3_1_1&z . . . >, Sep. 28, 2005, 2 pages.

Soong et al., "A High Quality Subband Speech Coder with Backward Adaptive Predictor and Optimal Time-Frequency Bit Assignment", (Proceedings of the IEEE International Acoustics, Speech, and Signal Processing Conference, Apr. 1986), as reprinted in Vector Quantization (IEEE Press, 1990), 1990, pp. 316-319.

Spiller, Karen, "Low-Decibel Earbuds Keep Noise at a Reasonable Level", available at <http://www.nashuatelegraph.com/apps/pbcs.dll/article?Date=20060813&Cate . . . >, Aug. 13, 2006, 3 pages.

Apple Computer, Inc., "Inside Macintosh", vol. VI, 1985.

Srinivas et al., "Monet: A Multi-Media System for Conferencing and Application Sharing in Distributed Systems", CERC Technical Report Series Research Note, Feb. 1992.

Stealth Computer Corporation, "Peripherals for Industrial Keyboards & Pointing Devices", available at <http://www.stealthcomputer.com/peripherals_oeem.htm>, retrieved on Dec. 19, 2002, 6 pages.

Steinberg, Gene, "Sonicblue Rio Car (10 GB, Reviewed: 6 GB)", available at <http://electronics.cnet.com/electronics/0-6342420-1304-4098389.html>, Dec. 12, 2000, 2 pages.

Stent et al., "Geo-Centric Language Models for Local Business Voice Search", AT&T Labs—Research, 2009, pp. 389-396.

Stone et al., "The Movable Filter as a User Interface Tool", CHI '94 Human Factors in Computing Systems, 1994, pp. 306-312.

Su et al., "A Review of ZoomText Xtra Screen Magnification Program for Windows 95", Journal of Visual Impairment & Blindness, Feb. 1998, pp. 116-119.

Su, Joseph C., "A Review of Telesensory's Vista PCI Screen Magnification System", Journal of Visual Impairment & Blindness, Oct. 1998, pp. 705, 707-710.

Sullivan, Danny, "How Google Instant's Autocomplete Suggestions Work", available at <http://searchengineland.com/how-google-instant-autocomplete-suggestions-work-62592>, Apr. 6, 2011, 12 pages.

Summerfield et al., "ASIC Implementation of the Lyon Cochlea Model", Proceedings of the 1992 International Conference on Acoustics, Speech and Signal Processing, IEEE, vol. V, 1992, pp. 673-676.

(56) References Cited

OTHER PUBLICATIONS

T3 Magazine, "Creative MuVo TX 256MB", available at <http://www.t3.co.uk/reviews/entertainment/mp3_player/creative_muvo_tx_256mb>, Aug. 17, 2004, 1 page.
TAOS, "TAOS, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Apple Computer, Inc., "iTunes 2, Playlist Related Help Screens", iTunes v2.0, 2000-2001, 8 pages.
Tello, Ernest R., "Natural-Language Systems", Mastering AI Tools and Techniques, Howard W. Sams & Company, 1988.
TG3 Electronics, Inc., "BL82 Series Backlit Keyboards", available at <http://www.tg3electronics.com/products/backlit/backlit.htm>, retrieved on Dec. 19, 2002, 2 pages.
The HP 150, "Hardware: Compact, Powerful, and Innovative", vol. 8, No. 10, Oct. 1983, pp. 36-50.
Tidwell, Jenifer, "Animated Transition", Designing Interfaces, Patterns for effective Interaction Design, Nov. 2005, First Edition, 4 pages.
Touch, Joseph, "Zoned Analog Personal Teleconferencing", USC / Information Sciences Institute, 1993, pp. 1-19.
Toutanova et al., "Feature-Rich Part-of-Speech Tagging with a Cyclic Dependency Network", Computer Science Dept., Stanford University, Stanford CA 94305-9040, 2003, 8 pages.
Trigg et al., "Hypertext Habitats: Experiences of Writers in NoteCards", Hypertext '87 Papers; Intelligent Systems Laboratory, Xerox Palo Alto Research Center, 1987, pp. 89-108.
Trowbridge, David, "Using Andrew for Development of Educational Applications", Center for Design of Educational Computing, Carnegie-Mellon University (CMU-ITC-85-065), Jun. 2, 1985, pp. 1-6.
Tsao et al., "Matrix Quantizer Design for LPC Speech Using the Generalized Lloyd Algorithm", (IEEE Transactions on Acoustics, Speech and Signal Processing, Jun. 1985), as reprinted in Vector Quantization (IEEE Press, 1990), 1990, pp. 237-245.
Turletti, Thierry, "The INRIA Videoconferencing System (IVS)", Oct. 1994, pp. 1-7.
Uslan et al., "A Review of Henter-Joyce's MAGic for Windows NT", Journal of Visual Impairment and Blindness, Dec. 1999, pp. 666-668.
Uslan et al., "A Review of Supernova Screen Magnification Program for Windows", Journal of Visual Impairment & Blindness, Feb. 1999, pp. 108-110.
Uslan et al., "A Review of Two Screen Magnification Programs for Windows 95: Magnum 95 and LP-Windows", Journal of Visual Impairment & Blindness, Sep.-Oct. 1997, pp. 9-13.
Veiga, Alex, "AT&T Wireless Launching Music Service", available at <http://bizyahoo.com/ap/041005/at_t_mobile_music_5.html?printer=1>, Oct. 5, 2004, 2 pages.
Vogel et al., "Shift: A Technique for Operating Pen-Based Interfaces Using Touch", CHI '07 Proceedings, Mobile Interaction Techniques I, Apr. 28-May 3, 2007, pp. 657-666.
W3C Working Draft, "Speech Synthesis Markup Language Specification for the Speech Interface Framework", available at <http://www.w3org./TR/speech-synthesis>, retrieved on Dec. 14, 2000, 42 pages.
Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.
Walker et al., "The Locus Distributed Operating System 1", University of California Los Angeles, 1983, pp. 49-70.
Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.
Wang et al., "Tone Recognition of Continuous Mandarin Speech Based on Hidden Markov Model", International Journal of Pattern Recognition and Artificial Intelligence, vol. 8, 1994, pp. 233-245.
Ware et al., "The DragMag Image Magnifier", CHI '95 Mosaic of Creativity, May 7-11, 1995, pp. 407-408.
Ware et al., "The DragMag Image Magnifier Prototype I", Apple Inc., Video Clip, Marlon, on a CD, Applicant is not Certain about the Date for the Video Clip., 1995.
Watabe et al., "Distributed Multiparty Desktop Conferencing System: MERMAID", CSCW 90 Proceedings, Oct. 1990, pp. 27-38.
White, George M., "Speech Recognition, Neural Nets, and Brains", Jan. 1992, pp. 1-48.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Speech Recognition", available at <http://en.wikipedia.org/wiki/Speech_recognition>, retrieved on Sep. 14, 2011, 10 pages.
Wilensky et al., "Talking to UNIX in English: An Overview of UC", Communications of the ACM, vol. 27, No. 6, Jun. 1984, pp. 574-593.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.
Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.
Wu et al., "Automatic Generation of Synthesis Units and Prosodic Information for Chinese Concatenative Synthesis", Speech Communication, vol. 35, No. 3-4, Oct. 2001, pp. 219-237.
Yang et al., "Auditory Representations of Acoustic Signals", IEEE Transactions of Information Theory, vol. 38, No. 2, Mar. 1992, pp. 824-839.
Yang et al., "Hidden Markov Model for Mandarin Lexical Tone Recognition", IEEE Transactions on Acoustics, Speech and Signal Processing, vol. 36, No. 7, Jul. 1988, pp. 988-992.
Yiourgalis et al., "Text-to-Speech system for Greek", ICASSP 91, vol. 1, May 14-17, 1991., pp. 525-528.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zelig, "A Review of the Palm Treo 750v", available at <http://www.mtekk.com.au/Articles/tabid/54/articleType/ArticleView/articleId/769/A-Review-of-the-Palm-Treo-750v.aspx>, Feb. 5, 2007, 3 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Ziegler, K, "A Distributed Information System Study", IBM Systems Journal, vol. 18, No. 3, 1979, pp. 374-401.
Zipnick et al., "U.S. Appl. No. 10/859,661, filed Jun. 2, 2004".
"2004 Chrysler Pacifica: U-Connect Hands-Free Communication System", The Best and Brightest of 2004, Brief Article, Automotive Industries, Sep. 2003, 1 page.
"2007 Lexus GS 450h 4dr Sedan (3.5L 6cyl Gas/Electric Hybrid CVT)", available at <http://review.cnet.com/4505-10865_16-31833144.html>, retrieved on Aug. 3, 2006, 10 pages.
"All Music Website", available at <http://www.allmusic.com/>, retrieved on Mar. 19, 2007, 2 pages.
"BluePhoneElite: About", available at <http://www.reelintelligence.com/BluePhoneElite>, retrieved on Sep. 25, 2006, 2 pages.
"Top 10 Best Practices for Voice User Interface Design" available at <http://www.developer.com/voice/article.php/1567051/Top-10-Best-Practices-for-Voice-UserInterface-Design.htm>, Nov. 1, 2002, 4 pages.

(56) References Cited

OTHER PUBLICATIONS

Combined Search Report and Examination Report under Sections 17 and 18(3) received for GB Patent Application No. 1009318.5, dated Oct. 8, 2010, 5 pages.
Combined Search Report and Examination Report under Sections 17 and 18(3) received for GB Patent Application No. 1217449.6, dated Jan. 17, 2013, 6 pages.
Aikawa et al., "Speech Recognition Using Time-Warping Neural Networks", Proceedings of the 1991, IEEE Workshop on Neural Networks for Signal Processing, 1991, 10 pages.
Bellegarda et al., "Performance of the IBM Large Vocabulary Continuous Speech Recognition System on the ARPA Wall Street Journal Task", Signal Processing VII: Theories and Applications, European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Belvin et al., "Development of the HRL Route Navigation Dialogue System", Proceedings of the First International Conference on Human Language Technology Research, Paper, 2001, 5 pages.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Task Management under Change and Uncertainty Constraint Solving Experience with the CALO Project", Proceedings of CP'05 Workshop on Constraint Solving under Change, 2005, 5 pages.
Black et al., "Automatically Clustering Similar Units for Unit Selection in Speech Synthesis", Proceedings of Eurospeech, vol. 2, 1997, 4 pages.
Blair et al., "An Evaluation of Retrieval Effectiveness for a Full-Text Document-Retrieval System", Communications of the ACM, vol. 28, No. 3, Mar. 1985, 11 pages.
Bobrow et al., "Knowledge Representation for Syntactic/Semantic Processing", From: AAA-80 Proceedings, Copyright 1980, AAAI, 1980, 8 pages.
Bouchou et al., "Using Transducers in Natural Language Database Query", Proceedings of 4th International Conference on Applications of Natural Language to Information Systems, Austria, Jun. 1999, 17 pages.
Bratt et al., "The SRI Telephone-Based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Bulyko et al., "Error-Correction Detection and Response Generation in a Spoken Dialogue System", Speech Communication, vol. 45, 2005, pp. 271-288.
Bulyko et al., "Joint Prosody Prediction and Unit Selection for Concatenative Speech Synthesis", Electrical Engineering Department, University of Washington, Seattle, 2001, 4 pages.
Burke et al., "Question Answering from Frequently Asked Question Files", AI Magazine, vol. 18, No. 2, 1997, 10 pages.
Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.
Bussey, et al., "Service Architecture, Prototype Description and Network Implications of a Personalized Information Grazing Service", INFOCOM'90, Ninth Annual Joint Conference of the IEEE Computer and Communication Societies, Available online at <http://slrohall.com/oublications/>, Jun. 1990, 8 pages.
Bussler et al., "Web Service Execution Environment (WSMX)", retrieved from Internet on Sep. 17, 2012, available at <http://www.w3.org/Submission/WSMX>, Jun. 3, 2005, 29 pages.
Butcher, Mike, "EVI Arrives in Town to go Toe-to-Toe with Siri", TechCrunch, Jan. 23, 2012, 2 pages.
Buzo et al., "Speech Coding Based Upon Vector Quantization", IEEE Transactions on Acoustics, Speech and Signal Processing, vol. Assp-28, No. 5, Oct. 1980, 13 pages.
Caminero-Gil et al., "Data-Driven Discourse Modeling for Semantic Interpretation", Proceedings of the IEEE International Conference on Acoustics, Speech and Signal Processing, May 1996, 6 pages.
Car Working Group, "Hands-Free Profile 1.5 HFP1.5_SPEC", Bluetooth Doc, available at <www.bluetooth.org>, Nov. 25, 2005, 93 pages.
Carter, D., "Lexical Acquisition in the Core Language Engine", Proceedings of the Fourth Conference of the European Chapter of the Association for Computational Linguistics, 1989, 8 pages.
Carter et al., "The Speech-Language Interface in the Spoken Language Translator", SRI International, Nov. 23, 1994, 9 pages.
Cawley, Gavin C. "The Application of Neural Networks to Phonetic Modelling", PhD. Thesis, University of Essex, Mar. 1996, 13 pages.
Chai et al., "Comparative Evaluation of a Natural Language Dialog Based System and a Menu Driven System for Information Access: A Case Study", Proceedings of the International Conference on Multimedia Information Retrieval (RIAO), Paris, Apr. 2000, 11 pages.
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages.
Chen, Yi, "Multimedia Siri Finds and Plays Whatever You Ask for", PSFK Report, Feb. 9, 2012, 9 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Cheyer et al., "Multimodal Maps: An Agent-Based Approach", International Conference on Co-operative Multimodal Communication, 1995, 15 pages.
Cheyer et al., "Spoken Language and Multimodal Applications for Electronic Realties", Virtual Reality, vol. 3, 1999, pp. 1-15.
Cheyer et al., "The Open Agent Architecture", Autonomous Agents and Multi-Agent Systems, vol. 4, Mar. 1, 2001, 6 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Codd, E. F., "Databases: Improving Usability and Responsiveness—How About Recently", Copyright 1978, Academic Press, Inc., 1978, 28 pages.
Cohen et al., "An Open Agent Architecture", available at <http://citeseerx.ist.psu.edu/viewdoc/summary?doi=10.1.1.30.480>, 1994, 8 pages.
Cohen et al., "Voice User Interface Design,", Excerpts from Chapter 1 and Chapter 10, 2004, 36 pages.
Coles et al., "Chemistry Question-Answering", SRI International, Jun. 1969, 15 pages.
Coles et al., "Techniques for Information Retrieval Using an Inferential Question-Answering System with Natural-Language Input", SRI International, Nov. 1972, 198 Pages.
Coles et al., "The Application of Theorem Proving to Information Retrieval", SRI International, Jan. 1971, 21 pages.
Conklin, Jeff, "Hypertext: An Introduction and Survey", Computer Magazine, Sep. 1987, 25 pages.
Connolly et al., "Fast Algorithms for Complex Matrix Multiplication Using Surrogates", IEEE Transactions on Acoustics, Speech and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Cox et al., "Speech and Language Processing for Next-Millennium Communications Services", Proceedings of the IEEE, vol. 88, No. 8, Aug. 2000, 24 pages.
Craig et al., "Deacon: Direct English Access and Control", AFIPS Conference Proceedings, vol. 19, San Francisco, Nov. 1966, 18 pages.

(56) References Cited

OTHER PUBLICATIONS

Cutkosky et al., "PACT: An Experiment in Integrating Concurrent Engineering Systems", Journal & Magazines, Computer, vol. 26, No. 1, Jan. 1993, 14 pages.
Dar et al., "DTL's DataSpot: Database Exploration Using Plain Language", Proceedings of the 24th VLDB Conference, New York, 1998, 5 pages.
Davis et al., "A Personal Handheld Multi-Modal Shopping Assistant", International Conference on Networking and Services, IEEE, 2006, 9 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
"Mel Scale", Wikipedia the Free Encyclopedia, Last modified on Oct. 13, 2009 and retrieved on Jul. 28, 2010, available at <http://en.wikipedia.org/wiki/Mel_scale>, 2 pages.
"Minimum Phase", Wikipedia the free Encyclopedia, Last modified on Jan. 12, 2010 and retrieved on Jul. 28, 2010, available at <http://en.wikipedia.org/wiki/Minimum_phase>, 8 pages.
Acero et al., "Environmental Robustness in Automatic Speech Recognition", International Conference on Acoustics, Speech and Signal Processing (ICASSP'90), Apr. 1990, 4 pages.
Acero et al., "Robust Speech Recognition by Normalization of the Acoustic Space", International Conference on Acoustics, Speech and Signal Processing, 1991, 4 pages.
Agnas et al., "Spoken Language Translator: First-Year Report", SICS (ISSN 0283-3638), SRI and Telia Research AB, Jan. 1994, 161 pages.
Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 pages.
Alfred App, "Alfred", available at <http://www.alfredapp.com/>, retrieved on Feb. 8, 2012, 5 pages.
Allen, J., "Natural Language Understanding", 2nd Edition, The Benjamin/Cummings Publishing Company, Inc., 1995, 671 pages.
Alshawi et al., "CLARE: A Contextual Reasoning and Co-operative Response Framework for the Core Language Engine", SRI International, Cambridge Computer Science Research Centre, Cambridge, Dec. 1992, 273 pages.
Alshawi et al., "Declarative Derivation of Database Queries from Meaning Representations", Proceedings of the BANKAI Workshop on Intelligent Information Access, Oct. 1991, 12 pages.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Tokyo, 13 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, Databases and Applications of Semantics (ODBASE), 2005, 18 pages.
Anastasakos et al., "Duration Modeling in Large Vocabulary Speech Recognition", International Conference on Acoustics, Speech and Signal Processing (ICASSP95), May 1995, pp. 628-631.
Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.

Ansari et al., "Pitch Modification of Speech using a Low-Sensitivity Inverse Filter Approach", IEEE Signal Processing Letters, vol. 5, No. 3, Mar. 1998, pp. 60-62.
Anthony et al., "Supervised Adaption for Signature Verification System", IBM Technical Disclosure, Jun. 1, 1978, 3 pages.
Appelt et al., "Fastus: A Finite-State Processor for Information Extraction from Real-world Text", Proceedings of IJCAI, 1993, 8 pages.
Appelt et al., "SRI International Fastus System MUC-6 Test Results and Analysis", SRI International, Menlo Park, California, 1995, 12 pages.
Apple Computer, "Guide Maker User's Guide", Apple Computer, Inc., Apr. 27, 1994, 8 pages.
Apple Computer, "Introduction to Apple Guide", Apple Computer, Inc., Apr. 28, 1994, 20 pages.
Archbold et al., "A Team User's Guide", SRI International, Dec. 21, 1981, 70 pages.
Asanovic et al., "Experimental Determination of Precision Requirements for Back-Propagation Training of Artificial Neural Networks", Proceedings of the 2nd International Conference of Microelectronics for Neural Networks, 1991, www.ICSI.Berkelev.EDU, 1991, 7 pages.
Atal et al., "Efficient Coding of LPC Parameters by Temporal Decomposition", IEEE International Conference on Acoustics, Speech and Signal Processing (ICASSP'83), Apr. 1983, 4 pages.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. 7, Jul. 1989, 8 pages.
Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.
Bahl et al., "Large Vocabulary Natural Language Continuous Speech Recognition", Proceedings of 1989 International Conference on Acoustics, Speech and Signal Processing, vol. 1, May 1989, 6 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Bear et al., "A System for Labeling Self-Repairs in Speech", SRI International, Feb. 22, 1993, 9 pages.
Bear et al., "Detection and Correction of Repairs in Human-Computer Dialog", SRI International, May 1992, 11 pages.
Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.
Bear et al., "Using Information Extraction to Improve Document Retrieval", SRI International, Menlo Park, California, 1998, 11 pages.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology (EUROSPEECH'97), Sep. 1997, 4 pages.
Bellegarda et al., "A Multispan Language Modeling Framework for Large Vocabulary Speech Recognition", IEEE Transactions on Speech and Audio Processing, vol. 6, No. 5, Sep. 1998, 12 pages.

(56) References Cited

OTHER PUBLICATIONS

Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.
Bellegarda et al., "Experiments Using Data Augmentation for Speaker Adaptation", International Conference on Acoustics, Speech and Signal Processing (ICASSP'95), May 1995, 4 pages.
Bellegarda, Jerome R., "Exploiting Latent Semantic Information in Statistical Language Modeling", Proceedings of the IEEE, vol. 88, No. 8, Aug. 2000, 18 pages.
Bellegarda, Jerome R., "Interaction-Driven Speech Input-A Data-Driven Approach to the Capture of both Local and Global Language Constraints", available at <http://old.sig.chi.ora/bulletin/1998.2/bellegarda.html>, 1992, 7 pages.
Bellegarda, Jerome R., "Large Vocabulary Speech Recognition with Multispan Statistical Language Models", IEEE Transactions on Speech and Audio Processing, vol. 8, No. 1, Jan. 2000, 9 pages.
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.
Appelt et al., "SRI: Description of the JV-FASTUS System used for MUC-5", SRI International, Artificial Intelligence Center, 1993, 19 pages.
Bellegarda, Jerome R., "Exploiting both Local and Global Constraints for Multi-Span Statistical Language Modeling", Proceeding of the 1998 IEEE International Conference on Acoustics, Speech and Signal Processing (1CASSP'98), vol. 2, May 1998, 5 pages.
Shimazu et al., "CAPIT: Natural Language Interface Design Tool with Keyword Analyzer and Case-Based Parser", NEG Research & Development, vol. 33, No. 4, Oct. 1992, 11 pages.
Shinkle, L., "Team User's Guide", SRI International, Artificial Intelligence Center, Nov. 1984, 78 pages.
Shklar et al., "InfoHarness: Use of Automatically Generated Metadata for Search and Retrieval of Heterogeneous Information", Proceedings of CAiSE'95, Finland, 1995, 14 pages.
Sigurdsson et al., "Mel Frequency Cepstral Co-efficients: An Evaluation of Robustness of MP3 Encoded Music", Proceedings of the 7th International Conference on Music Information Retrieval, 2006, 4 pages.
Silverman et al., "Using a Sigmoid Transformation for Improved Modeling of Phoneme Duration", Proceedings of the IEEE International Conference on Acoustics, Speech and Signal Processing, Mar. 1999, 5 pages.
Simonite, Tom, "One Easy Way to Make Siri Smarter", Technology Review, Oct. 18, 2011, 2 pages.
Singh, N., "Unifying Heterogeneous Information Models", Communications of the ACM, 1998, 13 pages.
SRI International, "The Open Agent Architecture TM 1.0 Distribution", Open Agent Architecture (OAA), 1999, 2 pages.
Starr et al., "Knowledge-Intensive Query Processing", Proceedings of the 5th KRDB Workshop, Seattle, May 31, 1998, 6 pages.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, Mark E., "A Nonclausal Connection-Graph Resolution Theorem-Proving Program", Proceedings of AAAI'82, 1982, 5 pages.
Sugumaran, V., "A Distributed Intelligent Agent-Based Spatial Decision Support System", Proceedings of the Americas Conference on Information systems (AMCIS), Dec. 31, 1998, 4 pages.
Sycara et al., "Coordination of Multiple Intelligent Software Agents", International Journal of Cooperative Information Systems (IJCIS), vol. 5, No. 2 & 3, 1996, 31 pages.
Sycara et al., "Distributed Intelligent Agents", IEEE Expert, vol. 11, No. 6, Dec. 1996, 32 pages.
Sycara et al., "Dynamic Service Matchmaking among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
Tenenbaum et al., "Data Structure Using Pascal", Prentice-Hall, Inc., 1981, 34 pages.
Textndrive, "Text'nDrive App Demo-Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakTolt: A Personal Assistant for Older iPhones, iPads", Apple News, Tips and Reviews, Feb. 9, 2012, 7 pages.
Tsai et al., "Attributed Grammar—A Tool for Combining Syntactic and Statistical Approaches to Pattern Recognition", IEEE Transactions on Systems, Man and Cybernetics, vol. SMC-10, No. 12, Dec. 1980, 13 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1994, 9 pages.
Van Santen, J. P.H., "Contextual Effects on Vowel Duration", Journal Speech Communication, vol. 11, No. 6, Dec. 1992, pp. 513-546.
Vepa et al., "New Objective Distance Measures for Spectral Discontinuities in Concatenative Speech Synthesis", Proceedings of the IEEE 2002 Workshop on Speech Synthesis, 2002, 4 pages.
Verschelde, Jan, "MATLAB Lecture 8. Special Matrices in MATLAB", UIC, Dept. of Math, Stat. & CS, MCS 320, Introduction to Symbolic Computation, 2007, 4 pages.
Vingron, Martin, "Near-Optimal Sequence Alignment", Current Opinion in Structural Biology, vol. 6, No. 3, 1996, pp. 346-352.
Vlingo, "Vlingo Launches Voice Enablement Application on Apple App Store", Press Release, Dec. 3, 2008, 2 pages.
Vlingo Incar, "Distracted Driving Solution with Vlingo InCar", YouTube Video, Available online at <http://www.youtube.com/watch?v=Vqs8XfXxgz4>, Oct. 2010, 2 pages.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pJqpWgQS98w>, Jul. 27, 2009, 1 page.
Wahlster et al., "Smartkom: Multimodal Communication with a Life-Like Character", Eurospeech-Scandinavia, 7th European Conference on Speech Communication and Technology, 2001, 5 pages.
Waldinger et al., "Deductive Question Answering from Multiple Resources", New Directions in Question Answering, Published by AAAI, Menlo Park, 2003, 22 pages.
Walker et al., "Natural Language Access to Medical Text", SRI International, Artificial Intelligence Center, Mar. 1981, 23 pages.
Waltz, D., "An English Language Question Answering System for a Large Relational Database", ACM, vol. 21, No. 7, 1978, 14 pages.
Ward et al., "A Class Based Language Model for Speech Recognition", IEEE, 1996, 3 pages.
Ward et al., "Recent Improvements in the CMU Spoken Language Understanding System", ARPA Human Language Technology Workshop, 1994, 4 pages.
Ward, Wayne, "The CMU Air Travel Information Service: Understanding Spontaneous Speech", Proceedings of the Workshop on Speech and Natural Language, HLT '90, 1990, pp. 127-129.
Warren et al., "An Efficient Easily Adaptable System for Interpreting Natural Language Queries", American Journal of Computational Linguistics, vol. 8, No. 3-4, 1982, 11 pages.

(56) References Cited

OTHER PUBLICATIONS

Weizenbaum, J., "ELIZA—A Computer Program for the Study of Natural Language Communication Between Man and Machine", Communications of the ACM, vol. 9, No. 1, Jan. 1966, 10 pages.
Werner et al., "Prosodic Aspects of Speech, Universite de Lausanne", Fundamentals of Speech Synthesis and Speech Recognition: Basic Concepts, State of the Art and Future Challenges, 1994, 18 pages.
Winiwarter et al., "Adaptive Natural Language Interfaces to FAQ Knowledge Bases", Proceedings of 4th International Conference on Applications of Natural Language to Information Systems, Austria, Jun. 1999, 22 pages.
Wolff, M., "Post Structuralism and the ARTFUL Database: Some Theoretical Considerations", Information Technology and Libraries, vol. 13, No. 1, Mar. 1994, 10 pages.
Wu, M., "Digital Speech Processing and Coding", Multimedia Signal Processing, Lecture-2 Course Presentation, University of Maryland, College Park, 2003, 8 pages.
Wu et al., "KDA: A Knowledge-Based Database Assistant", Proceeding of the Fifth International Conference on Engineering (IEEE Cat.No. 89CH2695-5), 1989, 8 pages.
Wu, M., "Speech Recognition, Synthesis, and H.C.I.", Multimedia Signal Processing, Lecture-3 Course Presentation, University of Maryland, College Park, 2003, 11 pages.
Wyle, M. F., "A Wide Area Network Information Filter", Proceedings of First International Conference on Artificial Intelligence on Wall Street, Oct. 1991, 6 pages.
"BluePhoneElite: Features", available at <http://www.reelintelligence.com/BluePhoneElite/features.shtml,>, retrieved on Sep. 25, 2006, 2 pages.
"Digital Audio in the New Era", Electronic Design and Application, No. 6, Jun. 30, 2003, 3 pages.
"Mobile Speech Solutions, Mobile Accessibility", SVOX AG Product Information Sheet, available at <http://www.svox.com/site/bra840604/con782768/mob965831936.aSQ?osLang=1>, Sep. 27, 2012, 1 page.
"N200 Hands-Free Bluetooth Car Kit", available at <www.wirelessground.com>, retrieved on Mar. 19, 2007, 3 pages.
"PhatNoise", Voice Index on Tap, Kenwood Music Keg, available at <http://www.phatnoise.com/kenwood/kenwoodssamail.html>, retrieved on Jul. 13, 2006, 1 page.
"What is Fuzzy Logic?", available at <http://www.cs.cmu.edu>, retrieved on Apr. 15, 1993, 5 pages.
"Windows XP: A Big Surprise!—Experiencing Amazement from Windows XP", New Computer, No. 2, Feb. 28, 2002, 8 pages.
Aikawa et al., "Generation for Multilingual MT", available at <http://mtarchive.info/MTS-2001-Aikawa.pdf>, retrieved on Sep. 18, 2001, 6 pages.
Anhui USTC IFL Ytek Co. Ltd., "Flytek Research Center Information Datasheet", available at <http://www.iflttek.com/english/Research.html>, retrieved on Oct. 15, 2004, 3 pages.
Borden IV, G.R., "An Aural User Interface for Ubiquitous Computing", Proceedings of the 6th International Symposium on Wearable Computers, IEEE, 2002, 2 pages.
Brain, Marshall, "How MP3 Files Work", available at <http://www.howstuffworks.com>, retrieved on Mar. 19, 2007, 4 pages.
Busemann et al., "Natural Language Diaglogue Service for Appointment Scheduling Agents", Technical Report RR-97-02, Deutsches Forschungszentrum fur Kunstliche Intelligenz GmbH, 1997, 8 pages.
Dusan et al., "Multimodal Interaction on PDA's Integrating Speech and Pen Inputs", Eurospeech Geneva, 2003, 4 pages.
Lamel et al., "Generation and synthesis of Broadcast Messages", Proceedings of ESCA-NATO Workshop: Applications of Speech Technology, Sep. 1, 1993, 4 pages.
Lyons et al., "Augmenting Conversations Using Dual-Purpose Speech", Proceedings of the 17th Annual ACM Symposium on User interface Software and Technology, 2004, 10 pages.
Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.

International Search Report and Written Opinion received for PCT Patent Application No. PCT/US2004/016519, dated Nov. 3, 2005, 6 pages.
Invitation to Pay Additional Fees and Partial International Search Report received for PCT Patent Application No. PCT/US2004/016519, dated Aug. 4, 2005, 6 pages.
International Search Report received for PCT Patent Application No. PCT/US2011/037014, dated Oct. 4, 2011, 6 pages.
Invitation to Pay Additional Search Fees received for PCT Application No. PCT/US2011/037014, dated Aug. 2, 2011, 6 pages.
International Search Report and Written Opinion received for PCT Patent Application No. PCT/US2012/043098, dated Nov. 14, 2012, 9 pages.
International Search Report and Written Opinion received for PCT Patent Application No. PCT/US2013/040971, dated Nov. 12, 2013, 11 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.
Ricker, Thomas, "Apple Patents Audio User Interface", Engadget, available at <http://www.engadget.com/2006/05/04/apple-patents-audio-user-interface/>, May 4, 2006, 6 pages.
Santaholma, Marianne E., "Grammar Sharing Techniques for Rule-based Multilingual NLP Systems", Proceedings of the 16th Nordic Conference of Computational Linguistics, NODALIDA 2007, May 25, 2007, 8 pages.
Taylor et al., "Speech Synthesis by Phonological Structure Matching", International Speech Communication Association, vol. 2, Section 3, 1999, 4 pages.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yunker, John, "Beyond Borders: Web Globalization Strategies", New Riders, Aug. 22, 2002, 11 pages.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", Computer Magazine, IEEE, Jan. 1988, 16 pages.
Yoon et al., "Letter-to-Sound Rules for Korean", Department of Linguistics, The Ohio State University, 2002, 4 pages.
Zeng et al., "Cooperative Intelligent Software Agents", The Robotics Institute, Carnegie-Mellon University, Mar. 1995, 13 pages.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zhao et al., "Intelligent Agents for Flexible Workflow Systems", Proceedings of the Americas Conference on Information Systems (AMCIS), Oct. 1998, 4 pages.
Zovato et al., "Towards Emotional Speech Synthesis: A Rule based Approach", Proceedings of 5th ISCA Speech Synthesis Workshop—Pittsburgh, 2004, pp. 219-220.
Zue, Victor, "Conversational Interfaces: Advances and Challenges", Spoken Language System Group, Sep. 1997, 10 pages.
Zue et al., "From Interface to Content: Translingual Access and Delivery of On-Line Information", Eurospeech, 1997, 4 pages.
Zue et al., "Jupiter: A Telephone-Based Conversational Interface for Weather Information", IEEE Transactions on Speech and Audio Processing, Jan. 2000, 13 pages.
Zue et al., "Pegasus: A Spoken Dialogue Interface for On-Line Air Travel Planning", Speech Communication, vol. 15, 1994, 10 pages.
Zue et al., "The Voyager Speech Understanding System: Preliminary Development and Evaluation", Proceedings of IEEE, International Conference on Acoustics, Speech and Signal Processing, 1990, 4 pages.
Zue, Victor W., "Toward Systems that Understand Spoken Language", ARPA Strategic Computing Institute, Feb. 1994, 9 pages.
International Search Report received for PCT Patent Application No. PCT/GB2009/051684, dated Mar. 12, 2010, 4 pages.

(56) References Cited

OTHER PUBLICATIONS

International Preliminary Report on Patentability received for PCT Patent Application No. PCT/GB2009/051684, dated Jun. 23, 2011, 10 pages.
Cucerzan et al., "Bootstrapping a Multilingual Part-of-Speech Tagger in One Person-Day", In Proceedings of the 6th Conference on Natural Language Learning, vol. 20, 2002, pp. 1-7.
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Casner et al., "N-Way Conferencing with Packet Video", The Third International Workshop on Packet Video, Mar. 22-23, 1990, pp. 1-6.
Chakarova et al., "Digital Still Cameras—Downloading Images to a Computer", Multimedia Reporting and Convergence, available at <http://journalism.berkeley.edu/multimedia/tutorials/stillcams/downloading.html>, retrieved on May 9, 2005, 2 pages.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Extended European Search Report (includes European Search Report and European Search Opinion) received for European Patent Application No. 06256215.2, dated Feb. 20, 2007, 6 pages.
Extended European Search Report (includes Supplementary European Search Report and Search Opinion) received for European Patent Application No. 07863218.9, dated Dec. 9, 2010, 7 pages.
Extended European Search Report (includes European Search Report and European Search Opinion) received for European Patent Application No. 12186113.2, dated Apr. 28, 2014, 14 pages.
Extended European Search Report (includes European Search Report and European Search Opinion) received for European Patent Application No. 13155688.8, dated Aug. 22, 2013, 11 pages.
ABCOM PTY. Ltd. "12.1" 925 Candela Mobile PC", LCDHardware.com, available at <http://www.lcdhardware.com/panel/12_1_panel/default.asp.>, retrieved on Dec. 19, 2002, 2 pages.
Cisco Systems, Inc., "Cisco Unity Unified Messaging User Guide", Release 4.0(5), Apr. 14, 2005, 152 pages.
Cisco Systems, Inc., "Installation Guide for Cisco Unity Unified Messaging with Microsoft Exchange 2003/2000 (With Failover Configured)", Release 4.0(5), Apr. 14, 2005, 152 pages.
Cisco Systems, Inc., "Operations Manager Tutorial, Cisco's IPC Management Solution", 2006, 256 pages.
Coleman, David W., "Meridian Mail Voice Mail System Integrates Voice Processing and Personal Computing", Speech Technology, vol. 4, No. 2, Mar./Apr. 1988, pp. 84-87.
Compaq, "Personal Jukebox", available at <http://research.compaq.com/SRC/pjb/>, 2001, 3 pages.
Compaq Inspiration Technology, "Personal Jukebox (PJB)—Systems Research Center and PAAD", Oct. 13, 2000, 25 pages.
Conkie et al., "Preselection of Candidate Units in a Unit Selection-Based Text-to-Speech Synthesis System", ISCA, 2000, 4 pages.
Conklin, Jeffrey, "A Survey of Hypertext", MCC Software Technology Program, Dec. 1987, 40 pages.
Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.

Creative, "Creative NOMAD MuVo", available at <http://web.archive.org/web/20041024075901/www.creative.com/products/product.asp?category=213&subcategory=216&product=4983>, retrieved on Jun. 7, 2006, 1 page.
Creative, "Creative NOMAD MuVo TX", available at <http://web.archive.org/web/20041024175952/www.creative.com/products/pfriendly.asp?product=9672>, retrieved on Jun. 6, 2006, 1 page.
Creative, "Digital MP3 Player", available at <http://web.archive.org/web/20041024074823/www.creative.com/products/product.asp?category=213&subcategory=216&product=4983, 2004, 1 page.
Creative Technology Ltd., "Creative NOMAD®: Digital Audio Player: User Guide (On-Line Version)", available at <http://ec1.images-amazon.com/media/i3d/01/A/man-migrate/MANUAL000010757.pdf>, Jun. 1999, 40 pages.
Creative Technology Ltd., "Creative NOMAD® II: Getting Started—User Guide (On Line Version)", available at <http://ec1.images-amazon.com/media/i3d/01/A/man-migrate/MANUAL000026434.pdf>, Apr. 2000, 46 pages.
Creative Technology Ltd., "Nomad Jukebox", User Guide, Version 1.0, Aug. 2000, 52 pages.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW 90 Proceedings, Oct. 1990, pp. 329-342.
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.
ABF Software, "Lens- Magnifying Glass 1.5", available at <http://download.com/3000-2437-10262078.html?tag=1st-0-1>, retrieved on Feb. 11, 2004, 1 page.
Davis et al., "Stone Soup Translation", Department of Linguistics, Ohio State University, 2001, 11 pages.
De Herrera, Chris, "Microsoft ActiveSync 3.1", Version 1.02, available at <http://www.cewindows.net/wce/activesync3.1.htm>, Oct. 13, 2000, 8 pages.
Degani et al., "'Soft' Controls for Hard Displays: Still a Challenge", Proceedings of the 36th Annual Meeting of the Human Factors Society, 1992, pp. 52-56.
Del Strother, Jonathan, "Coverflow", available at <http://www.steelskies.com/coverflow>, retrieved on Jun. 15, 2006, 14 pages.
Diamond Multimedia Systems, Inc., "Rio PMP300: User's Guide", available at <http://ec1.images-amazon.com/media/i3d/01/A/man-migrate/MANUAL000022854.pdf>, 1998, 28 pages.
Dickinson et al., "Palmtips: Tiny Containers for All Your Data", PC Magazine, vol. 9, Mar. 1990, p. 218(3).
Digital Equipment Corporation, "OpenVMS RTL DECtalk (DTK$) Manual", May 1993, 56 pages.
Donahue et al., "Whiteboards: A Graphical Database Tool", ACM Transactions on Office Information Systems, vol. 4, No. 1, Jan. 1986, pp. 24-41.
Dourish et al., "Portholes: Supporting Awareness in a Distributed Work Group", CHI 1992;, May 1992, pp. 541-547.
Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.
dyslexic.com, "AlphaSmart 3000 with CoWriter SmartApplet: Don Johnston Special Needs", available at <http://www.dyslexic.com/procuts.php?catid- 2&pid=465&PHPSESSID=2511b800000f7da>, retrieved on Dec. 6, 2005, 13 pages.
Edwards, John R., "Q&A: Integrated Software with Macros and an Intelligent Assistant", Byte Magazine, vol. 11, No. 1, Jan. 1986, pp. 120-122.
Egido, Carmen, "Video Conferencing as a Technology to Support Group Work: A Review of its Failures", Bell Communications Research, 1988, pp. 13-24.
Elliot, Chip, "High-Quality Multimedia Conferencing Through a Long-Haul Packet Network", BBN Systems and Technologies, 1993, pp. 91-98.
Elliott et al., "Annotation Suggestion and Search for Personal Multimedia Objects on the Web", CIVR, Jul. 7-9, 2008, pp. 75-84.

(56) References Cited

OTHER PUBLICATIONS

Elofson et al., "Delegation Technologies: Environmental Scanning with Intelligent Agents", Jour. of Management Info. Systems, Summer 1991, vol. 8, No. 1, 1991, pp. 37-62.
Eluminx, "Illuminated Keyboard", available at <http://www.elumix.com/>, retrieved on Dec. 19, 2002, 1 page.
Engst, Adam C., "SoundJam Keeps on Jammin'", available at <http://db.tidbits.com/getbits.acgi?tbart=05988>, Jun. 19, 2000, 3 pages.
Ericsson Inc., "Cellular Phone with Integrated MP3 Player", Research Disclosure Journal No. 41815, Feb. 1999, 2 pages.
Eslambolchilar et al., "Making Sense of Fisheye Views", Second Dynamics and Interaction Workshop at University of Glasgow, Aug. 2005, 6 pages.
Eslambolchilar et al., "Multimodal Feedback for Tilt Controlled Speed Dependent Automatic Zooming", UIST'04, Oct. 24-27, 2004, 2 pages.
Fanty et al., "A Comparison of DFT, PLP and Cochleagram for Alphabet Recognition", IEEE, Nov. 1991.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Fisher et al., "Virtual Environment Display System", Interactive 3D Graphics, Oct. 23-24, 1986, pp. 77-87.
Forsdick, Harry, "Explorations into Real-Time Multimedia Conferencing", Proceedings of the Ifip Tc 6 International Symposium on Computer Message Systems, 1986, 331 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHi Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991.
Gardner, Jr., P. C., "A System for the Automated Office Environment", IBM Systems Journal, vol. 20, No. 3, 1981, pp. 321-345.
Garretson, R., "IBM Adds 'Drawing Assistant' Design Tool to Graphic Series", PC Week, vol. 2, No. 32, Aug. 13, 1985, 1 page.
Gaver et al., "One Is Not Enough: Multiple Views in a Media Space", INTERCHI, Apr. 24-29, 1993, pp. 335-341.
Gaver et al., "Realizing a Video Environment: EuroPARC's RAVE System", Rank Xerox Cambridge EuroPARC, 1992, pp. 27-35.
Giachin et al., "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.
Gilloire et al., "Innovative Speech Processing for Mobile Terminals: An Annotated Bibliography", Signal Processing, vol. 80, No. 7, Jul. 2000, pp. 1149-1166.
Glinert-Stevens, Susan, "Microsoft Publisher: Desktop Wizardry", PC Sources, vol. 3, No. 2, Feb. 1992, 1 page.
Gmail, "About Group Chat", available at <http://mail.google.com/support/bin/answer.py?answer=81090>, Nov. 26, 2007, 2 pages.
Goldberg, Cheryl, "IBM Drawing Assistant: Graphics for the EGA", PC Magazine, vol. 4, No. 26, Dec. 24, 1985, 1 page.
Good et al., "Building a User-Derived Interface", Communications of the ACM; (Oct. 1984) vol. 27, No. 10, Oct. 1984, pp. 1032-1043.
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.
Greenberg, Saul, "A Fisheye Text Editor for Relaxed-Wysiwis Groupware", CHI '96 Companion, Vancouver, Canada, Apr. 13-18, 1996, 2 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Gruhn et al., "A Research Perspective on Computer-Assisted Office Work", IBM Systems Journal, vol. 18, No. 3, 1979, pp. 432-456.
Hain et al., "The Papageno TTS System", Siemens AG, Corporate Technology, Munich, Germany TC-STAR Workshop, 2006, 6 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM. Internationalization Support", Microsoft Systems Journal, vol. 6, No. 6, Nov./Dec. 1991, pp. 29-58.
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hartson et al., "Advances in Human-Computer Interaction", Chapters 1, 5, and 6, vol. 3, 1992, 121 pages.
Heger et al., "KNOWBOT: An Adaptive Data Base Interface", Nuclear Science and Engineering, V. 107, No. 2, Feb. 1991, pp. 142-157.
Hendrix et al., "The Intelligent Assistant: Technical Considerations Involved in Designing q&a's Natural-Language Interface", Byte Magazine, Issue 14, Dec. 1987, 1 page.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories, CSCW 90 Proceedings, Oct. 1990, pp. 13-26.
Holmes, "Speech System and Research", 1955, pp. 129-135, 152-153.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—An Experimental System for Multimedia Applications", Olivetti Research Laboratory, Apr. 1990, pp. 19-34.
Howard, John H., "(Abstract) An Overview of the Andrew File System", Information Technology Center, Carnegie Mellon University; (CMU-ITC-88-062) To Appear in a future issue of the ACM Transactions on Computer Systems, 1988, pp. 1-6.
Huang et al., "Real-Time Software-Based Video Coder for Multimedia Communication Systems", Department of Computer Science and Information Engineering, 1993, 10 pages.
Hukin, R. W., "Testing an Auditory Model by Resynthesis", European Conference on Speech Communication and Technology, Sep. 26-29, 1989, pp. 243-246.
Hunt, "Unit Selection in a Concatenative Speech Synthesis System Using a Large Speech Database", Copyright 1996 IEEE. "To appear in Proc. ICASSP-96, May 7-10, Atlanta, GA" ATR Interpreting Telecommunications Research Labs, Kyoto Japan, 1996, pp. 373-376.
IBM, "Why Buy: ThinkPad", available at <http://www.pc.ibm.com/us/thinkpad/easeofuse.html>, retrieved on Dec. 19, 2002, 2 pages.
IBM Corporation, "Simon Says Here's How", Users Manual, 1994, 3 pages.
IChat AV, "Video Conferencing for the Rest of Us", Apple—Mac OS X—iChat AV, available at <http://www.apple.com/macosx/features/ichat/>, retrieved on Apr. 13, 2006, 3 pages.
IPhone Hacks, "Native iPhone MMS Application Released", available at <http://www.iphonehacks.com/2007/12/iphone-mms-app.html>, retrieved on Dec. 25, 2007, 5 pages.

(56) References Cited

OTHER PUBLICATIONS

Iphonechat, "iChat for iPhone in JavaScript", available at <http://www.publictivity.com/iPhoneChat/>, retrieved on Dec. 25, 2007, 2 pages.
Jabra, "Bluetooth Headset: User Manual", 2005, 17 pages.
Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.
Oregon Scientific, "512MB Waterproof MP3 Player with FM Radio & Built-in Pedometer", available at <http://www2.oregonscientific.com/shop/product.asp?cid=4&scid=11&pid=581>, retrieved on Jul. 31, 2006, 2 pages.
Oregon Scientific, "Waterproof Music Player with FM Radio and Pedometer (MP121)—User Manual", 2005, 24 pages.
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.
Palay et al., "The Andrew Toolkit: An Overview", Information Technology Center, Carnegie-Mellon University, 1988, pp. 1-15.
Palm, Inc., "User Guide : Your Palm® Treo.TM. 755p Smartphone", 2005-2007, 304 pages.
Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.
Parks et al., "Classification of Whale and Ice Sounds with a cochlear Model", IEEE, Mar. 1992.
Patterson et al., "Rendezvous: An Architecture for Synchronous Multi-User Applications", CSCW '90 Proceedings, 1990, pp. 317-328.
International Search Report received for PCT Patent Application No. PCT/US2002/033330, dated Feb. 4, 2003, 6 pages.
Ahmed et al., "Intelligent Natural Language Query Processor", TENCON '89, Fourth IEEE Region 10 International Conference, Nov. 22-24, 1989, pp. 47-49.
Ahuja et al., "A Comparison of Application Sharing Mechanisms in Real-Time Desktop Conferencing Systems", AT&T Bell Laboratories, 1990, pp. 238-248.
International Search Report and Written Opinion received for PCT Patent Application No. PCT/US2005/038819, dated Apr. 5, 2006, 12 pages.
International Search Report received for PCT Patent Application No. PCT/US2005/046797, dated Nov. 24, 2006, 6 pages.
Invitation to Pay Additional Fees and Partial Search Report received for PCT Application No. PCT/US2005/046797, dated Jul. 3, 2006, 6 pages.
Written Opinion received for PCT Patent Application No. PCT/US2005/046797, dated Nov. 24, 2006, 9 pages.
International Search Report and Written Opinion received for PCT Patent Application No. PCT/US2006/048669, dated Jul. 2, 2007, 12 pages.
International Search Report and Written Opinion received for PCT Patent Application No. PCT/US2006/048670, dated May 21, 2007, 11 pages.
Invitation to Pay Addition Fees and Partial International Search Report received for PCT Patent Application No. PCT/US2006/048738, dated Jul. 10, 2007, 4 pages.
International Search Report and Written Opinion received for PCT Patent Application No. PCT/US2006/048753, dated Jun. 19, 2007, 15 pages.
International Search Report and Written Opinion received for PCT Patent Application No. PCT/US2007/026243, dated Mar. 31, 2008, 10 pages.
International Search Report and Written Opinion received for PCT Patent Application No. PCT/US2007/077424, dated Jun. 19, 2008, 13 pages.
Invitation to Pay Additional Fees received for PCT Application No. PCT/US2007/077424, dated Apr. 29, 2008, 6 pages.
International Search Report and Written Opinion received for PCT Patent Application No. PCT/US2007/077443, dated Feb. 21, 2008, 8 pages.
International Search Report and Written Opinion received for PCT Patent Application No. PCT/US2007/088872, dated May 8, 2008, 8 pages.
International Search Report and Written Opinion received for PCT Patent Application No. PCT/US2007/088873, dated May 8, 2008, 7 pages.
International Search Report and Written Opinion received for PCT Patent Application No. PCT/US2008/000032, dated Jun. 12, 2008, 7 pages.
International Search Report and Written Opinion received for PCT Patent Application No. PCT/US2008/000042, dated May 21, 2008, 7 pages.
International Search Report and Written Opinion received for PCT Patent Application No. PCT/US2008/000043, dated Oct. 10, 2008, 12 pages.
Invitation to Pay Additional Fees received for PCT Patent Application No. PCT/US2008/000043, dated Jun. 27, 2008, 4 pages.
International Search Report and Written Opinion received for PCT Patent Application No. PCT/US2008/000045, dated Jun. 12, 2008, 7 pages.
International Search Report and Written Opinion received for PCT Patent Application No. PCT/US2008/000047, dated Sep. 11, 2008, 12 pages.
Invitation to Pay Additional Fees received for PCT Patent Application No. PCT/US2008/000047, dated Jul. 4, 2008, 4 pages.
International Search Report and Written Opinion received for PCT Patent Application No. PCT/US2008/000059, dated Sep. 19, 2008, 18 pages.
International Search Report and Written Opinion received for PCT Patent Application No. PCT/US2008/000061, dated Jul. 1, 2008, 13 pages.
International Search Report and Written Opinion received for PCT Patent Application No. PCT/US2008/050083, dated Jul. 4, 2008, 9 pages.
International Search Report and Written Opinion received for PCT Patent Application No. PCT/US2011/020350, dated Jun. 30, 2011, 17 pages.
Invitation to Pay Additional Fees and Partial International Search Report received for PCT Patent Application No. PCT/US2011/020350, dated Apr. 14, 2011, 5 pages.
International Preliminary Report on Patentability received for PCT Patent Application No. PCT/US2011/020861, dated Aug. 2, 2012, 11 pages.
Aikawa, K. "Time-Warping Neural Network for Phoneme Recognition", IEEE International Joint Conference on Neural Networks, vol. 3, Nov. 18-21, 1991, pp. 2122-2127.
Allen et al., "Automated Natural Spoken Dialog", Computer, vol. 35, No. 4, Apr. 2002, pp. 51-56.
Alleva et al., "Applying SPHINX-II to DARPA Wall Street Journal CSR Task", Proceedings of Speech and Natural Language Workshop, Feb. 1992, pp. 393-398.
Amrel Corporation, "Rocky Matrix BackLit Keyboard", available at <http://www.amrel.com/asi_matrixkeyboard.html>, retrieved on Dec. 19, 2002, 1 page.
International Search Report and Written Opinion received for PCT Patent Application No. PCT/US2012/034028, dated Jun. 11, 2012, 9 pages.
International Search Report and Written Opinion received for PCT Patent Application No. PCT/US2012/040931, dated Feb. 1, 2013, 4 pages. (International Search Report only).
Apple, "VoiceOver", available at <http://www.apple.com/accessibility/voiceover/>, Feb. 2009, 5 pages.
Apple Computer, Inc., "Apple—iPod—Technical Specifications, iPod 20GB and 60GB Mac + PC", available at <http://www.apple.com/ipod/color/specs.html>, 2005, 3 pages.
International Search Report and Written Opinion received for PCT Patent Application No. PCT/US2013/041225, dated on Aug. 23, 2013, 3 pages. (International Search Report only).
Invitation to Pay Additional Fees received for PCT Patent Application No. PCT/US2013/047659, dated Feb. 27, 2014, 7 pages.

(56) References Cited

OTHER PUBLICATIONS

Invitation to Pay Additional Fees received for PCT Application No. PCT/US2013/052558, dated Nov. 7, 2013, 6 pages.

\* cited by examiner

DOMAIN SPECIFIC LANGUAGE FOR ENCODING ASSISTANT DIALOG

CROSS-REFERENCE TO RELATED APPLICATION

This application claims priority from U.S. Provisional Ser. No. 62/005,886, filed on May 30, 2014, entitled DOMAIN SPECIFIC LANGUAGE FOR ENCODING ASSISTANT DIALOG, which is hereby incorporated by reference in its entirety for all purposes.

FIELD

This relates generally to virtual assistants and, more specifically, to generating output dialogs for virtual assistants.

BACKGROUND

Intelligent automated assistants (or virtual assistants) provide an intuitive interface between users and electronic devices. These assistants can allow users to interact with devices or systems using natural language in spoken and/or text forms. For example, a user can access the services of an electronic device by providing a spoken user input in natural language form to a virtual assistant associated with the electronic device. The virtual assistant can perform natural language processing on the spoken user input to infer the user's intent and operationalize the user's intent into tasks. The tasks can then be performed by executing one or more functions of the electronic device, and a relevant output can be returned to the user in natural language form.

To generate the output in natural language form, conventional virtual assistants require that a developer specify the content and format of every possible natural language output (e.g., in full-sentence form), as well as the specific conditions that must be met for each output to be returned to the user. For example, a virtual assistant can be programmed to output the string "Your search returned  results" in response to a search query yielding multiple results, can be programmed to output the string "Your search returned one result" in response to a search query yielding one result, and can be programmed to output the string "Your search returned no results" in response to a search query yielding no results.

While conventional virtual assistants programmed in this way can produce relevant outputs in natural language form, the process of specifying the content and format of every possible natural language output can be time-consuming and can produce repetitive results.

SUMMARY

Systems and processes for operating a virtual assistant are disclosed. One example process can include accessing a textual representation of user speech, determining a response to the textual representation of user speech, generating a plurality of output segments based on the determined response to the textual representation of user speech, wherein each of the plurality of output segments comprises one or more words, and generating an output dialog based on the plurality of output segments and an order associated with the plurality of output segments.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

For descriptive purposes, throughout this disclosure, software, software modules, software blocks, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules, blocks, or objects by executing computer instructions provided by the software modules, blocks, or objects.

This relates to systems and processes for generating output dialogs for virtual assistants. An output dialog can be generated from multiple output segments that can each include a string of one or more characters or words. The contents of an output segment can be selected from multiple possible outputs based on a predetermined order, conditional logic, or a random selection. The output segments can then be concatenated to form the output dialog. In some examples, a dialog generation file that defines the possible outputs for each output segment, an ordering of the output segments within the output dialog, and format for the output dialog to be displayed or otherwise presented to a user can be used to generate the output dialog. The dialog generation file can include any number of functional blocks, which can each output an output segment, that can be arranged hierarchically and in a particular order to generate a desired output dialog.

System Overview

Figure 1:
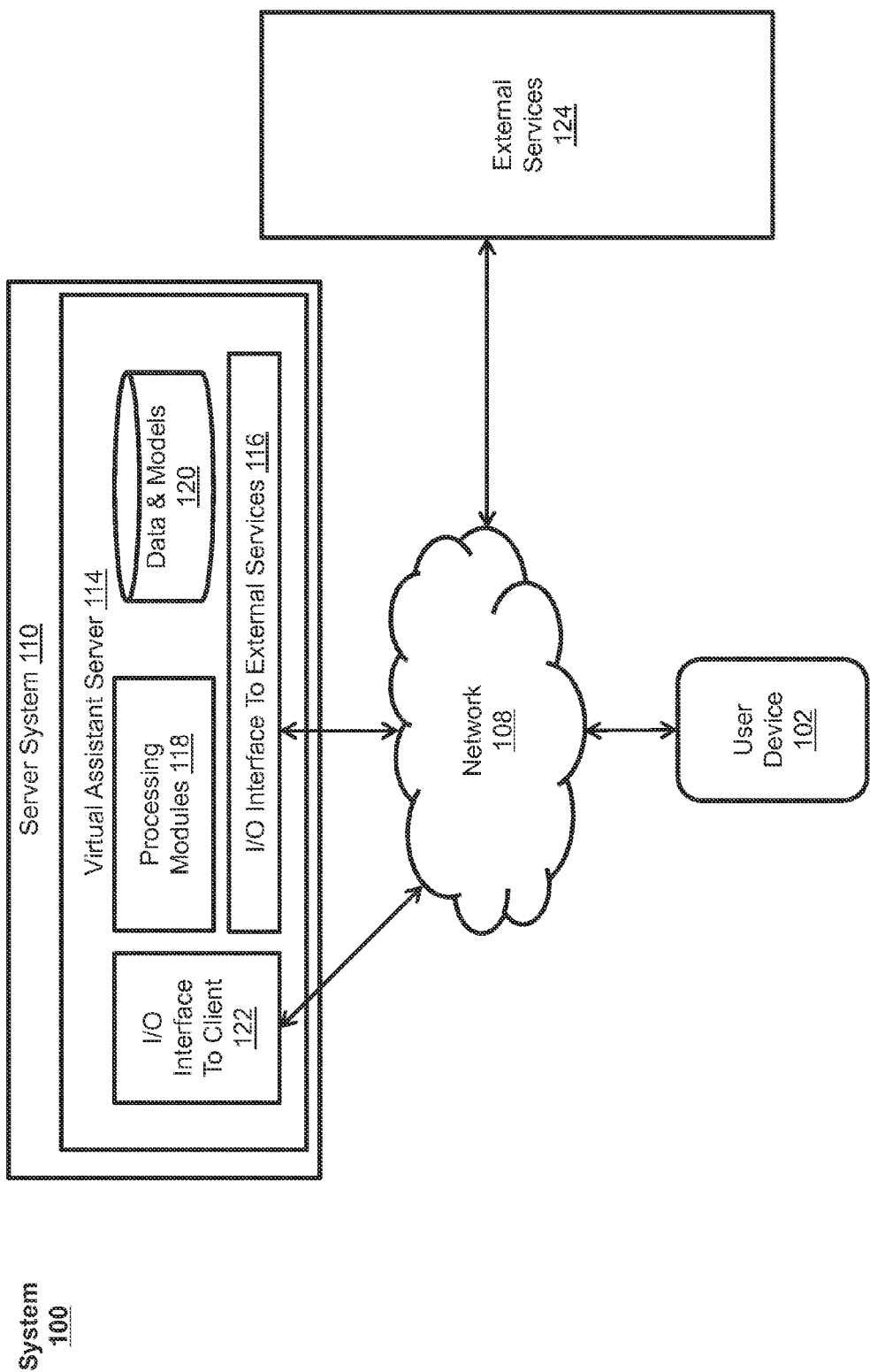
FIG. 1 illustrates an exemplary environment in which a virtual assistant can operate according to various examples.

FIG. 1 illustrates exemplary system 100 for implementing a virtual assistant according to various examples. The terms "virtual assistant," "digital assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

A virtual assistant can be capable of accepting a user request at least partially in the form of a natural language command, request, statement, narrative, and/or inquiry. Typically, the user request seeks either an informational answer or performance of a task by the virtual assistant. A satisfactory response to the user request can include provision of the requested informational answer, performance of the requested task, or a combination of the two. For example, a user can ask the virtual assistant a question, such as "Where am I right now?" Based on the user's current location, the virtual assistant can answer, "You are in Central Park." The user can also request the performance of a task, for example, "Please remind me to call Mom at 4 p.m. today." In response, the virtual assistant can acknowledge the request and then create an appropriate reminder item in the user's electronic schedule. During the performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.).

An example of a virtual assistant is described in Applicants' U.S. Utility application Ser. No. 12/987,982 for "Intelligent Automated Assistant," filed Jan. 10, 2011, the entire disclosure of which is incorporated herein by reference.

As shown in FIG. 1, in some examples, a virtual assistant can be implemented according to a client-server model. The virtual assistant can include a client-side portion executed on a user device 102, and a server-side portion executed on a server system 110. User device 102 can include any electronic device, such as a mobile phone, tablet computer, portable media player, desktop computer, laptop computer, PDA, television, television set-top box, wearable electronic device, or the like, and can communicate with server system 110 through one or more networks 108, which can include the Internet, an intranet, or any other wired or wireless public or private network. The client-side portion executed on user device 102 can provide client-side functionalities, such as user-facing input and output processing and communications with server system 110. Server system 110 can provide server-side functionalities for any number of clients residing on a respective user device 102.

Server system 110 can include one or more virtual assistant servers 114 that can include a client-facing I/O interface 122, one or more processing modules 118, data and model storage 120, and an I/O interface to external services 116. The client-facing I/O interface 122 can facilitate the client-facing input and output processing for virtual assistant server 114. The one or more processing modules 118 can utilize data and model storage 120 to determine the user's intent based on natural language input, and perform task execution based on inferred user intent. In some examples, virtual assistant server 114 can communicate with external services 124, such as telephony services, calendar services, information services, messaging services, navigation services, and the like, through network(s) 108 for task completion or information acquisition. The I/O interface to external services 116 can facilitate such communications.

Server system 110 can be implemented on one or more standalone data processing devices or a distributed network of computers. In some examples, server system 110 can employ various virtual devices and/or services of third-party service providers (e.g., third-party cloud service providers) to provide the underlying computing resources and/or infrastructure resources of server system 110.

Although the functionality of the virtual assistant is shown in FIG. 1 as including both a client-side portion and a server-side portion, in some examples, the functions of the assistant can be implemented as a standalone application installed on a user device. In addition, the division of functionalities between the client and server portions of the virtual assistant can vary in different examples. For instance, in some examples, the client executed on user device 102 can be a thin-client that provides only user-facing input and output processing functions, and delegates all other functionalities of the virtual assistant to a backend server.

User Device

Figure 2:
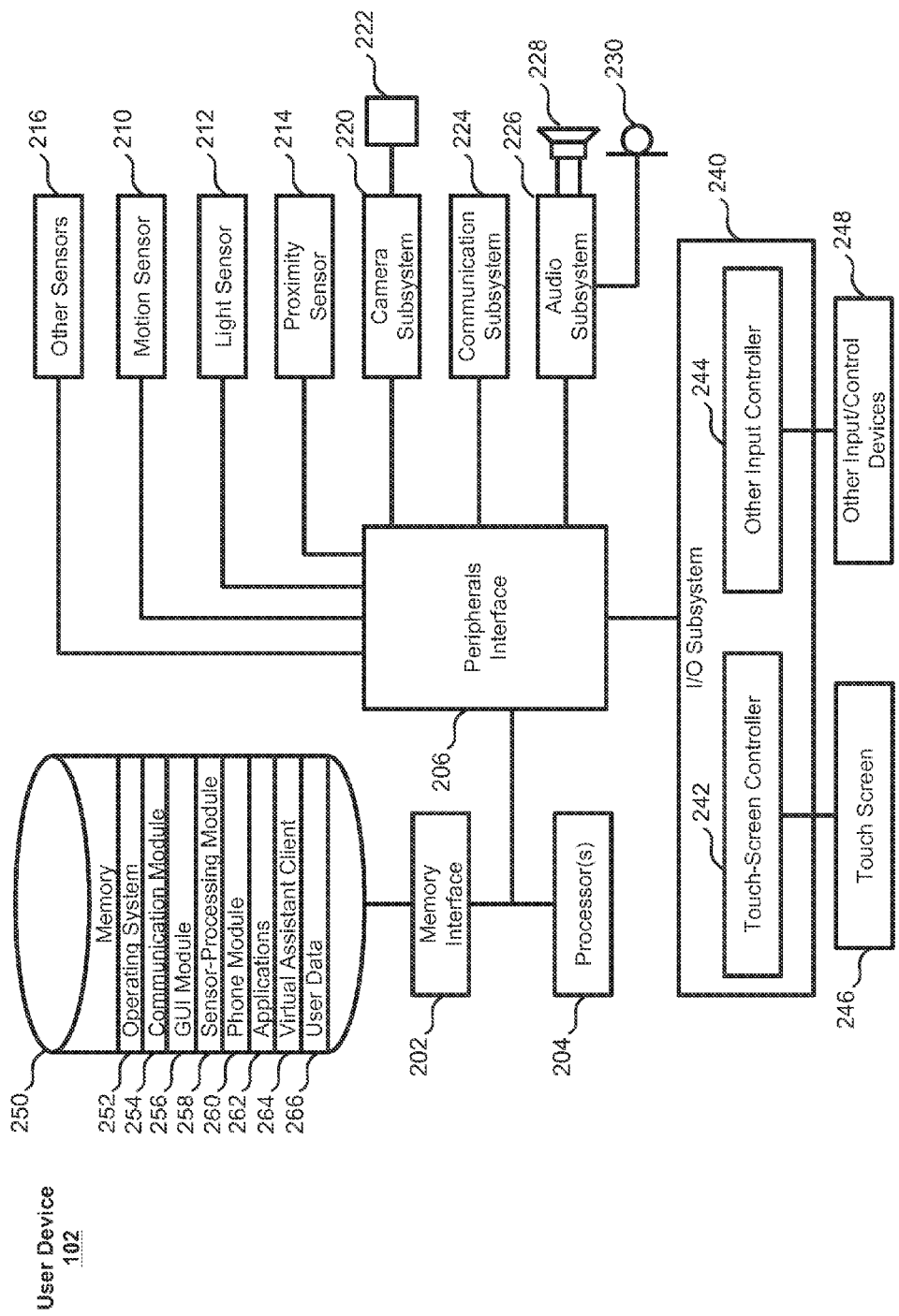
FIG. 2 illustrates an exemplary user device according to various examples.

FIG. 2 is a block diagram of a user device 102 according to various examples. As shown, user device 102 can include a memory interface 202, one or more processors 204, and a peripherals interface 206. The various components in user device 102 can be coupled together by one or more communication buses or signal lines. User device 102 can further include various sensors, subsystems, and peripheral devices that are coupled to the peripherals interface 206. The sensors, subsystems, and peripheral devices gather information and/or facilitate various functionalities of user device 102.

For example, user device 102 can include a motion sensor 210, a light sensor 212, and a proximity sensor 214 coupled to peripherals interface 206 to facilitate orientation, light, and proximity sensing functions. One or more other sensors 216, such as a positioning system (e.g., a GPS receiver), a temperature sensor, a biometric sensor, a gyroscope, a compass, an accelerometer, and the like, are also connected to peripherals interface 206, to facilitate related functionalities.

In some examples, a camera subsystem 220 and an optical sensor 222 can be utilized to facilitate camera functions, such as taking photographs and recording video clips. Communication functions can be facilitated through one or more wired and/or wireless communication subsystems 224, which can include various communication ports, radio frequency receivers and transmitters, and/or optical (e.g., infrared) receivers and transmitters. An audio subsystem 226 can be coupled to speakers 228 and a microphone 230 to facilitate voice-enabled functions, such as voice recognition, voice replication, digital recording, and telephony functions.

In some examples, user device 102 can further include an I/O subsystem 240 coupled to peripherals interface 206. I/O subsystem 240 can include a touch screen controller 242 and/or other input controller(s) 244. Touch-screen controller 242 can be coupled to a touch screen 246. Touch screen 246 and the touch screen controller 242 can, for example, detect contact and movement or break thereof using any of a plurality of touch sensitivity technologies, such as capacitive, resistive, infrared, and surface acoustic wave technologies, proximity sensor arrays, and the like. Other input controller(s) 244 can be coupled to other input/control devices 248, such as one or more buttons, rocker switches, a thumb-wheel, an infrared port, a USB port, and/or a pointer device such as a stylus.

In some examples, user device 102 can further include a memory interface 202 coupled to memory 250. Memory 250 can include any electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like. In some examples, a non-transitory computer-readable storage medium of memory 250 can be used to store instructions (e.g., for performing some or all of process 500, described below) for use by or in connection with an instruction execution system, apparatus, or device, such as a computer-based system, processor-containing system, or other system that can fetch the instructions from the instruction execution system, apparatus, or device, and execute the instructions. In other examples, the instructions (e.g., for performing process 500, described below) can be stored on a non-transitory computer-readable storage medium of server system 110, or can be divided between the non-transitory computer-readable storage medium of memory 250 and the non-transitory computer-readable storage medium of server system 110. In the context of this document, a "non-transitory computer readable storage medium" can be any medium that can contain or store the program for use by or in connection with the instruction execution system, apparatus, or device.

In some examples, the memory 250 can store an operating system 252, a communication module 254, a graphical user interface module 256, a sensor processing module 258, a phone module 260, and applications 262. Operating system 252 can include instructions for handling basic system services and for performing hardware-dependent tasks. Communication module 254 can facilitate communicating with one or more additional devices, one or more computers, and/or one or more servers. Graphical user interface module 256 can facilitate graphic user interface processing. Sensor processing module 258 can facilitate sensor-related processing and functions. Phone module 260 can facilitate phone-related processes and functions. Application module 262 can facilitate various functionalities of user applications, such as electronic messaging, web browsing, media processing, navigation, imaging, and/or other processes and functions.

As described herein, memory 250 can also store client-side virtual assistant instructions (e.g., in a virtual assistant client module 264) and various user data 266 (e.g., user-specific vocabulary data, preference data, and/or other data, such as the user's electronic address book, to-do lists, shopping lists, etc.) to provide the client-side functionalities of the virtual assistant.

In various examples, virtual assistant client module 264 can be capable of accepting voice input (e.g., speech input), text input, touch input, and/or gestural input through various user interfaces (e.g., I/O subsystem 240, audio subsystem 226, or the like) of user device 102. Virtual assistant client module 264 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, virtual assistant client module 264 can communicate with the virtual assistant server using communication subsystem 224.

In some examples, virtual assistant client module 264 can utilize the various sensors, subsystems, and peripheral devices to gather additional information from the surrounding environment of user device 102 to establish a context associated with a user, the current user interaction, and/or the current user input. In some examples, virtual assistant client module 264 can provide the contextual information or a subset thereof with the user input to the virtual assistant server to help infer the user's intent. The virtual assistant can also use the contextual information to determine how to prepare and deliver outputs to the user.

In some examples, the contextual information that accompanies the user input can include sensor information, such as lighting, ambient noise, ambient temperature, images or videos of the surrounding environment, distance to another object, and the like. The contextual information can further include information associated with the physical state of user device 102 (e.g., device orientation, device location, device temperature, power level, speed, acceleration, motion patterns, cellular signal strength, etc.) or the software state of user device 102 (e.g., running processes, installed programs, past and present network activities, background services, error logs, resources usage, etc.). Any of these types of contextual information can be provided to the virtual assistant server 114 as contextual information associated with a user input.

In some examples, virtual assistant client module 264 can selectively provide information (e.g., user data 266) stored on user device 102 in response to requests from the virtual assistant server 114. Virtual assistant client module 264 can also elicit additional input from the user via a natural language dialogue or other user interfaces upon request by virtual assistant server 114. Virtual assistant client module 264 can pass the additional input to virtual assistant server 114 to help virtual assistant server 114 in intent inference and/or fulfillment of the user's intent expressed in the user request.

In various examples, memory 250 can include additional instructions or fewer instructions. Furthermore, various functions of user device 102 can be implemented in hardware and/or in firmware, including in one or more signal processing and/or application-specific integrated circuits.

Output Dialog Encoding

Figure 3:
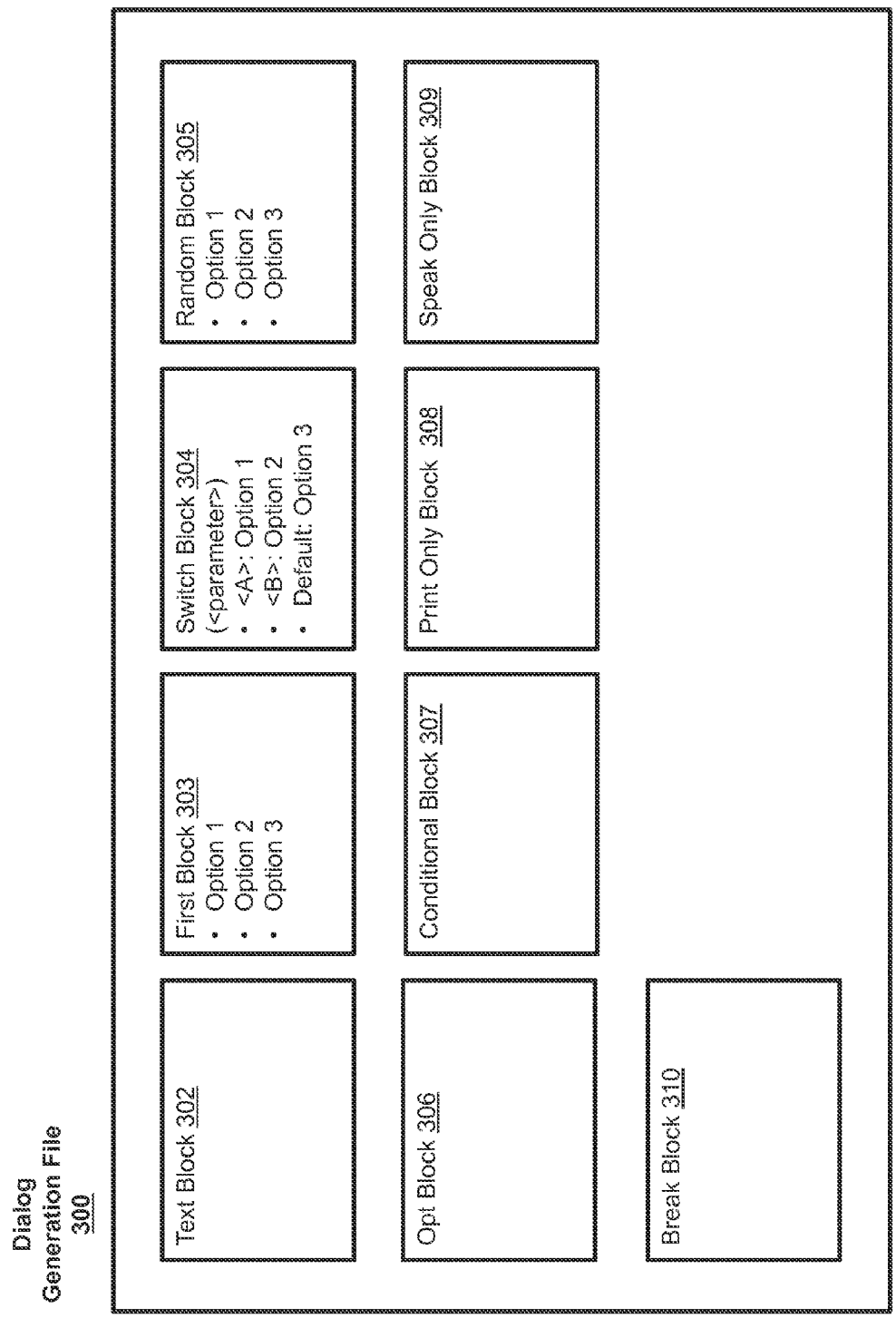
FIG. 3 illustrates a visual representation of an example dialog generation file that can be used to generate an output dialog of a virtual assistant according to various examples.

As mentioned above, system 100 can be used to implement a virtual assistant capable of interpreting natural language input in spoken and/or textual form to infer user intent, and performing actions based on the inferred user intent. In some examples, the performed actions can include generating and outputting an output dialog in text and/or audio form. For example, in response to the query "What is the temperature in New York?", a virtual assistant implemented on a user device can display the text "The temperature in New York is 72° F." In order for the virtual assistant to produce this output dialog in natural language form, instructions that define the contents and format of the dialog can be provided to the virtual assistant. FIG. 3 shows a visual representation of a dialog generation file 300 that can be used to provide a virtual assistant with such information.

Generally, dialog generation file 300 can be used to generate an output dialog (e.g., "Good morning, John.") by defining multiple output segments that represent a portion of the output dialog (e.g., a first output segment "Good morning," and a second output segment "John."). Dialog generation file 300 can further define the possible outputs that can be used in each output segment (e.g., "Good morning," "Good afternoon," or "Good evening," for the first output segment), how to select one of the possible output segments, and how to format the output segments to generate the output dialog. As discussed in greater detail below, dialog generation file 300 can define these parameters for generating the output dialog using various types of functional blocks 302-310 arranged hierarchically and/or in a particular order to generate a desired output dialog.

As shown in FIG. 3, dialog generation file 300 can include multiple types of functional blocks 302-310 that can output or return an output segment of text. An output segment of text can include a string of one or more characters or words and can be ordered amongst the other output segments of text based on an ordering of the functional blocks within dialog generation file 300. In some examples, the output dialog can be generated by concatenating the output segments of text based on the order of the output segments. For example, if dialog generation file 300 includes random block 305 outputting the output segment of text "Hi," followed by text block 302 outputting the output segment of text "how are you doing?", the output dialog generated from dialog generation file 300 can include the text "Hi, how are you doing?".

Dialog generation file 300 can include any number of and type of functional blocks. In some examples, the functional blocks can be arranged in a hierarchy such that one functional block (e.g., the child functional block) is included within another functional block (e.g., the parent functional block). In these examples, the output segment of text output by the child functional block can be returned as an input to the parent functional block and used by the parent functional block in a manner that depends on a type of the parent functional block (e.g., a type corresponding to blocks 302-310, described below). In some examples, a functional block can include any number of other functional blocks. Additionally, the hierarchy formed by the nested functional blocks can include any number of levels. For example, a first functional block can be included within a second functional block, which can be included within a third functional block, and so on.

One type of functional block that can be included in dialog generation file 300 is text block 302. Text block 302 can be configured to include desired text represented as a predetermined string of characters or words, such as "Good morning," and/or a variable representing a number or a string of characters or words, such as <name> having a value of "John." The formatting of the predetermined string of characters or words with a variable (e.g., "Good morning,"<name>) can be referred to as a "template." When executed, text block 302 can be configured to output the included text as an output segment of text. For example, a text block 302 that includes the text "Okay, here are your search results:" can output that text as an output segment of text when executed.

Dialog generation file 300 can further include first block 303, which can be configured to include an ordered list of one or more options (e.g., Option 1, Option 2, and Option 3). Each option can include one or more of the functional blocks shown in FIG. 3. When executed, first block 303 can select the first option (Option 1) from the ordered list and can call the functional block associated with that option. First block 303 can then output the text received from the called functional block (e.g., the output segment produced by the called functional block) as an output segment of text. If the selection of the first option is successful (e.g., successfully calls another functional block), the operation of first block 303 can end. However, if the selection of the first option fails, first block 303 can then attempt to select the next option from the ordered list (Option 2). This process can repeat for all options in the ordered list until an option is successfully selected. In the event that no option is successfully selected, first block 303 can return an error. While first block 303 is shown having three options, it should be appreciated that first block 303 can include any number of options.

To illustrate the operation of first block 303, Option 1 of first block 303 can include a text block 302 that includes the text "Hello," Option 2 of first block 303 can include a text block 302 that includes the text "Hi," and Option 3 of first block 303 can include switch block 304 (described below). Upon execution, first block 303 can first attempt to call the first text block 302 and output the text "Hello" returned by the first text block 302 as an output segment of text. If successful, the operation of block 303 can end. However, if unable to output the text "Hello" as an output segment of text for any reason, first block 303 can then attempt to call the second text block 302 and output the text "Hi" returned by the second text block 302 as an output segment of text. If successful, the operation of block 303 can end. However, if unable to output the text "Hi" as an output segment of text for any reason, first block 303 can then attempt to call switch block 304. If switch block 304 is successfully executed and returns a text output, first block 303 can output the text returned from switch block 304 as an output segment of text and the operation of block 303 can end. However, if unable to successfully call switch block 304 for any reason, first block 303 can return an error because it reached the end of its ordered list without successfully selecting one of the three options.

Dialog generation file 300 can further include switch block 304, which can be configured to include an input parameter (e.g., <parameter>) and a list of one or more choices (e.g., Option 1, Option 2, and Option 3) that are associated with potential values of the input parameter (e.g., <A> and <B>) or a default condition (e.g., Default). Each option can include one of the functional blocks shown in FIG. 3. When executed, switch block 304 can select one of the options based on the value of the input parameter matching an associated value of one of the options and can call the functional block associated with that option. Switch block 304 can then output the text received from the called functional block (e.g., the output segment produced by the called functional block) as an output segment of text. For example, switch block 304 can select Option 1 if the value of <parameter> is equal to the value of <A>, can select Option 2 if the value of <parameter> is equal to the value of <B>, and can select Option 3 if the value of <parameter> is not equal to the values of <A> or <B>. While switch block 304 is shown as having three options, it should be appreciated that switch block 304 can include any number of options.

In some examples, <parameter> can include any desired variable representing information that is to be presented to the user (e.g., search query results, etc.) or contextual information, such as sensor information, information associated with the physical state of a user device, information associated with a software state of the user device, or the like. For example, the contextual information can include a type of user device used to operate the virtual assistant, an operational state of the user device, a current time, a location of the user device, an orientation of the user device, or an orientation of a user with respect to the user device.

To illustrate the operation of switch block 304, <parameter> of switch block 304 can represent a number of results generated from a search query, <A> can represent the value 0, Option 1 of switch block 304 can include a text block 302 that includes the text "Your search produced no results,"<B> can represent the value 1, Option 2 of switch block 304 can include a text block 302 that includes the text "Your search produced 1 result," and Option 3 of switch block 304 can include a text block 302 that includes the text "Your search produced multiple results." In this example, switch block 304 can call the first text block 302 and output the text "Your search produced no results" returned by the first text block 302 as an output segment of text if the number of results generated from the search query is 0 (<parameter>==0), can call the second text block 302 and output the text "Your search produced 1 result" returned by the second text block 302 as an output segment of text if the number of results generated from the search query is 1 (<parameter>==1), and can call the third text block 302 and output the text "Your search produced no results" returned by the third text block 302 as an output segment of text if the number of results generated from the search query is not equal to 0 or 1 (<parameter>!=0 && <parameter>!=1).

Dialog generation file 300 can further include random block 305, which can be configured to include a list of one or more options (e.g., Option 1, Option 2, and Option 3). Each option can include one of the functional blocks shown in FIG. 3. When executed, random block 305 can randomly select one of the options from its list and can call the functional block associated with that option. Random block 305 can then output text received from the called functional block (e.g., the output segment produced by the called functional block) as an output segment of text. If the selection of the randomly selected block is successful (e.g., successfully calls another functional block), the operation of random block 305 can end. However, if the selection of the randomly selected block fails, random block 305 can randomly select another option from the list that was not previously selected. This process can repeat until an option is successfully selected. In the event that no option is successfully selected and there are no options remaining in the list that were not previously selected, random block 305 can return an error. While random block 305 is shown having three options, it should be appreciated that random block 305 can include any number of options.

In some examples, the options of random block 305 can be assigned a weighting factor that can be used by random block 305 to increase or decrease the probability that a particular option is selected. In the absence of assigned weighting factors, the probability of selecting each option can be the same (e.g., equal weighting factors for all options).

To illustrate the operation of random block 305, Option 1 of random block 305 can include a text block 302 that includes the text "Hello," Option 2 of random block 305 can include a text block 302 that includes the text "Hi," and Option 3 of random block 305 can include switch block 304. Upon execution, random block 305 can randomly select one of the options (e.g., Option 2) and attempt to call the second text block 302 and output the text "Hi" returned by the second text block 302 as an output segment of text. If successful, the operation of random block 305 can end. However, if unable to output the text "Hi" as an output segment of text for any reason, random block 305 can then randomly select another option from the list that was not previously selected (e.g., select from Option 1 and Option 3). If the random selection results in a selection of Option 1, random block 305 can attempt to call the first text block 302 and output the text "Hello" returned by the first text block 302 as an output segment of text. If successful, the operation of random block 305 can end. However, if unable to output the text "Hello" as an output segment of text for any reason, random block 305 can then randomly select another option from the list that was not previously selected (e.g., select from Option 3). Since Option 3 is the only remaining option that was not previously selected, random block 305 can select Option 3 and attempt to call switch block 304. If switch block 304 is successfully executed and returns a text output, random block 305 can output the text returned from switch block 304 as an output segment of text and the operation of random block 305 can end. However, if unable to successfully call switch block 304 for any reason, random block 305 can return an error because no options were successfully selected and no options remain in the list that were not previously selected.

Dialog generation file 300 can further include opt block 306, which is an optional block that can be used to ignore any failures returned by one of its included functional blocks, such as first block 303 and random block 305. Opt block 306 can include one or more of the functional blocks shown in FIG. 3. When executed, opt block 306 can call the functional blocks contained therein and can output text received from the called functional blocks as an output segment of text. If a functional block included within opt block 306 returns an error (e.g., first block 303 or random block 305 runs out of options), opt block 306 can ignore that error to prevent the error from stopping the generation of the output dialog.

To illustrate the operation of opt block 306, opt block 306 can include first block 303, which can include Option 1 having a text block 302 that includes the text "Hello," Option 2 having a text block 302 that includes the text "Hi," and Option 3 having a text block 302 that includes the text "Greetings." Upon execution, opt block 306 can call first block 303, which can first attempt to call the first text block 302 and output the text "Hello" returned by the first text block 302 as an output segment of text. If successful, first block 303 can return the text "Hello" to opt block 306, which can then output the text "Hello" as an output segment of text. However, if unable to output the text "Hello" as an output segment of text for any reason, first block 303 can then attempt to call the second text block 302 and output the text "Hi" returned by the second text block 302 as an output segment of text. If successful, first block 303 can return the text "Hi" to opt block 306, which can then output the text "Hi" as an output segment of text. However, if unable to output the text "Hi" as an output segment of text for any reason, first block 303 can then attempt to call the third text block 302 and output the text "Greetings" returned by the third text block 302 as an output segment of text. If successful, first block 303 can return the text "Greetings" to opt block 306, which can then output the text "Greetings" as an output segment of text. However, if unable to output the text "Greetings" as an output segment of text for any reason, first block 303 can return an error to opt block 306 because it reached the end of its ordered list without successfully selecting one of the three options. Opt block 306 can ignore the error and the operation of opt block 306 can end without outputting or returning an output segment of text.

Dialog generation file 300 can further include conditional block 307, which is a functional block that can include one or more of the functional blocks shown in FIG. 3 and can be executed only when a conditional statement associated with conditional block 307 is satisfied. For example, conditional block 307 can be associated with the conditional if-statement (if A==B). In this example, conditional block 307 can only be executed if A is equal to B. If A is not equal to B, conditional block 307 (and any functional blocks included within conditional block 307) may not be executed. When executed, conditional block 307 can call the functional blocks contained therein and can output text received from the called functional blocks as an output segment of text.

In some examples, the conditional statement associated with conditional block 307 can be based on information that is to be presented to the user (e.g., search query results, etc.) or contextual information, such as sensor information, information associated with the physical state of a user device, information associated with a software state of the user device, or the like. For example, the contextual information can include a type of user device used to operate the virtual assistant, an operational state of the user device, a current time, a location of the user device, an orientation of the user device, or an orientation of a user with respect to the user device.

To illustrate the operation of conditional block 307, conditional block 307 can be associated with the if-statement (if name==available) and can include a text block 302 that includes the text <name>. In this example, if the user's name is available, then conditional block 307 can be executed and can call text block 302 and output the value of <name> returned by text block 302 as an output segment of text. Alternatively, if the user's name is not available, then conditional block 307 may not be executed and no output segment of text may be generated by conditional block 307.

Typically, any output segment of text generated by text block 302, first block 303, switch block 304, random block 305, opt block 306, and conditional block 307 can be identified as being both a spoken output and a printed output (e.g., the text can be presented to the user in both audio and visual format by a user device). To cause the string of words or characters in an output segment to be only printed (e.g., only displayed to the user), dialog generation file 300 can include print only block 308. Print only block 308 can include one or more of the functional blocks shown in FIG. 3. When executed, print only block 308 can call the functional blocks contained therein and can output text returned from the called functional blocks as an output segment of text. However, unlike the other functional blocks of FIG. 3, print only block 308 can identify its output segment of text as being text that should only be printed (e.g., displayed) when presented to the user.

To illustrate the operation of print only block 308, print only block 308 can include a text block 302 that includes the text "Good afternoon." In this example, print only block 308 can call text block 302 and output the text "Good afternoon" returned by text block 302 as an output segment of text that is identified as being only a printed output.

Similarly, to cause the string of words or characters in an output segment to be only spoken (e.g., only audibly read to the user), dialog generation file 300 can include speak only block 309. Speak only block 309 can include one or more of the functional blocks shown in FIG. 3. When executed, speak only block 309 can call the functional blocks contained therein and can output text returned from the called functional blocks as an output segment of text. However, unlike the other functional blocks of FIG. 3, speak only block 309 can identify its output segment of text as being text that should only be spoken (e.g., audibly presented) when presented to the user.

To illustrate the operation of speak only block 309, speak only block 300 can include a text block 302 that includes the text "Good afternoon." In this example, speak only block 309 can call text block 302 and output the text "Good afternoon" returned by text block 302 as an output segment of text that is identified as being only a spoken output.

Dialog generation file 300 can further include break block 310, which represents a break function that indicates a separation in the formatting of the output dialog. For example, if the output dialog is intended to be displayed within a speech bubble, the break function of break block 310 can indicate that a new speech bubble should be created for the output segments of text following the break.

Since a dialog generation file 300 can be used to generate an output dialog for conveying a particular type of information or message to a user, multiple different dialog generation files 300 can be created to generate output dialogs that are appropriate for a variety of situations. Additionally, since dialog generation file 300 can be language-specific, a different dialog generation file 300 can be created for each language in which an output dialog is to be created.

While dialog generation file 300 is shown and described above as having functional blocks performing various functions, it should be appreciated that dialog generation file 300 can be implemented using any desired programming language. In some examples, a markup-based language, such as XML, can be used.

Figure 4:
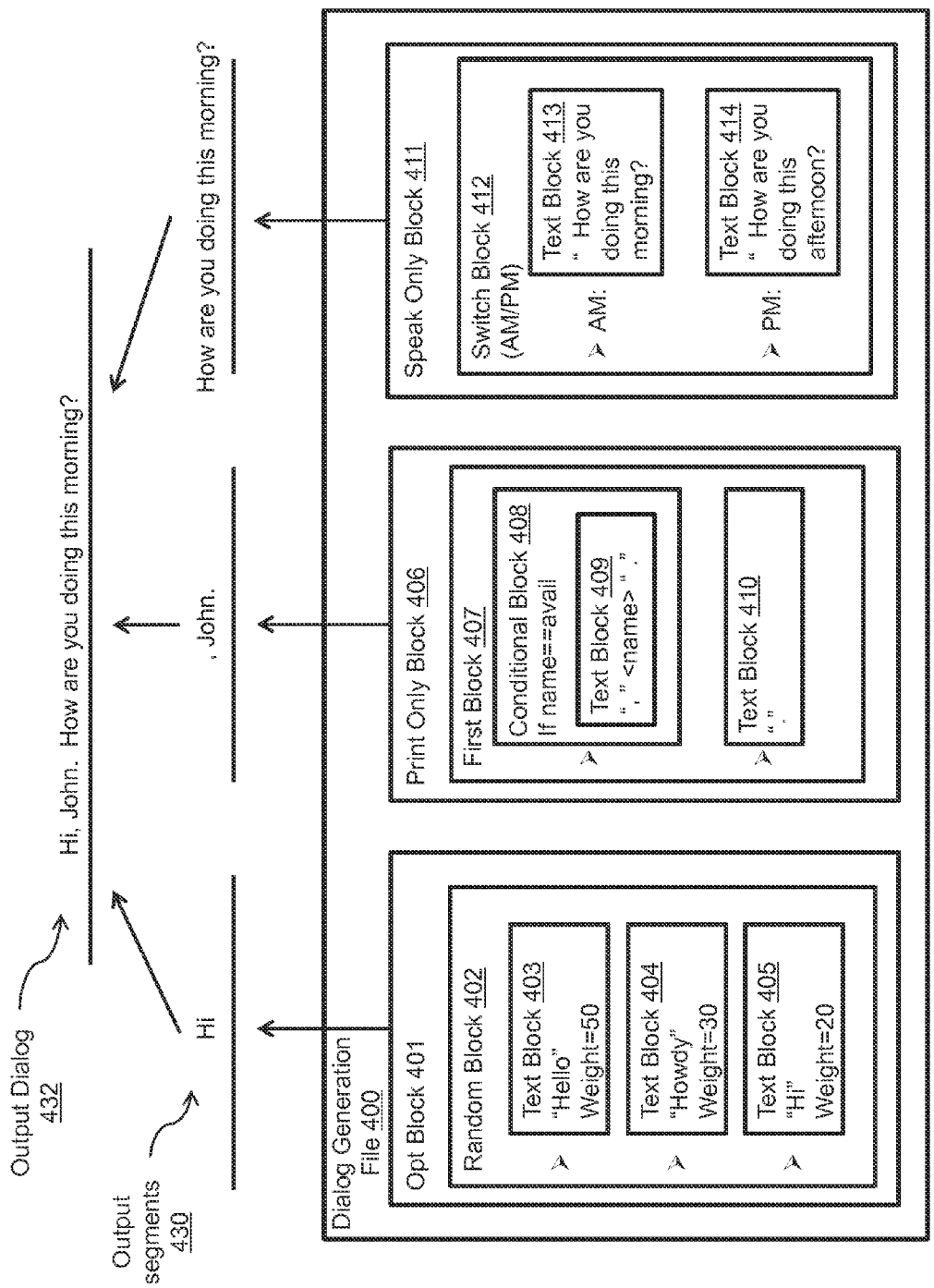
FIG. 4 illustrates a visual representation of an example output generation file and the output dialog that can be generated using the output generation file.

FIG. 4 illustrates a visual representation of an example dialog generation file 400 that can be used to generate output dialog 432 using the functional blocks 302-310 shown in FIG. 3. As shown in FIG. 4, dialog generation file 400 includes hierarchically structured functional blocks 401-414. The functional blocks are arranged in order from left to right, and functional blocks contained within other functional blocks represent functional blocks that are child functional blocks to the enclosing parent functional blocks. Additionally, functional blocks 401-414 having names matching those of the functional blocks shown in FIG. 3 can represent instances of those functional blocks.

When a call is made to dialog generation file 400 to create output dialog 432, the first block in the highest level of the hierarchy (opt block 401) can be executed. When executed, opt block 401 can call random block 402 contained therein. Random block 402 can then randomly select one of text block 403, 404, and 405 based on their associated weighting factors (e.g., weighting factors 50, 30, and 20). For example, text block 403 can have a 50% chance of being selected, text block 404 can have a 30% chance of being selected, and text block 405 can have a 20% chance of being selected. Once random block 402 randomly selects one of the text blocks, a call can be made to the selected text block. For example, if text block 405 is selected, text block 405 can be called. In response, text block 405 can return the text "Hi" to random block 402. Random block 402 can then return the text "Hi" to opt block 401. Opt block 401 can then output the text "Hi" as an output segment of text. Since opt block 401 is a functional block at the highest level of the functional block hierarchy, the output segment of text generated by opt block 401 can represent an output segment 430 of dialog generation file 400.

In some examples, the weighted random function performed by random block 402 can consider weights (some of which can be defaults) of all blocks within the random block to determine the random selection. For example, if random block 402 includes three elements having weights 2, 5, and 42, then the elements can have a probability of being selected of 2/49, 5/49, and 42/49, respectively.

Upon completion of opt block 401, execution can proceed to the next functional block in the highest level of the hierarchy (print only block 406). When executed, print only block 406 can call first block 407 contained therein. First block 407 can then select and call the functional block associated with its first option (conditional block 408). If successful, first block 407 can return the text received from conditional block 408 to print only block 406. However, if the selection of conditional block 408 fails (e.g., if the variable <user> is not available), the first block 407 can attempt to call text block 410 and output the text received from text block 410 to print only block 407. For example, if the variable <name> (representing the value "John") is available, conditional block 408 can call text block 409. Text block 409 can return the text ", John." to conditional block 408, which can then return the text ", John." to print only block 406. Print only block 406 can then output the text ", John." as an output segment of text that is identified as being a print only output. Since print only block 406 is a functional block at the highest level of the functional block hierarchy, the output segment of text generated by print only block 406 can represent an output segment 430 of dialog generation file 400.

Upon completion of print block 406, execution can proceed to the next functional block in the highest level of the hierarchy (speak only block 411). When executed, speak only block 411 can call switch block 412 contained therein. Switch block 412 can then select and call the functional block associated with one of its two options based on the value of the variable <AM/PM>. Switch block 412 can then return the text received from the called functional block to speak only block 411. For example, if the variable <AM/PM> represents the value "AM," switch block 412 can call text block 413. Text block 413 can return the text "How are you doing this morning" to switch block 412, which can then return the text "How are you doing this morning" to speak only block 411. Speak only block 411 can then output the text "How are you doing this morning" as an output segment of text that is identified as being a speak only output. Since speak only block 411 is a functional block at the highest level of the functional block hierarchy, the output segment of text generated by speak only block 411 can represent an output segment 430 of dialog generation file 400.

Upon completion of all of the functional blocks at the highest level of the hierarchy, an output dialog 432 can be generated based on the output segments 430 of the dialog generation file 400. The output segments 430 can have an associated ordering based on the order of the functional blocks (that generated them) within dialog generation file 400. For example, the output segment containing "Hi" output by opt block 401 can be first, the output segment containing ", John." output by print only block 406 can be second, and the output segment containing "How are you doing this morning?" output by speak only block 411 can be third. Output dialog 432 can be generated by concatenating output segments 430 in order from the first output segment to the last. Thus, output dialog 432 can include "Hi, John. How are you doing this morning?". When presented to the user, the words "Hi, John" can be displayed to the user. The words "Hi. How are you doing this morning?" can be spoken to the user.

As illustrated by the example shown in FIG. 4, the output segments 430 used to create output dialog 432 can be created independent of each other. For example, the generation of one output segment may not depend on the generation of another segment. In other examples, one output segment 430 can be generated using a conditional statement that depends on the generation of another output segment 430.

Output Dialog Generation

Figure 5:
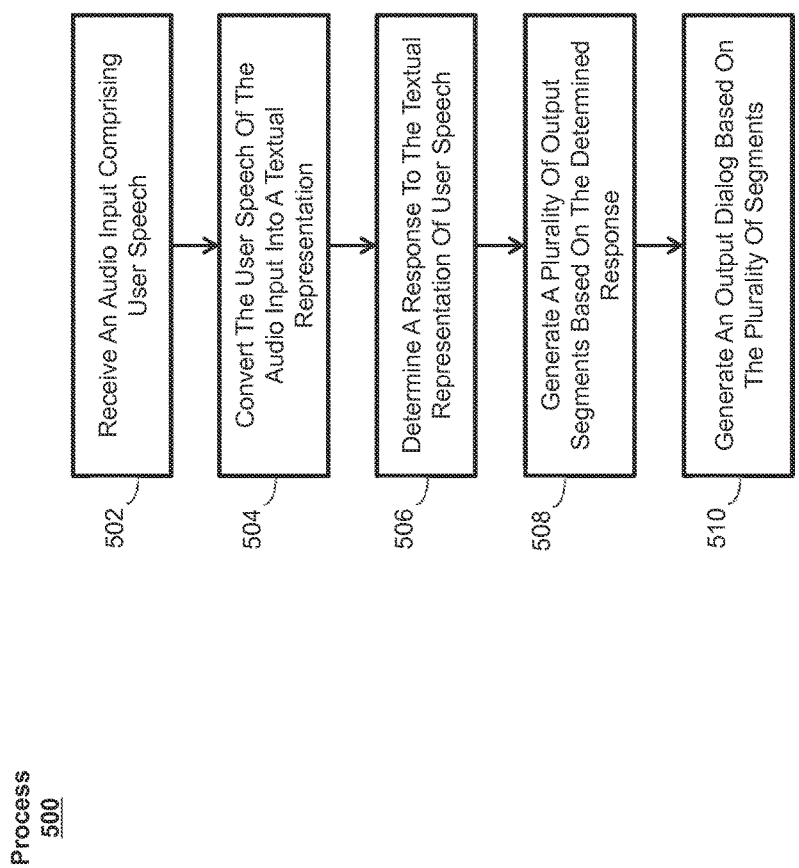
FIG. 5 illustrates an exemplary process for generating an output dialog for a virtual assistant according to various examples.

FIG. 5 illustrates an exemplary process 500 that can be performed to generate an output dialog. In some examples, process 500 can be performed using a system similar or identical to system 100, shown in FIG. 1.

At block 502, an audio input including user speech can be received at a user device. In some examples, a user device (e.g., user device 102) can receive audio input that includes a user's speech via a microphone (e.g., microphone 230). The microphone can convert the audio input into an analog or digital representation, and provide the audio data to one or more processors (e.g., processor(s) 204). In some examples, the user device can transmit data representing the audio input to one or more servers, such as server system 110.

At block 504, the user speech of the audio input can be converted into a textual representation of the user speech. The user speech can be converted using any known speech-to-text conversion process. In some examples, the user speech can be converted into the textual representation locally on the user device 102. In other examples where the user device transmits data representing the audio input to one or more servers for processing, the one or more servers can receive the data representing the audio input and can instead perform the speech-to-text conversion process.

At block 506, the textual representation of user speech generated at block 504 can be received or accessed, and a response to the textual representation can be determined. The response can include information that is to be provided to the user in response to the textual representation of user speech. For example, a response to a search query can include information relating to the search query results (e.g., number of results, the actual results, etc.). The response can further include an identification of a dialog generation file that is to be used to format the output dialog to convey some or all of the information of the response to the user.

In some examples, determining the response to the textual representation can include determining a user intent based on the textual representation of user speech. As discussed in greater detail in Applicants' U.S. Utility application Ser. No. 12/987,982 for "Intelligent Automated Assistant," filed Jan. 10, 2011, determining user intent can include analyzing, by processing modules 118, the textual representation of user speech to identify a set of syntactic or semantic parse results. The syntactic parse results can include parse results that associate data in the user input with structures that represent syntactic parts of speech, clauses, and phrases including multiword names, sentence structure, and/or other grammatical graph structures. The semantic parse results can include parse results that associate data in the user input with structures that represent concepts, relationships, properties, entities, quantities, propositions, and/or other representations of meaning and user intent. Determining user intent can further include disambiguating among alternative syntactic or semantic parse results based on the contextual representation of user speech, other user input, and/or contextual information.

Determining the response to the textual representation of user speech can further include identifying a task flow based on the determined user intent and executing the identified task flow. The task flow can include a set of steps and associated parameters to accomplish the determined user intent. In some examples, the task flow can include the step of selecting an appropriate dialog generation file for outputting the results of the task flow to the user. The dialog generation file can be selected based on the type of information that is to be provided to the user, the user's native language, other contextual information, and the like. The steps of the task flow can be executed by invoking programs, methods, services, APIs, or the like.

At block 508, a plurality of output segments can be generated based on the response determined at block 506.

The output segments can include a string of one or more characters or words that can be used to generate the output dialog presented to the user. In some examples, one or more of the output segments can be generated by selecting one output from multiple possible outputs. Each output can include a string of one or more characters or words and/or a variable. For example, a first possible output for an output segment can include "Hello," a second possible output for the output segment can include "Hi," and a third possible output for the output segment can include "Hi,"<user>, where <user> is a variable representing the user's name. Thus, generating the output segment can include selecting one of the three possible outputs and using the selected output as the output segment.

In some examples, the dialog generation file selected at block 506 can be used to generate the plurality of output segments. The type, content, and ordering of the functional blocks within the dialog generation file can define the possible outputs for each output segment, an ordering of the output segments within the output dialog, and format for the output dialog to be displayed or otherwise presented to a user and it can be used to generate the output dialog. As discussed above with respect to FIGS. 3-4, the functional blocks at the highest level of the hierarchy in the dialog generation file (and their child functional blocks) can be executed based on their respective ordering in the file to generate the plurality of output segments.

In some examples, an output segment can be generated based on a random block of the dialog generation file to randomly select an output from multiple outputs as discussed above with respect to FIGS. 3-4. The multiple outputs can be uniformly or non-uniformly weighted using weighting factors associated with the outputs. In other examples, an output segment can also be generated based on a first block of the dialog generation file to select an output from multiple outputs based on a predetermined order of the multiple outputs as discussed above with respect to FIGS. 3-4. In yet other examples, an output segment can be generated based on a switch block of the dialog generation file to select an output from multiple outputs based on a value of an input parameter as discussed above with respect to FIGS. 3-4.

In some examples, some or all of the possible outputs for an output segment can be associated with a conditional statement of a conditional block and the output can be selected from the plurality of possible outputs based on whether or not the condition is satisfied as discussed above with respect to FIGS. 3-4. The conditional statement can depend on the information to be provided to the user determined at block 506 and/or contextual information, such as sensor information, information associated with the physical state of a user device, information associated with a software state of the user device, or the like. For example, the contextual information can include a type of user device used to operate the virtual assistant, an operational state of the user device, a current time, a location of the user device, an orientation of the user device, or an orientation of a user with respect to the user device.

In some examples, the functional blocks of the dialog generation file can further define a format for outputting the plurality of output segments to an output dialog. For example, an output segment generated from a print only block can be tagged as being an output segment that should only be displayed to a user. An output segment generated from a speak only block can be tagged as being an output segment that should only be audibly spoken to a user. Additionally, a break block can indicate that an audio and/or visual break should be included between the output segment generated from the previous functional block and the output segment generated from the subsequent output block.

In some examples, the output segments can be created independent of each other. For example, the generation of one output segment may not depend on the generation of another segment. In other examples, one output segment can be generated using a conditional statement that depends on the generation of another output segment, or a condition can be placed on a functional block included within a random block.

At block 510, an output dialog can be generated based on the plurality of segments. In some examples, generating the output dialog can include concatenating the plurality of output segments based on an order of the output segments. For example, if a first output segment includes "Hi," a second output segment includes ","<user>, and a third output segment includes ". How are you doing today?", generating the output dialog based on these three output segments can include concatenating them based on their order (e.g., first, second, and third) to produce the output dialog "Hi, John. How are you doing today?".

In some examples, as mentioned above, the output segments can be identified as being only a spoken output, only a printed output, or both a spoken and printed output. In these examples, generating the output dialog can include generating a spoken output dialog by concatenating the output segments identified as being only a spoken output, generating a printed output dialog by concatenating the output segments identified as being only a printed output, and generating a spoken and printed output dialog by concatenating the output segments identified as being both a printed and spoken output. Alternatively, a single output dialog can be generated and the words corresponding to the spoken only outputs can be tagged or otherwise identified as being only spoken, the words corresponding to the printed only outputs can be tagged or otherwise identified as being only printed, and the words corresponding to the printed and spoken outputs can be tagged or otherwise identified as being both spoken and printed.

In some examples, as mentioned above, process 500 can include tagging one or more words of the textual user input using synonyms or can include mapping a word, or a synonym for that word, to a single semantic value, and from that value to a grammatically appropriate synonym for textual output. In these examples, generating the output dialog at block 510 can include replacing an occurrence of a tagged word with the synonym or alternate word of the tag. For example, if the textual representation of user speech received at block 502 included "Forward the message to John", the word "message" may have been tagged with the word "email." If the plurality of output segments generated at block 508 included a first output segment "Your message has been forwarded to" and a second output segment "John", block 510 can include concatenating the first and second segments to form the output dialog, "Your message has been forwarded to John." Block 510 can further include replacing the word "message" with the word "email" based on the tag to form the output dialog, "Your email has been forwarded to John." Alternatively, the word "message" can be replaced with the word "email" in the output segment prior to concatenating the segments.

In some examples, process 500 can further include transmitting the output dialog generated at block 510 to a user device. The user device can receive the output dialog and present it to the user. In some examples, the output dialog can be displayed to the user on a display of the user device and/or presented to the user in audio form. For example, as mentioned above, the output segments can be identified as being only a spoken output, only a printed output, or both a spoken and printed output. In some examples, the output dialog can be identified as being a spoken output dialog, a printed output dialog, and a spoken and printed output dialog. The spoken output dialog can be presented to the user in audio form, but not displayed. The printed output dialog can be displayed to the user, but not presented to the user in audio form. The spoken and printed output dialog can be presented to the user in audio form and displayed to the user. In other examples, a single output dialog having words tagged or otherwise identified as being only spoken, only printed, or both spoken and printed can be received. In these examples, the words tagged or otherwise identified as being only spoken can be presented to the user in audio form, but not displayed. The words tagged or identified as being only printed can be displayed to the user, but not presented in audio form. The words tagged or identified as being both spoken and printed can be presented to the user in audio form and displayed to the user.

Figure 6:
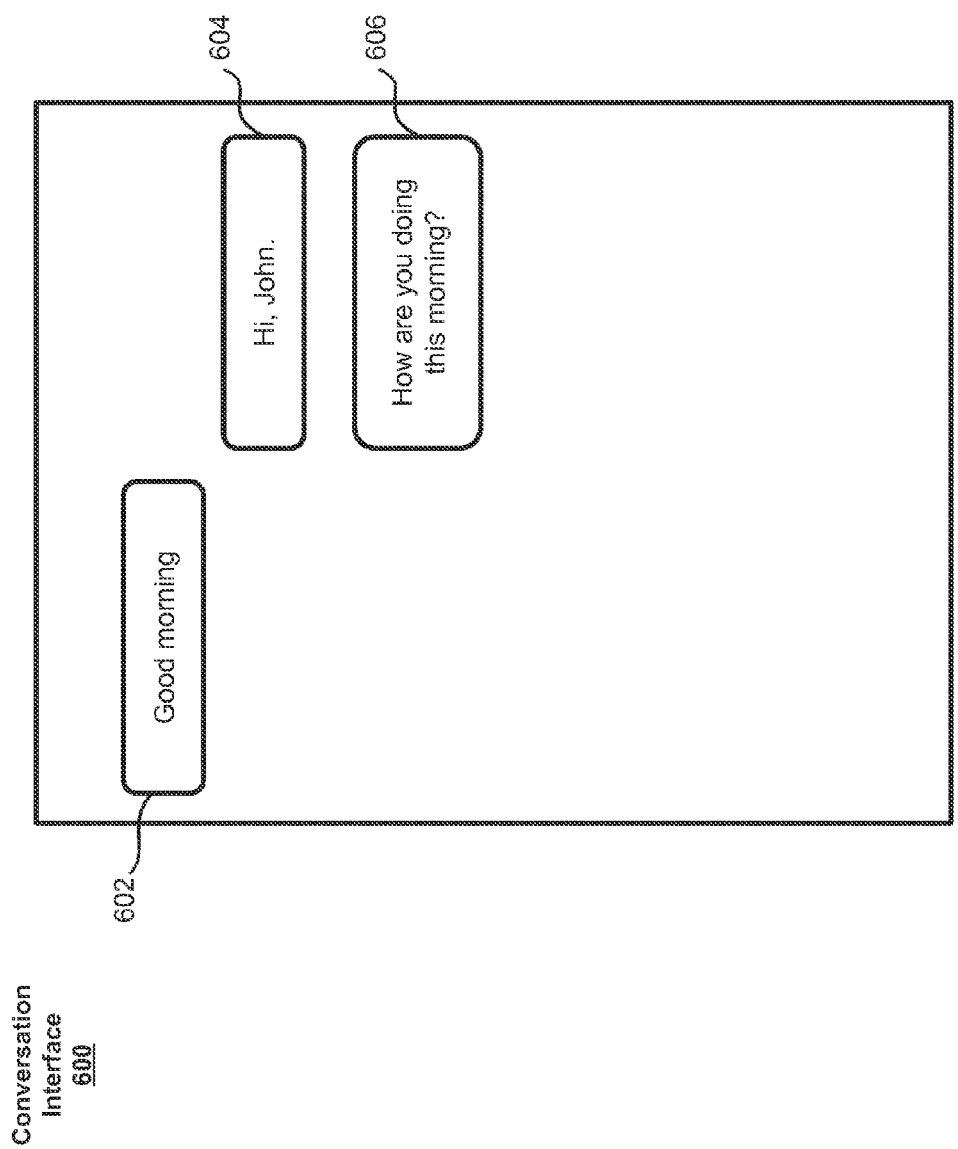
FIG. 6 illustrates an example conversation interface that can be displayed on a user device according to various examples.

In some examples, as mentioned above, the output dialog can include formatting information that details how the output dialog should be presented to the user. For example, an output dialog can include breaks that represent separations in the output dialog that should be displayed or otherwise conveyed to the user. For example, a break in an output dialog can indicate that a new speech bubble or other visual indication of a break in the output dialog should be created for the text following the break. FIG. 6 illustrates an exemplary conversation interface 600 between a user and a virtual assistant. As shown, a textual representation of a user's spoken input is represented by speech bubble 602. The virtual assistant's output dialog response is represented by speech bubbles 604 and 606. In this example, the output dialog provided to the user device can include "Hi, John."<break>"How are you doing this morning?". The <break> in the output dialog can be generated from a break block to indicate to the user device that a new speech bubble 606 should be created to display the text following the <break>. The conversation shown in conversation interface 600 can be generated from dialog generation file 400 if a break block is inserted between print only block 406 and speak only block 411.

Using process 500, an output dialog can be generated by forming and combining multiple output segments. Each output segment can be configured to be populated with one of multiple strings of characters or words to provide an output that can be dynamically generated based on the information being provided to the user and/or contextual information. Generating output dialogs in this way also obviates the need to program a virtual assistant with every candidate sentence that is to be output by the virtual assistant.

It should be appreciated that the blocks of process 500 can be performed on user device 102, server system 110, or a combination of user device 102 and server system 110. For instance, in some examples, all blocks of process 500 can be performed on user device 102. In other examples, all blocks of process 500 can be performed at server system 110. In yet other examples, some blocks of process 500 can be performed at user device 102, while other blocks of process 500 can be performed at server system 110.

Electronic Device

Figure 7:
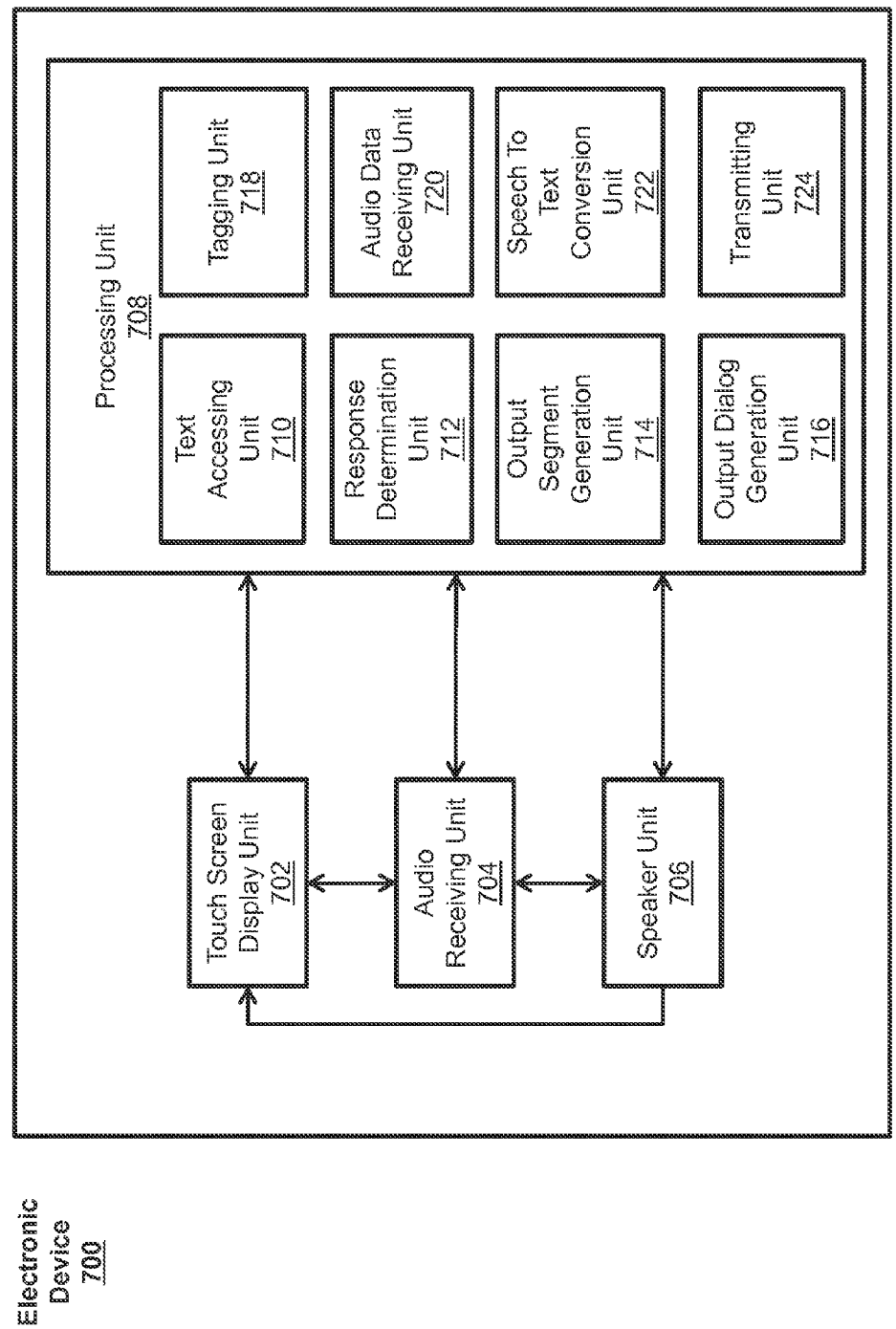
FIG. 7 illustrates a functional block diagram of an electronic device configured to generate an output dialog for a virtual assistant according to various examples.

In accordance with some examples, FIG. 7 shows a functional block diagram of an electronic device 700 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 7 can be combined or separated into sub-blocks to implement the principles of the various described examples. Therefore, the description herein optionally supports any possible combination or separation or further definition of the functional blocks described herein.

As shown in FIG. 7, electronic device 700 can include a touch screen display unit 702 configured to display a user interface and to receive touch input, and a sound receiving unit 704 configured to receive sound input. In some examples, electronic device 700 can include a speaker unit 706 configured to generate sound. Electronic device 700 can further include a processing unit 708 coupled to touch screen display unit 702 and sound receiving unit 704 (and, optionally, coupled to speaker unit 706). In some examples, processing unit 708 can include a text accessing unit 710, a response determination unit 712, an output segment generation unit 714, an output dialog generation unit 716, a tagging unit 718, an audio data receiving unit 720, a speech to text conversion unit 722, and a transmitting unit 724.

Processing unit 708 can be configured to access a textual representation of user speech (e.g., using text accessing unit 710). Processing unit 708 can be further configured to determine (e.g., using response determination unit 712) a response to the textual representation of user speech. Processing unit 708 can be further configured to generate (e.g., output segment generation unit 714) a plurality of output segments based on the determined response to the textual representation of user speech, wherein each of the plurality of output segments comprises one or more words. Processing unit 708 can be further configured to generate (e.g., output dialog generation unit 716) an output dialog based on the plurality of output segments and an order associated with the plurality of output segments.

In some examples, processing unit 708 can be configured to determine the response to the textual representation of user speech by determining (e.g., using response determination unit 712) a user intent based on the textual representation of user speech; identifying a task flow based on the determined user intent; and executing the identified task flow to determine the response to the textual representation of user speech.

In some examples, processing unit 708 can be configured to generate the plurality of output segments (e.g., using output segment generation unit 714) based on the determined response to the textual representation of user speech by selecting an output from a plurality of possible outputs for an output segment of the plurality of output segments, the selected output comprising the one or more words of the output segment.

In some examples, processing unit 708 can be configured to select (e.g., using output segment generation unit 714) the output randomly from the plurality of possible outputs.

In some examples, each of the plurality of possible outputs can be associated with a weighting factor, and wherein processing unit 708 can be configured to select (e.g., using output segment generation unit 714) the output randomly from the plurality of possible outputs based on the weighting factors.

In some examples, processing unit 708 can be configured to select (e.g., using output segment generation unit 714) the output from the plurality of possible outputs based on a predetermined order of the plurality of possible outputs.

In some examples, the plurality of possible outputs are associated with one or more conditions, and wherein processing unit 708 can be configured to select (e.g., using output segment generation unit 714) the output from the plurality of possible outputs further based on whether or not the one or more conditions are satisfied.

In some examples, the response to the textual representation of user speech can include information to be provided in response to the textual representation of user speech, and wherein the one or more conditions depend on the information to be provided in response to the textual representation of user speech. The one or more conditions can depend on contextual information. In some examples, the contextual information can include a type of user device used to operate the virtual assistant, an operational state of the user device, a current time, a location of the user device, an orientation of the user device, or an orientation of a user with respect to the user device.

In some examples, the response to the textual representation of user speech can include an identification of a dialog generation file, and wherein the dialog generation file defines: the order of the plurality of output segments; and possible outputs for each of the plurality of output segments.

In some examples, each of the possible outputs can be defined using a template, and wherein each template comprises one or more of a string of words and a variable word.

In some examples, the dialog generation file can further define a format for displaying the output dialog.

In some examples, each output segment of the plurality of output segments can be identified as being a spoken output segment or a printed output segment, and wherein processing unit 708 can be configured to generate the output dialog (e.g., using output dialog generation unit 716) by generating a spoken output dialog based on output segments identified as being a spoken output segment; and generating a printed output dialog based on output segments identified as being printed output segments.

In some examples, processing unit 708 can be configured to generate (e.g., using output segment generation unit 714) each output segment of the plurality of output independent of the other output segments.

In some examples, processing unit 708 can be configured to generate (e.g., using output dialog generation unit 716) the output dialog based on the plurality of output segments by concatenating the plurality of output segments.

In some examples, processing unit 708 can be configured to tag (e.g., using tagging unit 718), after accessing the textual representation of user speech and before determining the response to the textual representation of user speech, a word of the user speech with a dialog tag.

In some examples, the dialog tag can include a synonym of the tagged word.

In some examples, processing unit 708 can be configured to generate (e.g., using output dialog generation unit 716) the output dialog based on the plurality of output segments by replacing an occurrence of the tagged word in one or more of the plurality of output segments with the synonym of the tagged word.

In some examples, processing unit 708 can be configured to receive (e.g., using audio data receiving unit 720), before accessing the textual representation of user speech, data corresponding to an audio input comprising user speech from a user device; perform (e.g., using speech to text conversion unit 722), before accessing the textual representation of user speech, speech to text conversion on the data corresponding to the audio input to generate the textual representation of user speech; and transmit (e.g., using transmitting unit 724), after generating the output dialog, the output dialog to the user device.

As described above, one aspect of the present technology is the gathering and use of data available from various sources to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A method for operating a virtual assistant, performed at an electronic device having one or more processors and a memory storing one or more programs for execution by the one or more processors, the method comprising:
    receiving a user speech;
    accessing a textual representation of the user speech;
    determining an intent corresponding to the textual representation of the user speech;
    generating an output dialog responsive to the user speech, comprising:
        selecting, in accordance with the determined intent, a dialog template from a plurality of dialog templates, wherein the dialog template includes a plurality of sets of functional blocks, wherein a first set of functional blocks of the plurality of sets of functional blocks defines one or more conditions;
        generating a plurality of output segments from the plurality of sets of functional blocks, including:
            determining whether the one or more conditions are satisfied; and
            in accordance with a determination that the one or more conditions are satisfied, generating, with the first set of functional blocks, a first string for a first output segment of the plurality of output segments; and
        concatenating the plurality of output segments according to an order defined by the dialog template; and
    outputting the output dialog comprising the concatenated plurality of output segments.

2. The method of claim 1, wherein generating an output dialog responsive to the user speech further comprises:
    identifying a task flow based on the determined user intent; and
    executing the identified task flow to generate the output dialog.

3. The method of claim 1, wherein generating the plurality of output segments from the plurality of sets of functional blocks further comprises:
    selecting an output from a plurality of possible outputs for a second set of functional blocks of the plurality of sets of functional blocks, wherein an output segment of the plurality of output segments includes one or more words of the selected output.

4. The method of claim 3, wherein the output is selected randomly from the plurality of possible outputs.

5. The method of claim 4, wherein each of the plurality of possible outputs is associated with a weighting factor, and wherein the output is selected randomly from the plurality of possible outputs based on the weighting factors.

6. The method of claim 3, wherein the output is selected from the plurality of possible outputs based on a predetermined order of the plurality of possible outputs.

7. The method of claim 1, wherein generating the output dialog responsive to the user speech further comprises obtaining information in accordance with the determined intent, wherein the one or more conditions is based on the obtained information.

8. The method of claim 1, wherein the one or more conditions depend on contextual information.

9. The method of claim 8, wherein the contextual information comprises a type of user device used to operate the virtual assistant, an operational state of the user device, a current time, a location of the user device, an orientation of the user device, or an orientation of a user with respect to the user device.

10. The method of claim 1, wherein each functional block of the plurality of sets of functional blocks includes a plurality of possible outputs, and wherein the plurality of possible outputs each include one or more of a string of words and a variable word.

11. The method of claim 1, wherein the dialog template further defines a format for displaying the output dialog.

12. The method of claim 1, wherein each output segment of the plurality of output segments is identified as being a spoken output segment or a printed output segment, and wherein outputting the output dialog comprises:
    outputting a spoken output dialog based on output segments identified as being a spoken output segment; and
    outputting a printed output dialog based on output segments identified as being printed output segments.

13. The method of claim 1, wherein each output segment of the plurality of output segments is generated independent of the other output segments.

14. The method of claim 1, wherein the method further comprises tagging, after accessing the textual representation of the user speech and before generating the output dialog responsive to the user speech, a word of the user speech with a dialog tag.

15. The method of claim 14, wherein the dialog tag comprises a synonym of the tagged word.

16. The method of claim 15, wherein generating the output dialog responsive to the user speech further comprises replacing an occurrence of the tagged word in one or more of the plurality of output segments with the synonym of the tagged word.

17. The method of claim 1, further comprising:
    performing, speech to text conversion on the received user speech to generate the textual representation of the user speech.

18. The method of claim 1, further comprising:
    in accordance with a determination that the one or more conditions are not satisfied, generating, with the first set of functional blocks, a second string for the first output segment of the plurality of output segments.

19. The method of claim 1, further comprising:
    in accordance with a determination that the one or more conditions are not satisfied, forgo generating, with the first set of functional blocks, the first string for the first output segment of the plurality of output segments.

20. The method of claim 1, wherein a third set of functional blocks in the plurality of sets of functional blocks includes a set of candidate output segments, and wherein generating the plurality of output segments from the plurality of sets of functional blocks further comprises:
    executing a first function defined in a first functional block of the third set of functional blocks to select a candidate output segment from the set of candidate output segments; and
    generating one of the plurality of output segments by applying, to the selected candidate output segment, a second function defined in a second functional block of the third set of functional blocks, wherein the first functional block is a child block of the second functional block.

21. A non-transitory computer-readable storage medium comprising computer-executable instructions for:
- receiving a user speech;
- accessing a textual representation of the user speech;
- determining an intent corresponding to the textual representation of the user speech;
- generating an output dialog responsive to the user speech, comprising:
  - selecting, in accordance with the determined intent, a dialog template from a plurality of dialog templates, wherein the dialog template includes a plurality of sets of functional blocks, wherein a first set of functional blocks of the plurality of sets of functional blocks defines one or more conditions;
  - generating a plurality of output segments from the plurality of sets of functional blocks, including:
    - determining whether the one or more conditions are satisfied; and
    - in accordance with a determination that the one or more conditions are satisfied, generating, with the first set of functional blocks, a first string for a first output segment of the plurality of output segments;
  - concatenating the plurality of output segments according to an order defined by the dialog template; and
- outputting the output dialog comprising the concatenated plurality of output segments.

22. The non-transitory computer-readable storage medium of claim 21, further comprising computer executable instructions for:
- identifying a task flow based on the determined user intent; and
- executing the identified task flow.

23. The non-transitory computer-readable storage medium of claim 21, wherein generating the plurality of output segments from the plurality of sets of functional blocks further comprises:
- selecting an output from a plurality of possible outputs for a second set of functional blocks of the plurality of sets of functional blocks.

24. The non-transitory computer-readable storage medium of claim 21, wherein the output is selected randomly from the plurality of possible outputs.

25. The non-transitory computer-readable storage medium of claim 21, further comprising computer executable instructions for:
- in accordance with a determination that the one or more conditions are not satisfied, generating, with the first set of functional blocks, a second string for the first output segment of the plurality of output segments.

26. The non-transitory computer-readable storage medium of claim 21, further comprising computer executable instructions for:
- in accordance with a determination that the one or more conditions are not satisfied, forgo generating, with the first set of functional blocks, the first string for the first output segment of the plurality of output segments.

27. The non-transitory computer-readable storage medium of claim 21, wherein a third set of functional blocks in the plurality of sets of functional blocks includes a set of candidate output segments, and wherein generating the plurality of output segments from the plurality of sets of functional blocks further comprises:
- executing a first function defined in a first functional block of the third set of functional blocks to select a candidate output segment from the set of candidate output segments; and
- generating one of the plurality of output segments by applying, to the selected candidate output segment, a second function defined in a second functional block of the third set of functional blocks, wherein the first functional block is a child block of the second functional block.

28. A system comprising:
- one or more processors;
- memory;
- one or more programs, wherein the one or more programs are stored in the memory and configured to be executed by the one or more processors, the one or more programs including instructions for:
  - receiving a user speech;
  - accessing a textual representation of the user speech;
  - determining an intent corresponding to the textual representation of the user speech;
  - generating an output dialog responsive to the user speech, comprising:
    - selecting, in accordance with the determined intent, a dialog template from a plurality of dialog templates, wherein the dialog template includes a plurality of sets of functional blocks, wherein a first set of functional blocks of the plurality of sets of functional blocks defines one or more conditions;
    - generating a plurality of output segments from the plurality of sets of functional blocks, including:
      - determining whether the one or more conditions are satisfied; and
      - in accordance with a determination that the one or more conditions are satisfied, generating, with the first set of functional blocks, a first string for a first output segment of the plurality of output segments
    - concatenating the plurality of output segments according to an order defined by the dialog template; and
  - outputting the output dialog comprising the concatenated plurality of output segments.

29. The system of claim 28, wherein the one or more programs further include instructions for:
- identifying a task flow based on the determined user intent; and
- executing the identified task flow.

30. The system of claim 28, wherein generating the plurality of output segments from the plurality of sets of functional blocks further comprises:
- selecting an output from a plurality of possible outputs for a second set of functional blocks of the plurality of sets of functional blocks.

31. The system of claim 30, wherein the output is selected randomly from the plurality of possible outputs.

32. The system of claim 31, wherein each of the plurality of possible outputs is associated with a weighting factor, and wherein the output is selected randomly from the plurality of possible outputs based on the weighting factors.

33. The system of claim 30, wherein the output is selected from the plurality of possible outputs based on a predetermined order of the plurality of possible outputs.

34. The system of claim 28, wherein the one or more programs further include instructions for:
- in accordance with a determination that the one or more conditions are not satisfied, generating, with the first set of functional blocks, a second string for the first output segment of the plurality of output segments.

35. The system of claim 28, wherein the one or more programs further include instructions for:
- in accordance with a determination that the one or more conditions are not satisfied, forgo generating, with the first set of functional blocks, the first string for the first output segment of the plurality of output segments.

36. The system of claim 28, wherein a third set of functional blocks in the plurality of sets of functional blocks includes a set of candidate output segments, and wherein generating the plurality of output segments from the plurality of sets of functional blocks further comprises:
- executing a first function defined in a first functional block of the third set of functional blocks to select a candidate output segment from the set of candidate output segments; and
- generating one of the plurality of output segments by applying, to the selected candidate output segment, a second function defined in a second functional block of the third set of functional blocks, wherein the first functional block is a child block of the second functional block.

\* \* \* \* \*